(12) United States Patent
Sasaki

(10) Patent No.: US 8,532,370 B2
(45) Date of Patent: Sep. 10, 2013

(54) IMAGE PROCESSING APPARATUS AND IMAGE PROCESSING METHOD

(75) Inventor: Hiroshi Sasaki, Hachioji (JP)

(73) Assignee: Olympus Corporation, Tokyo (JP)

( * ) Notice: Subject to any disclaimer, the term of this patent is extended or adjusted under 35 U.S.C. 154(b) by 503 days.

(21) Appl. No.: 12/849,309

(22) Filed: Aug. 3, 2010

(65) Prior Publication Data

US 2011/0069192 A1 Mar. 24, 2011

(30) Foreign Application Priority Data

Aug. 18, 2009 (JP) ................................. 2009-189387

(51) Int. Cl.
*G06K 9/40* (2006.01)
*G06T 5/00* (2006.01)

(52) U.S. Cl.
USPC ........................... 382/162; 382/275; 382/300

(58) Field of Classification Search
USPC .......................... 382/162, 167, 300, 254, 275
See application file for complete search history.

(56) References Cited

U.S. PATENT DOCUMENTS

| | | | | |
|---|---|---|---|---|
| 4,774,565 | A * | 9/1988 | Freeman | 348/242 |
| 7,489,822 | B2 | 2/2009 | Morisue | |
| 2002/0101525 | A1* | 8/2002 | Abe | 348/273 |
| 2006/0050159 | A1* | 3/2006 | Ahn | 348/272 |
| 2006/0050956 | A1 | 3/2006 | Tanaka | |

FOREIGN PATENT DOCUMENTS

| | | |
|---|---|---|
| JP | 2000-224602 A | 8/2000 |
| JP | 2005-295244 A | 10/2005 |
| JP | 2006-080897 A | 3/2006 |
| JP | 2008-035470 A | 2/2008 |
| JP | 2009-044594 A | 2/2009 |

OTHER PUBLICATIONS

Japanese Decision of a Patent Grant dated Apr. 30, 2013 (and English translation thereof) in counterpart Japanese Application No. 2009-189387.

* cited by examiner

*Primary Examiner* — Jon Chang
(74) *Attorney, Agent, or Firm* — Holtz, Holtz, Goodman & Chick, PC

(57) ABSTRACT

An image processing apparatus includes a determining unit, a modifying unit, a selecting unit, and a generating unit. The determining unit determines, with respect to a missing pixel position that does not have a signal of a specified color among colors forming an image, an interpolation process type indicating the type of an interpolation process of the signal of the specified color. The modifying unit modifies the determined interpolation process type based on interpolation process types of peripheral missing pixel positions located at the vicinity of the missing pixel position. The selecting unit selects a color-difference signal that is a difference between a signal of a color except the specified color and the signal of the specified color in correspondence with the modified interpolation process type. The generating unit generates an interpolation signal of the signal of the specified color at the missing pixel position based on the color-difference signal.

19 Claims, 25 Drawing Sheets

FIG.2

| Rs | Gs | Rs | Gs | Rs | Gs |
|----|----|----|----|----|----|
| Gs | Bs | Gs | Bs | Gs | Bs |
| Rs | Gs | Rs | Gs | Rs | Gs |
| Gs | Bs | Gs | Bs | Gs | Bs |
| Rs | Gs | Rs | Gs | Rs | Gs |
| Gs | Bs | Gs | Bs | Gs | Bs |

FIG.3

| R-Gi | 0 | R-Gi | 0 | R-Gi | 0 |
|------|---|------|---|------|---|
| 0 | B-Gi | 0 | B-Gi | 0 | B-Gi |
| R-Gi | 0 | R-Gi | 0 | R-Gi | 0 |
| 0 | B-Gi | 0 | B-Gi | 0 | B-Gi |
| R-Gi | 0 | R-Gi | 0 | R-Gi | 0 |
| 0 | B-Gi | 0 | B-Gi | 0 | B-Gi |

FIG.4

| Gi | Gs | Gi | Gs | Gi | Gs |
|----|----|----|----|----|----|
| Gs | Gi | Gs | Gi | Gs | Gi |
| Gi | Gs | Gi | Gs | Gi | Gs |
| Gs | Gi | Gs | Gi | Gs | Gi |
| Gi | Gs | Gi | Gs | Gi | Gs |
| Gs | Gi | Gs | Gi | Gs | Gi |

FIG.5

| Gi | Gs | Gi | Gs | Gi | Gs | Gi | Gs |
|----|----|----|----|----|----|----|----|
| Gs | Gi | Gs | Gi | Gs | Gi | Gs | Gi |
| Gi | Gs | Gi | Gs | Gi | Gs | Gi | Gs |
| Gs | Gi | Gs | Gi | Gs | Gi | Gs | Gi |
| Gi | Gs | Gi | Gs | Gi | Gs | Gi | Gs |
| Gs | Gi | Gs | Gi | Gs | Gi | Gs | Gi |
| Gi | Gs | Gi | Gs | Gi | Gs | Gi | Gs |
| Gs | Gi | Gs | Gi | Gs | Gi | Gs | Gi |

MIDDLE POSITION

FIG.6

| R-Gi | 0 | R-Gi | 0 | R-Gi | 0 | R-Gi | 0 |
|---|---|---|---|---|---|---|---|
| 0 | 0 | 0 | 0 | 0 | 0 | 0 | 0 |
| R-Gi | 0 | R-Gi | 0 | R-Gi | 0 | R-Gi | 0 |
| 0 | 0 | 0 | 0 | 0 | 0 | 0 | 0 |
| R-Gi | 0 | R-Gi | 0 | R-Gi | 0 | R-Gi | 0 |
| 0 | 0 | 0 | 0 | 0 | 0 | 0 | 0 |
| R-Gi | 0 | R-Gi | 0 | R-Gi | 0 | R-Gi | 0 |
| 0 | 0 | 0 | 0 | 0 | 0 | 0 | 0 |

⊗ — MIDDLE POSITION

FIG.7

| 0 | 0 | 0 | 0 | 0 | 0 | 0 | 0 |
|---|---|---|---|---|---|---|---|
| 0 | B-Gi | 0 | B-Gi | 0 | B-Gi | 0 | B-Gi |
| 0 | 0 | 0 | 0 | 0 | 0 | 0 | 0 |
| 0 | B-Gi | 0 | B-Gi | 0 | B-Gi | 0 | B-Gi |
| 0 | 0 | 0 | 0 | 0 | 0 | 0 | 0 |
| 0 | B-Gi | 0 | B-Gi | 0 | B-Gi | 0 | B-Gi |
| 0 | 0 | 0 | 0 | 0 | 0 | 0 | 0 |
| 0 | B-Gi | 0 | B-Gi | 0 | B-Gi | 0 | B-Gi |

⊗ — MIDDLE POSITION (VERTICAL INTERPOLATION)  (HORIZONTAL INTERPOLATION)  (FOUR-PIXEL AVERAGE INTERPOLATION)

| | Gs (n−1, m−2) | X (n, m−2) | Gs (n+1, m−2) | |
|---|---|---|---|---|
| Gs (n−2, m−1) | | Gs (n, m−1) | | Gs (n+2, m−1) |
| X (n−2, m) | Gs (n−1, m) | X (n, m) | Gs (n+1, m) | X (n+2, m) |
| Gs (n−2, m+1) | | Gs (n, m+1) | | Gs (n+2, m+1) |
| | Gs (n−1, m+2) | X (n, m+2) | Gs (n+1, m+2) | |

FIG.11

| X-Gv (n-2, m-2) |  | X-Gv (n, m-2) |  | X-Gv (n+2, m-2) |
|---|---|---|---|---|
|  | X-Gv (n-1, m-1) |  | X-Gv (n+1, m-1) |  |
| X-Gv (n-2, m) |  | X-Gv (n, m) |  | X-Gv (n+2, m) |
|  | X-Gv (n-1, m+1) |  | X-Gv (n+1, m+1) |  |
| X-Gv (n-2, m+2) |  | X-Gv (n, m+2) |  | X-Gv (n+2, m+2) |

FIG.12

| X-Gh (n-2, m-2) |  | X-Gh (n, m-2) |  | X-Gh (n+2, m-2) |
|---|---|---|---|---|
|  | X-Gh (n-1, m-1) |  | X-Gh (n+1, m-1) |  |
| X-Gh (n-2, m) |  | X-Gh (n, m) |  | X-Gh (n+2, m) |
|  | X-Gh (n-1, m+1) |  | X-Gh (n+1, m+1) |  |
| X-Gh (n-2, m+2) |  | X-Gh (n, m+2) |  | X-Gh (n+2, m+2) |

| XL-Ga (n-2, m-2) | | XL-Ga (n, m-2) | | XL-Ga (n+2, m-2) |
|---|---|---|---|---|
| | XL-Ga (n-1, m-1) | | XL-Ga (n+1, m-1) | |
| XL-Ga (n-2, m) | | XL-Ga (n, m) | | XL-Ga (n+2, m) |
| | XL-Ga (n-1, m+1) | | XL-Ga (n+1, m+1) | |
| XL-Ga (n-2, m+2) | | XL-Ga (n, m+2) | | XL-Ga (n+2, m+2) |

FIG.16

| | T(n+6, m-2) | |
|---|---|---|
| T(n+5, m-3) | | T(n+5, m-1) |
| | T(n+4, m-2) | |
| T(n+3, m-3) | | T(n+3, m-1) |
| | T(n+2, m-2) | |
| T(n+1, m-3) | | T(n+1, m-1) |
| T(n, m-2) | | T(n, m) |
| | T(n-1, m-1) | |
| T(n-2, m-2) | | T(n-2, m) |
| | T(n-3, m-1) | |
| T(n-4, m-2) | | T(n-4, m) |
| | T(n-5, m-1) | |

FIG.24

(DIAGONAL
INTERPOLATION)

(INVERTED DIAGONAL
INTERPOLATION)

IMAGE PROCESSING APPARATUS AND IMAGE PROCESSING METHOD

CROSS-REFERENCE TO RELATED APPLICATIONS

This application is based upon and claims the benefit priority from Japanese Patent Application No. 2009-189387, filed on Aug. 18, 2009, the entire contents of which are incorporated herein by reference.

BACKGROUND OF THE INVENTION

1. Field of the Invention

The present invention relates to an image processing apparatus and an image processing method. More particularly, the present invention relates to an image processing apparatus and an image processing method that are used for processing an image of which each pixel consists of one color signal and generating an image of which each pixel at the same position consists of plurality of color signals.

2. Description of the Related Art

Various types of electronic image capturing apparatuses such as a digital camera or a digital video camera that captures an image of a subject have conventionally appeared. The configuration of an imaging device that is built in an electronic image capturing apparatus is roughly classified into the configuration of a three-plate imaging device that can obtain a color signal of three color components of red (R), green (G), and blue (B) at one pixel position and the configuration of a single-plate imaging device that can obtain a color signal of only one color component of three color components at one pixel position. For example, a currently available digital camera generally has the configuration of a single-plate imaging device, and a digital video camera has the configuration of a three-plate imaging device and also has the configuration of a single-plate imaging device.

A three-plate imaging device is expensive because its configuration is complicated and the number of parts is large. However, the three-plate imaging device is generally high picture quality because a color signal of three color components of R, G, and B can be obtained at a capturing point at each pixel position of a captured image.

On the other hand, a single-plate imaging device has a simple configuration. However, each filter of R, G, and B should be arranged on the front of an imaging device in a mosaic shape every pixel in order to obtain a color signal of three color components of R, G, and B, and only a single-component color signal can be obtained at each pixel position of a captured image.

As a mosaic-like arrangement of each filter of R, G, and B, it is general that a unit filter group is formed as four filters by arranging an R filter and a B filter at a diagonal position and arranging a pair of G filters at a diagonal position and unit filter groups are arranged as a two-dimensional array (hereinafter, "Bayer array").

In the configuration of a single-plate imaging device that has the Bayer array, a color signal of three color components per a pixel is obtained by performing an interpolation process on a missing color signal at each pixel position by using a color signal at an adjacent pixel position. Such a process is generally referred to as a demosaic process.

The demosaic process requires performing an interpolation process that is suitable for the edge structure of a target image at a missing pixel position of a signal of a specified color. When a simple interpolation process that does not consider the edge structure of a target image is performed in the demosaic process, there occurs a phenomenon called a false color indicating that a color that originally does not exist appears in a pixel area such as a peripheral portion of an edge.

Moreover, a signal of a specified color is a color signal that has a specified color component among plurality of color signals that forms an image. For example, a color signal of a G component is illustrated in an image formed of three color signals of R, G, and B. Moreover, a missing pixel position is position of a pixel, which does not have a signal of specified color, among pixels that form an image.

For example, in the case of an image formed of three color signals of R, G, and B, sampling intervals of color signals of an R component and a B component to a color signal of a G component (an example of a signal of a specified color) are different in a pixel area such as an edge having a high spatial frequency. For this reason, when a simple interpolation process is performed in the demosaic process, a high spatial frequency that can be sufficiently expressed by the color signal of a G component is turned down toward a low frequency side in each color signal of an R component and a B component, and thus a false color occurs.

As a method for reducing such a false color, there is a method for forming, on an imaging device, an image that is obtained by degrading a spatial frequency characteristic of an optical system such as a lens or an optical low pass filter up to a spatial frequency at which a sampling interval of a color signal of an R component or a B component of a Bayer array can be reproduced. At this time, the reduction of resolution of an image that is formed on the imaging device is generally suppressed by the design of the optical system. For example, in order to suppress the reduction of resolution of an image, the optical system is designed in such a manner that a spatial frequency is a frequency at which a moire caused by turndown distortion does not occur in the sampling interval of the color signal of a G component. Moreover, a conventional technique for performing the suppression of the reduction of resolution of an image and the reduction of a false color by the design of the optical system has been known as disclosed in, for example, Japanese Laid-open Patent Publication No. 2008-35470.

On the other hand, there is an interpolation processing apparatus disclosed in Japanese Laid-open Patent Publication No. 2000-224602 as a conventional technique for performing the reduction of a false color of an image. In the interpolation processing apparatus disclosed in the document, an imaging device having a Bayer array computes a similarity degree of a first direction and a similarity degree of a second direction at a vacant lattice point that is a position (hereinafter, "G-signal missing position") at which the color signal of a G component is missed and determines a direction having a strong similarity. Next, the interpolation processing apparatus detects a vacant lattice point at which a predetermined association does not exist in a direction having a strong similarity between vacant lattice points adjacent to each other, on the basis of the determination result. After that, in accordance with a method different from the determination, the interpolation processing apparatus computes a similarity degree of the first direction and a similarity degree of the second direction to again determine a direction having a strong similarity and computes an amount of interpolation in accordance with the modified determination result.

SUMMARY OF THE INVENTION

An image processing apparatus according to an aspect of the present invention includes a type determining unit that determines, with respect to a missing pixel position that is a pixel position that does not have a color of a specified color among a plurality of colors of an image, an interpolation process type indicating a type of an interpolation process for interpolating a signal of the specified color; a type modifying unit that modifies the determined interpolation process type on the basis of interpolation process types of a plurality of peripheral missing pixel positions that are pixel positions each of which does not have a signal of the specified color among the plurality of colors of the image and located at a vicinity of the missing pixel position; a color-difference signal selecting unit that selects a color-difference signal that is a difference between a signal of a color except the specified color among the plurality of colors and the signal of the specified color in correspondence with the modified interpolation process type; and an interpolation signal generating unit that generates an interpolation signal of the specified color at the missing pixel position on the basis of the color-difference signal.

A computer-readable recording medium according to another aspect of the present invention records an image processing program. The image processing program causes a computer execute determining, with respect to a missing pixel position that is a pixel position that does not have a signal of a specified color among a plurality of colors of an image, an interpolation process type indicating a type of an interpolation process for interpolating a signal of the specified color; modifying the determined interpolation process type on the basis of interpolation process types of a plurality of peripheral missing pixel positions that are pixel positions each of which does not have a signal of the specified color among the plurality of colors of the image and located at a vicinity of the missing pixel position; selecting a color-difference signal that is a difference between a signal of a color except the specified color among the plurality of colors and the signal of the specified color in correspondence with the modified interpolation process type; and generating an interpolation signal of the specified color at the missing pixel position on the basis of the color-difference signal.

An image processing method according to the present invention includes determining, with respect to a missing pixel position that is a pixel position that does not have a signal of a specified color among plurality of colors of an image, an interpolation process type indicating a type of an interpolation process for interpolating a signal of the specified color; modifying the determined interpolation process type on the basis of interpolation process types of a plurality of peripheral missing pixel positions that are pixel positions each of which does not have a signal of the specified color among the plurality of colors of the image and located at a vicinity of the missing pixel position; selecting a color-difference signal that is a difference between a signal color except the specified color among the plurality of colors and the signal of the specified color in correspondence with the modified interpolation process type; and generating an interpolation signal of the specified color at the missing pixel position on the basis of the color-difference signal.

The above and other features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 is a pattern diagram illustrating a specific example of a Bayer array of color signals that are captured by an imaging device;

FIG. 3 is a pattern diagram illustrating a specific example of a two-dimensional array of color-difference signals that are output from a G-interpolation color difference computing unit;

FIG. 4 is a pattern diagram illustrating a specific example of a two-dimensional array of G-component signals that are output from the G-interpolation color difference computing unit;

FIG. 5 is a pattern diagram illustrating a specific example of a two-dimensional array of G-component color signals that are output from the G-interpolation color difference computing unit;

FIG. 6 is a pattern diagram illustrating a specific example of a two-dimensional array of R-component color-difference signals that are output from the G-interpolation color difference computing unit;

FIG. 7 is a pattern, diagram illustrating a specific example of a two-dimensional array of B-component color-difference signals that are output from the G-interpolation color difference computing unit;

FIG. 11 is a pattern diagram illustrating a specific example of pixel positions on a Bayer array of color-difference signals that are used for a color difference similarity computation process corresponding to a vertical interpolation process;

FIG. 12 is a pattern diagram illustrating a specific example of pixel positions on a Bayer array of color-difference signals that are used for a color difference similarity computation process corresponding to a horizontal interpolation process;

FIG. 16 is a pattern diagram illustrating a specific example of a pixel area from which type information used for a modification process of an interpolation process type is extracted;

FIG. 24 is a pattern diagram illustrating a specific example of a pixel area from which type information used for a modification process of an interpolation process type is extracted according to the first alternative example of the first embodiment;

DETAILED DESCRIPTION OF THE PREFERRED EMBODIMENTS

First Embodiment

Figure 1:
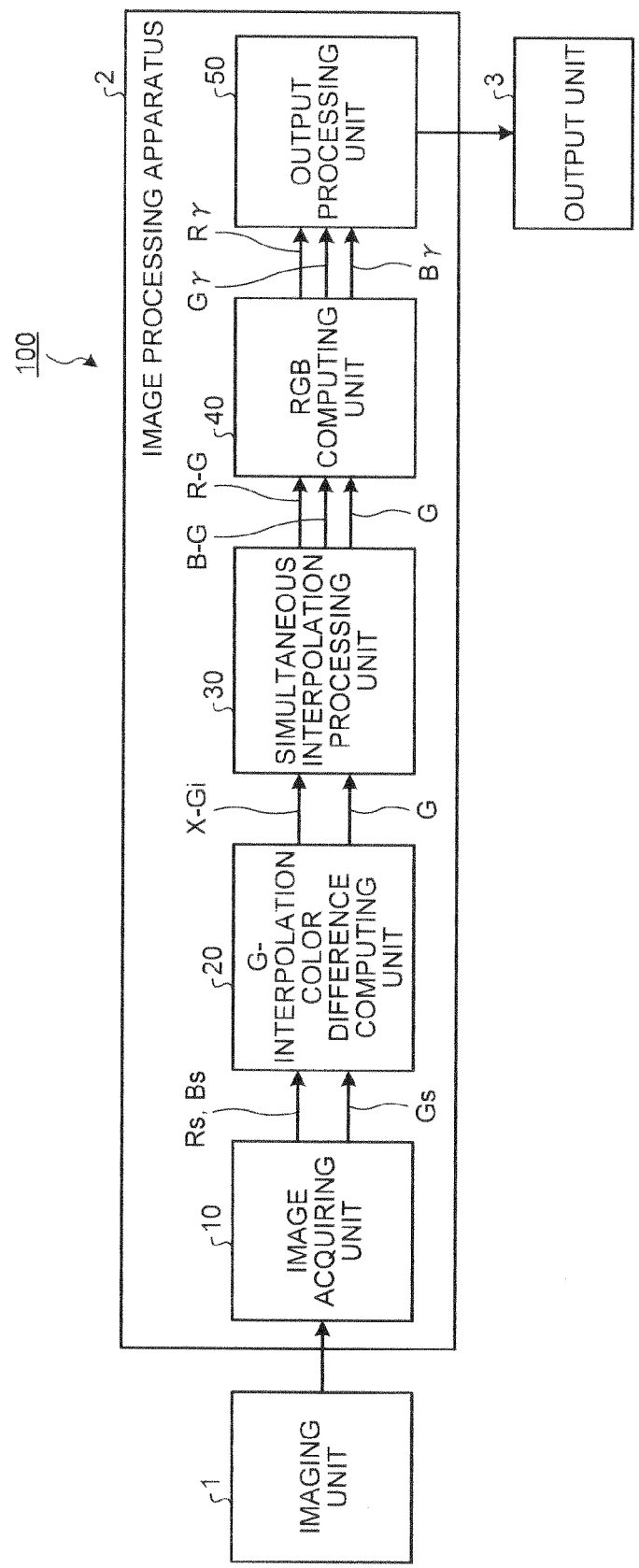
FIG. 1 is a block diagram typically illustrating an example configuration of an image output apparatus that includes an image processing apparatus according to a first embodiment of the present invention.

FIG. 1 is a block diagram typically illustrating an example configuration of an image output apparatus 100 that includes an image processing apparatus according to the first embodiment of the present invention. As illustrated in FIG. 1, the image output apparatus 100 according to the first embodiment includes an imaging unit 1 that captures an image of a subject, an image processing apparatus 2 that performs various types of image processing on the image captured by the imaging unit 1, and an output unit 3 that outputs the image processed by the image processing apparatus 2.

The imaging unit 1 is realized by using an optical system such as a lens, an IR cut filter, and an optical low pass filter, an imaging device such as a CCD image sensor and a CMOS image sensor, a drive control unit of the imaging device, and the like. In the imaging unit 1, the lens concentrates light of a subject on a light receiving unit of the imaging device to form an optical image of the subject on the light receiving unit of the imaging device. The IR cut filter cuts infrared light from light beams passing through the lens. The optical low pass filter is an optical filter that band-limits the spatial frequency of the optical image of the subject that is received by the light receiving unit of the imaging unit.

Moreover, the reduction of resolution of an optical image on the imaging device is suppressed by designing the spatial frequency of the optical low pass filter in such a manner that the spatial frequency of the optical low pass filter becomes a spatial frequency in which a moire caused by turndown distortion in a sampling interval of a G-component color signal does not occur not less than a permissible level.

Moreover, the imaging device of the imaging unit 1 is a single-plate imaging device that has color filters that are arrayed in a two-dimensional method in a mosaic shape like a Bayer array. FIG. 2 is a pattern diagram illustrating a specific example of a Bayer array of color signals that are captured by the imaging device. For example, as illustrated in FIG. 2, the imaging device of the imaging unit 1 captures a color image of a subject by using color filters of multiple colors (for example, R, G, and B) that are arranged in the order of a Bayer array.

In the imaging unit 1, light formed on the light receiving unit of the imaging device via the optical system is photoelectrically converted into an electric signal by using a pixel of a single-color filter of any of red, green, and blue that are arranged in the order of a Bayer array, in other words, an R-component pixel, a G-component pixel, and a B-component pixel, as illustrated in FIG. 2. In this way, a color signal Rs of an R component, a color signal Gs of a G component, and a color signal Bs of a B component that form the color image of the subject are generated. On the other hand, the drive control unit of the imaging unit 1 controls the drive of the imaging device and controls the imaging device in such a manner that the color signals Rs, Gs, and Bs that form the color image of the subject are sequentially output to the image processing apparatus 2 for each capturing.

The image processing apparatus 2 performs various types of image processing on the image captured by the imaging unit 1. As illustrated in FIG. 1, the image processing apparatus 2 includes an image acquiring unit 10, a G-interpolation color difference computing unit 20, a simultaneous interpolation processing unit 30, an ROB computing unit 40, and an output processing unit 50.

The image acquiring unit 10 acquires the image captured by the imaging unit 1. Specifically, the image acquiring unit 10 acquires the color signals Rs, Gs, and Bs that form the color image of the subject captured by the imaging unit 1 as described above. Moreover, the image acquiring unit 10 includes an amplifier, an A/D converter, and a processing control unit that are not particularly illustrated.

In the image acquiring unit 10, the amplifier amplifies the color signals Rs, Gs, and Bs acquired from the imaging unit 1 and the A/D converter converts the amplified color signals Rs, Gs, and Bs from an analog signal to a digital signal. On the other hand, the processing control unit of the image acquiring unit 10 has an image processing function such as a noise reduction processing function and a white balance processing function and performs various types of image processing such as a noise reduction process and a white balance process on the color signals Rs, Gs, and Bs that are digitalized in this way.

The image acquiring unit 10 divides the color signals Rs, Gs, and Bs after various types of image processing into the G-component color signal Gs and the color signals Rs and Bs (in other words, R-component and B-component) other than a G component on the basis of the control of the processing control unit and transmits those signals to the G-interpolation color difference computing unit 20.

The G-interpolation color difference computing unit 20 computes an interpolation signal and a color-difference signal based on each color signal that forms the image captured by the imaging unit 1. Specifically, the G-interpolation color difference computing unit 20 first acquires the color signals Rs, Gs, and Bs of the captured image from the image acquiring unit 10. Next, the G-interpolation color difference computing unit 20 computes an interpolation G signal Gi that is a G-component interpolation signal corresponding to the pixel positions of the acquired color signals Rs and Bs. Moreover, in the first embodiment, each pixel position of the color signals Rs and Bs is a pixel position (hereinafter, "G-missing pixel position") in which the G-component color signal Gs that is an example of a signal of a specified color is missed. Subsequently, the G-interpolation color difference computing unit 20 computes a color-difference signal R-Gi that is a signal difference between a color signal R and the interpolation G signal Gi and a color-difference signal B-Gi that is a signal difference between a color signal B and the interpolation G signal Gi at the G-missing pixel position.

In this case, a color signal R is a generic name of a R-component color signal, and is a color signal Rs at the R-component pixel position among the G-missing pixel positions or a color signal RL that is obtained by band-limiting the color signal Rs by a low pass filter. On the other hand, a color signal B is a generic name of a B-component color signal, and is a color signal Bs at the B-component pixel position among the G-missing pixel positions or a color signal BL that is obtained by band-limiting the color signal Bs by the low pass filter.

In other words, the color-difference signal R-Gi is a color-difference signal Rs-Gi that is a signal difference between the color signal Rs and the interpolation G signal Gi or a color-difference signal RL-Gi that is a signal difference between the color signal RL and the interpolation G signal Gi. Similarly, the color-difference signal B-Gi is a color-difference signal Bs-Gi that is a signal difference between the color signal Bs and the interpolation G signal Gi or a color-difference signal BL-Gi that is a signal difference between the color signal BL and the interpolation G signal Gi.

After that, the G-interpolation color difference computing unit 20 sequentially outputs the color-difference signals R-Gi and B-Gi to the simultaneous interpolation processing unit 30 in a predetermined sequence. FIG. 3 is a pattern diagram illustrating a specific example of a two-dimensional array of the color-difference signals that are output from the G-interpolation color difference computing unit. The G-interpolation color difference computing unit 20 sequentially outputs the two-dimensional color-difference signals R-Gi and B-Gi as illustrated in FIG. 3 to the simultaneous interpolation processing unit 30 in a raster scanning sequence.

Moreover, a color-difference signal X-Gi illustrated in FIG. 1 is a generic name of the color-difference signals R-Gi and B-Gi, and is the color-difference signal R-Gi or the color-difference signal B-Gi. In other words, a color signal X is a generic name of color signals other than a G component, and is the R-component color signal R or the B-component color signal B described above.

On the other hand, the G-interpolation color difference computing unit 20 sequentially outputs the G-component color signal Gs and the interpolation G signal Gi to the simultaneous interpolation processing unit 30 in a predetermined sequence. FIG. 4 is a pattern diagram illustrating a specific example of a two-dimensional array of the G-component signals that are output from the G-interpolation color difference computing unit 20. The G-interpolation color difference computing unit 20 sequentially puts the two-dimensional color signals Gs and interpolation G signals Gi as illustrated in FIG. 4 to the simultaneous interpolation processing unit 30 in a raster scanning sequence. Moreover, a color signal G illustrated in FIG. 1 is a generic name of the G-component color signal Gs and the interpolation G signal Gi, and is the color signal G or the interpolation G signal Gi.

Hereinafter, it may be a case where a pixel of the G-component color signal Gs that is an example of a signal of a specified color according to the first embodiment is referred to as a G pixel and pixels of the color signals Rs and Bs that are an example of signals of colors except the specified color that are color signals of color components different from the signal of the specified color are referred to as an R pixel and a B pixel. Moreover, it may be a case where these R pixel and B pixel are generally referred to as an X pixel. In other words, for example, the R-component color signals Rs and RL and the B-component color signals Bs and BL described above are given as the color signal of an X pixel.

Moreover, when a pixel (X pixel) of a signal of a color except the specified color is particularly referred to as an XL pixel, the color signal of the XL pixel is the color signals RL and BL that are band-limited by the low pass filter or the like. Similarly, when the color signal X that is a generic name of a signal of a color except the specified color is referred to as a color signal XL, the color signal XL is the band-limited color signal RL or color signal BL. Moreover, the X pixel corresponds to a pixel (or, G-missing pixel) that does not have the color signal Gs that is an example of a signal of a specified color.

The simultaneous interpolation processing unit 30 generates a plurality of color signals at the same sampling position on the basis of the color-difference signal X-Gi and the color signal G acquired from the G-interpolation color difference computing unit 20. Specifically, the simultaneous interpolation processing unit 30 first acquires the color-difference signals R-Gi and B-Gi as the color-difference signal X-Gi output from the G-interpolation color difference computing unit 20 and acquires the G-component color signal Gs and the interpolation G signal Gi as the color signal G output from the G-interpolation color difference computing unit 20.

In this case, the color-difference signals R-Gi and B-Gi are a color-difference signal selected in correspondence with the interpolation process type of the G-missing pixel position and the interpolation G signal Gi is an interpolation signal of the color signal Gs at the G-missing pixel position. Moreover, the color signal Gs is a signal of a specified color according to the first embodiment as described above.

Next, the simultaneous interpolation processing unit 30 generates a plurality (for example, three) of color signals at the same sampling position on the basis of the color-difference signals R-Gi and B-Gi, the interpolation G signal Gi, and the color signal Gs that are output from the G-interpolation color difference computing unit 20. FIG. 5 is a pattern diagram illustrating a specific example of a two-dimensional array of G-component color signals that are output from the G-interpolation color difference computing unit 20. FIG. 6 is a pattern diagram illustrating a specific example of a two-dimensional array R-component color-difference signals that are output from the G-interpolation color difference computing unit 20. FIG. 7 is a pattern diagram illustrating a specific example of a two-dimensional array of B-component color-difference signals that are output from the G-interpolation color difference computing unit 20.

As illustrated in FIGS. 5 to 7, the simultaneous interpolation processing unit 30 performs, by using 8*8 pixel areas for example, an interpolation process on the color signal G and the color-difference signals R-Gi and B-Gi at the middle position of the 8*8 pixel areas and generates color-difference signals R-G and B-G and the color signal G that are three color signals at the same position. After that, the simultaneous interpolation processing unit 30 outputs three color signals generated at the same position in this way, in other words, the two color-difference signals R-G and B-G and the one color signal G to the RGB computing unit 40.

The RGB computing unit 40 computes each color signal of RGB on the basis of the plurality of color signals generated at the same position by the simultaneous interpolation processing unit 30. Specifically, the RGB computing unit 40 first acquires the color-difference signals R-G and B-G and the color signal G that are the plurality of color signals generated at the same position by the simultaneous interpolation processing unit 30.

Next, the RGB computing unit 40 performs a color matching process and a gamma correction process on color signals R, G, and B generated based on the color-difference signals R-G and B-G and the color signal G at the same position. In this way, the RGB computing unit 40 computes a R-component color signal $R\gamma$, a G-component color signal $G\gamma$, and a B-component color signal $B\gamma$ on which the processes are performed. After that, the RGB computing unit 40 outputs the color signals $B\gamma$, $G\gamma$, and $B\gamma$ computed in this way to the output processing unit 50.

The output processing unit 50 first acquires the color signals $R\gamma$, $G\gamma$, and $B\gamma$ computed by the RGB computing unit 40 and converts the acquired color signals $R\gamma$, $G\gamma$, and $B\gamma$ into color signals of output image data. Specifically, the output processing unit 50 converts the color signals $R\gamma$, $G\gamma$, and $B\gamma$ output from the RGB computing unit 40 into signals having a YUV format, and further converts the signals having the YUV format into compressed data obtained by performing a high-efficiency compression encoding process such as JPEG or MPEG. After that, the output processing unit 50 transmits the compressed data to the output unit 3 as output image data.

Moreover, the output processing unit 50 may convert the color signals $R\gamma$, $G\gamma$, and $B\gamma$ output from the RGB computing unit 40 into a predetermined signal standard (for example, each signal of RGB format) other than the YUV format and transmit the obtained converted data to the output unit 3 as output image data.

The output unit 3 outputs image data processed by the image processing apparatus 2. Specifically, the output unit 3 is realized by a desired display such as a CRT display or a liquid crystal display, and displays an image based on the image data processed by the image processing apparatus 2, in other words, the image of the subject captured by the imaging unit 1 described above.

Moreover, the output unit 3 is not limited to a device such as a display that displays image data as described above. Therefore, the output unit 3 may be a storage device that stores an image (image of subject captured by the imaging unit 1) based on image data processed by the image processing apparatus 2 in a predetermined storage medium, or may be a printer that prints an image of a subject on a medium such as paper.

Moreover, the storage medium of the output unit 3 that functions as a storage device may be a semiconductor memory such as a flash memory, may be a stationary storage medium such as a hard disk, or may be a transportable storage medium such as a magnetic tape, an optical disc, or a memory card.

Figure 8:
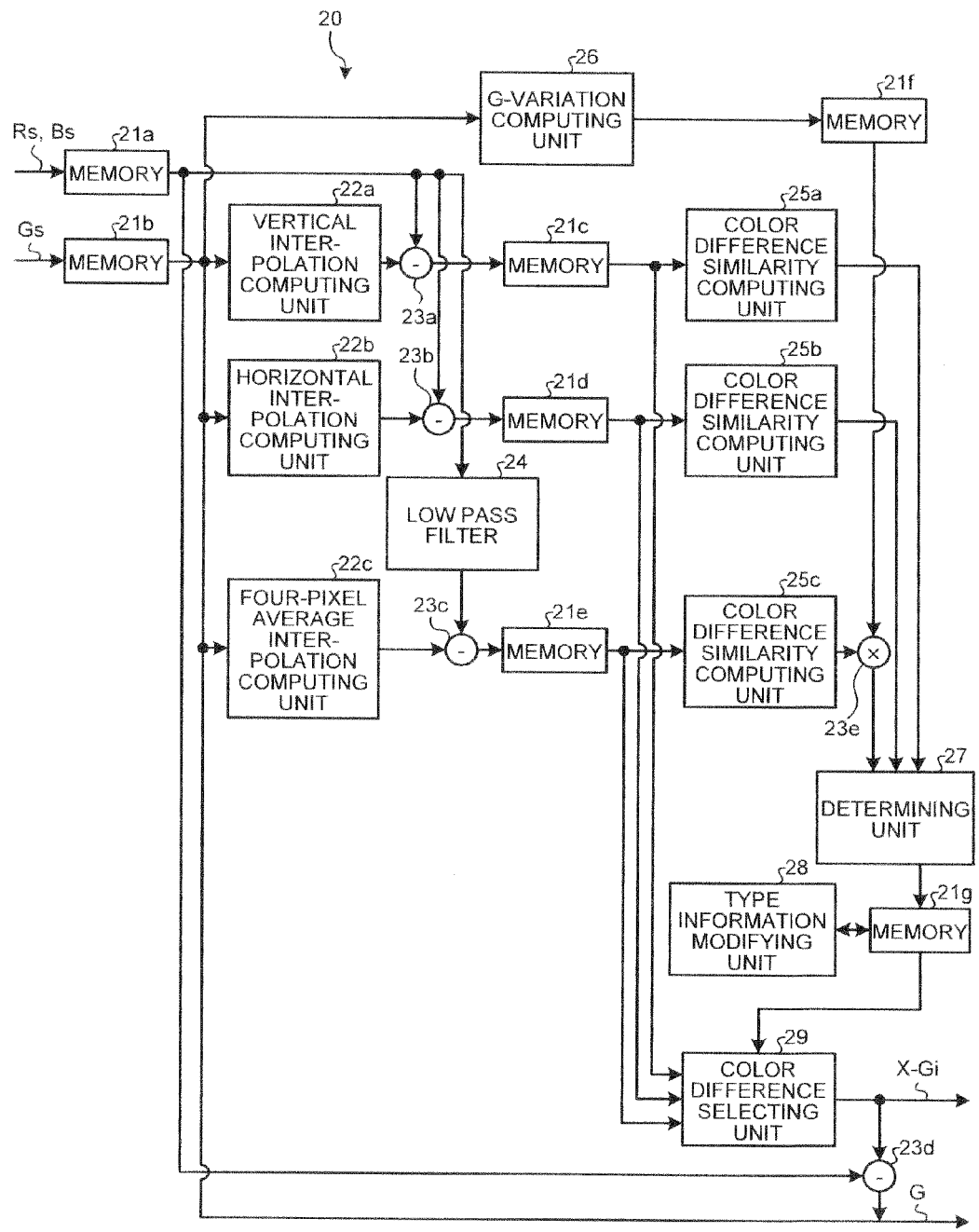
FIG. 8 is a block diagram typically illustrating an example configuration of the G-interpolation color difference computing unit of the image processing apparatus according to the first embodiment of the present invention.

Next, it will be explained in detail about the G-interpolation color difference computing unit 20 of the image processing apparatus 2 according to the first embodiment of the present invention. FIG. 8 is a block diagram typically illustrating an example configuration of the G-interpolation color difference computing unit of the image processing apparatus according to the first embodiment of the present invention.

As illustrated in FIG. 8, the G-interpolation color difference computing unit 20 according to the first embodiment includes memories 21a to 21g, a vertical interpolation computing unit 22a, a horizontal interpolation computing unit 22b, a four-pixel average interpolation computing unit 22c, subtraction units 23a to 23d, a multiplication unit 23e, a low pass filter 24, color difference similarity computing units 25a to 25c, a G-variation computing unit 26, a determining unit 27, a type information modifying unit 28, and a color difference selecting unit 29.

The memories 21a and 21b are a means for obtaining a delay until pixel data (color signal or the like) on which a two-dimensional interpolation process can be performed at the G-missing pixel position described above is prepared. Specifically, the memory 21a sequentially acquires signals of colors except the specified color, which are the color signals Rs and Bs output from the image acquiring unit 10, according to the first embodiment among the color signals of each pixel that form a captured image, and stores therein the color signals Rs and Bs by a predetermined number of lines (for example, three lines or more). After that, the memory 21a sequentially outputs the color signals Rs and for the predetermined number of lines to the subtraction units 23a, 23b, and 23d when the color signals Rs and Bs are stored by the predetermined number of lines.

On the other hand, the memory 21b sequentially acquires a signal of a specified color, which is the color signal Gs output from the image acquiring unit 10, according to the first embodiment among the color signals of each pixel that form the captured image, and stores therein the color signal Gs by a predetermined number of lines. After that, when the color signal Gs is stored by the predetermined number of lines, the memory 21b sequentially outputs the color signal Gs for the predetermined number of lines to the vertical interpolation computing unit 22a, the horizontal interpolation computing unit 22b, the four-pixel average interpolation computing unit 22c, the G-variation computing unit 26, and the simultaneous interpolation processing unit 30 (see FIG. 1).

In this way, the memories 21a and 21b obtain a delay until the data of the number of pixels, which is the color signals Rs, Gs, and Bs for the predetermined number of lines, on which the two-dimensional interpolation process can be performed at the G-missing pixel position described above is prepared.

The vertical interpolation computing unit 22a, the horizontal interpolation computing unit 22b, and the four-pixel average interpolation computing unit 22c function as a plurality of interpolation signal computing units that computes interpolation signals having specified color signals (color signal Gs) different among interpolation process types.

Specifically, the vertical interpolation computing unit 22a performs a longitudinal-direction interpolation process (hereinafter, "vertical interpolation process") on the basis of a signal of the specified color of each pixel position adjacent in a longitudinal direction of the G-missing pixel position and computes an interpolation signal corresponding to a longitudinal-direction interpolation process type.

The horizontal interpolation computing unit 22b performs a lateral-direction interpolation process (hereinafter, "horizontal interpolation process") on the basis of a signal of the specified color of each pixel position adjacent in a lateral direction of the G-missing pixel position and computes an interpolation signal corresponding to a lateral-direction interpolation process type.

The four-pixel average interpolation computing unit 22c performs a vertical/horizontal-direction (cross-direction) interpolation process (hereinafter, "four-pixel average interpolation process) on the basis of signals of the specified color of all pixel positions adjacent in longitudinal and lateral directions of the G-missing pixel position and computes an interpolation signal corresponding to the interpolation process type of a four-pixel average interpolation.

Figures 9, 10:
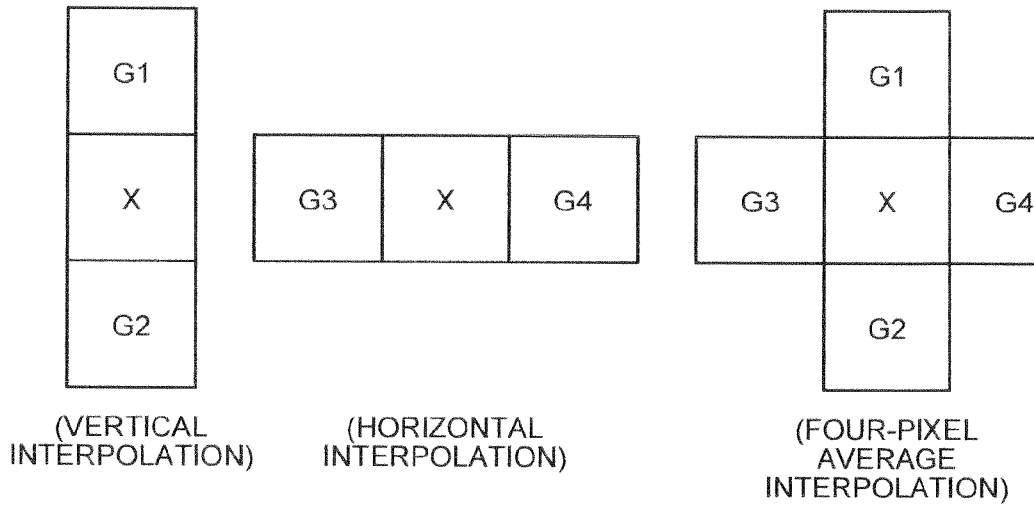
FIG. 9 is a pattern diagram illustrating a specific example of pixel positions on a Bayer array of interpolation process target pixels different among interpolation process types according to the first embodiment.
FIG. 10 is a pattern diagram illustrating a specific example of pixel positions on a Bayer array of color signals that are used for a band limiting process of a low pass filter.

Hereinafter, it is specifically explained about a vertical interpolation process, a horizontal interpolation process, and a four-pixel average interpolation process. FIG. 9 is a pattern diagram illustrating a specific example of pixel positions on a Bayer array of interpolation process target pixels different among interpolation process types according to the first embodiment.

The vertical interpolation computing unit 22a acquires from the memory 21b each color signal Gs of two pixels (see FIG. 9) adjacent in a longitudinal direction of the X pixel that is a G-missing pixel, and performs a vertical interpolation process based on the following Equation (1) by using the signal values G1 and G2 of the acquired each color signal Gs. In this way, the vertical interpolation computing unit 22a computes a G-component interpolation value Gv at the X pixel. After that, the vertical interpolation computing unit 22a outputs an interpolation signal, which uses the interpolation value Gv computed based on Equation (1) as a signal value, to the subtraction unit 23a.

$$Gv=(G1+G2)/2 \qquad (1)$$

On the one hand, the horizontal interpolation computing unit 22b acquires from the memory 21b each color signal Gs of two pixels (see FIG. 9) adjacent in a lateral direction of the X pixel that is the G-missing pixel, and performs a horizontal interpolation process based on the following Equation (2) by using signal values G3 and G4 of the acquired each color signal Gs. In this way, the horizontal interpolation computing unit 22b computes a G-component interpolation value Gh at the X pixel. After that, the horizontal interpolation computing unit 22b outputs an interpolation signal, which uses the interpolation value Gh computed based on Equation (2) as a signal value, to the subtraction unit 23b.

$$Gh=(G3+G4)/2 \qquad (2)$$

On the other hand, the four-pixel average interpolation computing unit 22c acquires from the memory 21b each color signal Gs of four pixels (see FIG. 9) adjacent in a cross direction of the X pixel that is the G-missing pixel, and performs a four-pixel average interpolation process based on the following Equation (3) by using signal values G1 to G4 of the acquired each color signal Gs. In this way, the four-pixel average interpolation computing unit 22c computes a G-component interpolation value Ga at the X pixel. After that, the four-pixel average interpolation computing unit 22c outputs an interpolation signal, which uses the interpolation value Ga computed based on Equation (3) as a signal value, to the subtraction unit 23c.

$$Ga=(G1+G2+G3+G4)/2 \qquad (3)$$

In this case, the interpolation values Gv, Gh, and Ga described above are the signal values of interpolation signals different among interpolation process types. In detail, the interpolation value Gv is the signal value of the interpolation G signal Gi of the G-missing pixel computed by the vertical interpolation process, the interpolation value Gh is the signal value of the interpolation G signal Gi of the G-missing pixel computed by the horizontal interpolation process, and the interpolation value Ga is the signal value of the interpolation G signal Gi of the G-missing pixel computed by the four-pixel average interpolation process.

The subtraction units 23a to 23c function as a plurality of color-difference signal candidate computing units each of which computes a color-difference signal candidate that is a candidate of a difference between the signal of the color except the specified color and the signal of the specified color according to the first embodiment for its corresponding interpolation process type. Specifically, the subtraction unit 23a first acquires an interpolation signal having the interpolation value Gv of the vertical interpolation process from the vertical interpolation computing unit 22a, and acquires the color signal X t the G-missing pixel (X pixel) from the memory 21a. Next, the subtraction unit 23a subtracts the interpolation signal of the interpolation value Gv from the color signal X, thereby computing a color-difference signal X-Gv that is a color-difference signal candidate corresponding to the vertical interpolation process. After that, the subtraction unit 23a outputs the computed color-difference signal X-Gv to the memory 21c. Moreover, for example, the color-difference signals R-Gi and B-Gi corresponding to the vertical interpolation process are given as the color-difference signal X-Gv computed by the subtraction unit 23a.

On the one hand, the subtraction unit 23b first acquires an interpolation signal having the interpolation value Gh of the horizontal interpolation process from the horizontal interpolation computing unit 22b, and acquires the color signal X at the X pixel from the memory 21a. Next, the subtraction unit 23b subtracts the interpolation signal of the interpolation value Gh from the color signal X, thereby computing a color-difference signal X-Gh that is a color-difference signal candidate corresponding to the horizontal interpolation process. After that, the subtraction unit 23b outputs the computed color-difference signal X-Gh to the memory 21d. Moreover, for example, the color-difference signals R-Gi and B-Gi corresponding to the horizontal interpolation process are given as the color-difference signal X-Gh computed by the subtraction unit 23b.

On the other hand, the subtraction unit 23c first acquires an interpolation signal having the interpolation value Ga of the four-pixel average interpolation process from the four-pixel average interpolation computing unit 22c, and acquires the color signal XL from the low pass filter 24. Moreover, the color signal XL is a color signal that is obtained by band-limiting the color signal X of the X pixel output from the memory 21a by using the low pass filter 24. Next, the subtraction unit 23c subtracts the interpolation signal of the interpolation value Ga from the color signal XL, thereby computing a color-difference signal XL-Ga that is a color-difference signal candidate corresponding to the four-pixel average interpolation process. After that, the subtraction unit 23c outputs the computed color-difference signal XL-Ga to the memory 21e. Moreover, for example, the color-difference signals RL-Gi and BL-Gi corresponding to the four-pixel average interpolation process are given as the color-difference signal XL-Ga computed by the subtraction unit 23c.

The low pass filter 24 performs a band limiting process on signals X (or, the signals of the colors except the specified color in the first embodiment) stored in the memory 21a and outputs the color signal XL obtained by band-limiting the color signal X in a predetermined frequency bandwidth to the subtraction unit 23c. FIG. 10 is a pattern diagram illustrating a specific example of pixel positions on a Bayer array of color signals that are used for a band limiting process of the low pass filter. In FIG. 10, a specific example of pixel positions on a Bayer array of color signals that are used for a process performed by the G-variation computing unit 26 to be described below is illustrated.

Specifically, the low pass filter 24 acquires the color signals Rs and Bs of the X pixel that is a G-missing pixel from the memory 21a, performs the band limiting process on the acquired color signals Rs and Bs, and generates the color signals RL and BL. Moreover, the color signal RL is obtained by band-limiting the color signal Rs by using the band limiting process and the color signal BL is obtained by band-limiting the color signal Bs by using the band limiting process.

More specifically, as illustrated in FIG. 10, the low pass filter 24 computes XL(n, m) on the basis of the following Equation (4) by using X(n, m) that is the processing-target X pixel and X(n, m−2), X(n, m+2), X(n−2, m), and X(n+2, m) that are the same-type (the same color-component) X pixels located at the left, right, top and bottom of the X pixel. Moreover, XL(n, m) is obtained by band-limiting the processing-target X pixel and corresponds to the XL pixel described above. After that, the low pass filter 24 outputs the color signal XL (specifically, color signals RL and BL), on which the band limiting process is performed, to the subtraction unit 23c on the basis of Equation (4).

$$XL(n, m) = \alpha \times X(n, m) + \quad (4)$$
$$\beta \times \{X(n, m+2) + X(n, m-2) + X(n-2, m) + X(n+2, m)\}$$

In this case, "α and β" of Equation (4) are weighting factors by which the X pixel is approximated to a 45-degree diagonal-direction spatial frequency characteristic of a four peripheral G-pixel average. Moreover, "n" is a horizontal-direction coordinate value inside an image and "m" is a vertical-direction coordinate value inside the image. In other words, a pixel position inside the image is defined with a horizontal-direction coordinate value and a vertical-direction coordinate value.

The memories 21c to 21e function as a plurality of storage units that stores therein a color-difference signal candidate described above for each interpolation process type. Specifically, the memory 21c first sequentially acquires the color-difference signals X-Gv that are a color-difference signal candidate of the vertical interpolation process computed by the subtraction unit 23a, and stores therein the color-difference signal X-Gv for the predetermined number of pixels. After that, when the color-difference signals X-Gv for the predetermined number of pixels are stored, the memory 21c appropriately outputs the stored color-difference signals X-Gv to the color difference similarity computing unit 25a and the color difference selecting unit 29.

The memory 21d first sequentially acquires the color-difference signals X-Gh that are a color-difference signal candidate of the horizontal interpolation process computed by the subtraction unit 23b, and stores therein the color-difference signals X-Gh for the predetermined number of pixels. After that, when the color-difference signals X-Gh for the predetermined number of pixels are stored, the memory 21d appropriately outputs the stored color-difference signals X-Gh to the color difference similarity computing unit 25b and the color difference selecting unit 29.

The memory 21e first sequentially acquires the color-difference signals XL-Ga that are a color-difference signal candidate of the four-pixel average interpolation process computed by the subtraction unit 23c, and stores therein the color-difference signals XL-Ga, for the predetermined number of pixels. After that, when the color-difference signals XL-Ga for the predetermined number of pixels are stored, the memory 21e appropriately outputs the stored color-difference signals XL-Ga to the color difference similarity computing unit 25c and the color difference selecting unit 29.

In this way, the memories 21c to 21e obtain a delay until a color difference similarity computation process can be performed in a pixel area including the color-difference signals X-Gv, X-Gh, and XL-Ga for the predetermined number of pixels (for example, the number of pixels of five rows and five columns). Moreover, the color difference similarity computation process is realized by the color difference similarity computing units 25a to 25c to be described below.

Figures 13, 14:
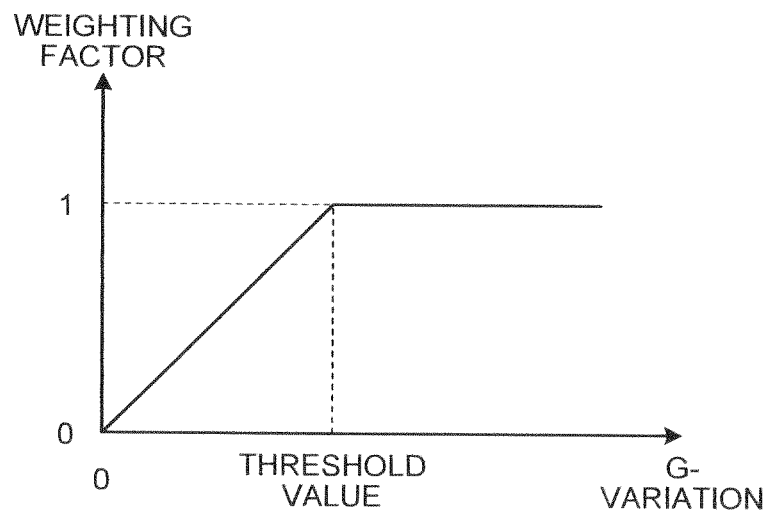
FIG. 13 is a pattern diagram illustrating a specific example of pixel positions on a Bayer array of color-difference signals that are used for a color difference similarity computation process corresponding to a four-pixel average interpolation process.
FIG. 14 is a pattern diagram illustrating a specific example of a relation between a G-variation and its weighting factor at the pixel position of a G-missing pixel.

Hereinafter, it will be more specifically explained about each operation of the memories 21c to 21e. FIG. 11 is a pattern diagram illustrating a specific example of pixel positions on a Bayer array of color-difference signals that are used for a color difference similarity computation process corresponding to the vertical interpolation process. FIG. 12 is a pattern diagram illustrating a specific example of pixel positions on a Bayer array of color-difference signals that are used for the color difference similarity computation process corresponding to the horizontal interpolation process. FIG. 13 is a pattern diagram illustrating a specific example of pixel positions on Bayer array of color-difference signals that are used for the color difference similarity computation process corresponding to the four-pixel average interpolation process.

More specifically, as illustrated in FIG. 11, the memory 21c acquires, for example, the color-difference signals X-Gv for the number of pixels of five rows and five columns from the subtraction unit 23a, and stores therein the acquired color-difference signals X-Gv for the number of pixels of five rows and five columns, in other words, (X-Gv)(n−2, m+2), (X-Gv)(n, m+2), (X-Gv)(n+2, m+2), (X-Gv)(n−1, m+1), (X-Gv)(n+1, m+1), (X-Gv)(n−2, m), (X-Gv)(n, m), (X-Gv)(n+2, m), (X-Gv)(n−1, m−1), (X-Gv)(n+1, m−1), (X-Gv)(n−2, m−2), (X-Gv)(n, m−2), (X-Gv)(n+2, m−2). After that, the memory 21c outputs all the stored color-difference signals X-Gv for the number of pixels of five rows and five columns to the color difference similarity computing unit 25a and outputs a processing-target color-difference signal (for example, color-difference signal (X-Gv)(n, m)) among all the color-difference signals X-Gv to the color difference selecting unit 29.

On the one hand, as illustrated in FIG. 12, the memory 21d acquires, for example, the color-difference signals X-Gh for the number of pixels of five rows and five columns from the subtraction unit 23b, and stores therein the acquired color-difference signals X-Gh for the number of pixels of five rows and five columns, in other words, (X-Gh)(n−2, m+2), (X-Gh)(n, m+2), (X-Gh)(n+2, m+2), (X-Gh)(n−1, m+1), (X-Gh)(n+1, m+1), (X-Gh)(n−2, m), (X-Gh)(n, m), (X-Gh)(n+2, m), (X-Gh)(n−1, m−1), (X-Gh)(n+1, m−1), (X-Gh)(n−2, m−2), (X-Gh)(n, m−2), (X-Gh)(n+2, m−2). After that, the memory 21d outputs all the stored color-difference signals X-Gh for the number of pixels of five rows and five columns to the color difference similarity computing unit 25b and outputs a processing-target color-difference signal (for example, color-difference signal (X-Gh)(n, m)) among all the color-difference signals X-Gh to the color difference selecting unit 29.

On the other hand, as illustrated in FIG. 13, the memory 21e acquires, for example, the color-difference signals XL-Ga for the number of pixels of five rows and five columns from the subtraction unit 23c, and stores therein the acquired color-difference signal XL-Ga for the number of pixels of five rows and five columns, in other words, (XL-Ga)(n−2, (XL-Ga)(n, m+2), (XL-Ga)(n+2, m+2), (XL-Ga)(n−1, m+1), (XL-Ga)(n+1, m+1), (XL-Ga)(n−2, m), (XL-Ga)(n, m), (XL-Ga)(n+2, m), (XL-Ga)(n−1, m−1), (XL-Ga)(n+1, m−1), (XL-Ga)(n−2, m−2), (XL-Ga)(n, m−2), (XL-Ga)(n+2, m−2). After that, the memory 21e outputs all the stored color-difference signals XL-Ga for the number of pixels of five rows and five columns to the color difference similarity computing unit 25c and output a processing-target color-difference signal (for example, color-difference signal (XL-Ga)(n, m)) among all the color-difference signals XL-Ga to the color difference selecting unit 29.

The color difference similarity computing units 25a to 25c function as a plurality of color difference similarity computing units that computes a similarity degree between the color-difference signal candidates for the interpolation process types, on the basis of the color-difference signal candidates for the interpolation process types stored in the memories 21c to 21e as described above.

Specifically, the color difference similarity computing unit 25a first acquires the color-difference signal candidates (color-difference signals X-Gv) for the predetermined number of pixels that are stored in the memory 21c. Next, the color difference similarity computing unit 25a computes a similarity degree between the color-difference signal candidates corresponding to the vertical interpolation process among the plurality of interpolation process types, on the basis of the acquired color-difference signal candidates for the predetermined number at pixels. For example, the color difference similarity computing unit 25a acquires the color-difference signals X-Gv for the number of pixels of five rows and five columns illustrated in FIG. 11, and computes a color difference similarity Sv(n, m) at X(n, m) that is the pixel position of the processing-target X pixel (G-missing pixel) on the basis of the following Equation (5) by using the acquired color-difference signals X-Gv for the number of pixels of five rows and five columns. After that, the color difference similarity computing unit 25a outputs the computed color difference similarity Sv(n, m) to the determining unit 27.

$$Sv(n,m)=Sv1(n,m)+Sv2(n,m) \quad (5)$$

In Equation (5), $Sv1(n,m)$ and $Sv2(n,m)$ can be computed by using the color-difference signals X-Gv for the predetermined number of pixels stored in the memory 21c. For example, when the color-difference signals X-Gv for the number of pixels of five rows and five columns illustrated in FIG. 11 are used, $Sv1(n,m)$ is computed on the basis of the following Equation (6) by using a color-difference signal at a middle G-missing pixel position and color-difference signals at eight outside peripheral G-missing pixel positions. $Sv2(n,m)$ is computed on the basis of the following Equation (7) by using color-difference signals at four inside peripheral G-missing pixel positions.

$$Sv1(n, m) = \{|(X - Gv)(n, m - 2) - (X - Gv)(n, m)| + \quad (6)$$
$$|(X - Gv)(n, m + 2) - (X - Gv)(n, m)|\} \times Wvc1 +$$
$$\{|(X - Gv)(n - 2, m - 2) - (X - Gv)(n - 2, m)| +$$
$$|(X - Gv)(n - 2, m + 2) - (X - Gv)(n - 2, m)| +$$
$$|(X - Gv)(n + 2, m - 2) - (X - Gv)(n + 2, m)| +$$
$$|(X - Gv)(n + 2, m + 2) - (X - Gv)(n + 2, m)|\} \times Wva1$$

$$Sv2(n, m) = \{|(X - Gv)(n - 1, m - 1) - (X - Gv)(n - 1, m + 1)| + \quad (7)$$
$$|(X - Gv)(n + 1, m - 1) - (X - Gv)(n + 1, m + 1)|\} \times Wv2$$

In Equations (6) and (7), Wvc1, Wva1, and Wv2 have a relation of Wvc1+2×Wva1=Wv2.

On the one hand, the color difference similarity computing unit 25b first acquires the color-difference signal candidates (color-difference signals X-Gh) for the predetermined number of pixels that are stored in the memory 21d. Next, the color difference similarity computing unit 25b computes a similarity degree between the color-difference signal candidates corresponding to the horizontal interpolation process among the plurality of interpolation process types, on the basis of the acquired color-difference signal candidates for the predetermined number of pixels. For example, the color difference similarity computing unit 25b acquires the color-difference signals X-Gh for the number of pixels of five rows and five columns illustrated in FIG. 12, and computes a color difference similarity Sh(n, m) at X(n, m) that is the pixel position of the processing-target X pixel (G-missing pixel) on the basis of the following Equation (8) by using the acquired color-difference signals X-Gh for the number of pixels of five rows and five columns. After that, the color difference similarity computing unit 25b outputs the computed color difference similarity Sh(n, m) to the determining unit 27.

$$Sh(n,m)=Sh1(n,m)+Sh2(n,m) \quad (8)$$

In Equation (8), $Sh1(n,m)$ and $Sh2(n,m)$ can be computed by using the color-difference signals X-Gh for the predetermined number of pixels that are stored in the memory 21d. For example, when the color-difference signals X-Gh for the number of pixels of five rows and five columns illustrated in FIG. 12 are used, $Sh1(n,m)$ is computed on the basis of the following Equation (9) by using a color-difference signal at the middle G-missing pixel position and color-difference signals of eight outside peripheral G-missing pixel positions. $Sh2(n,m)$ is computed on the basis of the following Equation (10) by using color-difference signals of four inside peripheral G-missing pixel positions.

$$Sh1(n, m) = \{|(X - Gh)(n - 2, m) - (X - Gh)(n, m)| + \quad (9)$$
$$|(X - Gh)(n + 2, m) - (X - Gh)(n, m)|\} \times Whc1 +$$
$$\{|(X - Gh)(n - 2, m - 2) - (X - Gh)(n, m - 2)| +$$
$$|(X - Gh)(n + 2, m - 2) - (X - Gh)(n, m - 2)| +$$
$$|(X - Gh)(n - 2, m + 2) - (X - Gh)(n, m + 2)| +$$
$$|(X - Gh)(n + 2, m + 2) - (X - Gh)(n, m + 2)|\} \times Wha1$$

$$Sh2(n, m) = \{|(X - Gh)(n - 1, m - 1) - (X - Gh)(n + 1, m - 1)| + \quad (10)$$
$$|(X - Gh)(n - 1, m + 1) - (X - Gh)(n + 1, m + 1)|\} \times Wh2$$

Moreover, in Equations (9) and (10), Whc1, Wha1, and Wh2 have a relation of Whc1+2×Wha1=Wh2.

On the other hand, the color difference similarity computing unit 25c first acquires the color-difference signal candidates (color-difference signals XL-Ga) for the predetermined number of pixels that are stored in the memory 21e. Next, the color difference similarity computing unit 25c computes a similarity degree between the color-difference signal candidates corresponding to the four-pixel average interpolation process among the plurality of interpolation process types, on the basis of the acquired color-difference signal candidates for the predetermined number of pixels. For example, the color difference similarity computing unit 25c acquires the color-difference signals XL-Ga for the number of pixels of five rows and five columns illustrated in FIG. 13, and computes a color or difference similarity Sa(n, m) at XL(n, m) that is the pixel position of the processing-target XL pixel (G-missing pixel) on the basis of the following Equation (11) by using the acquired color-difference signals XL-Ga for the number of pixels of five rows and five columns. After that, the color difference similarity computing unit 25c outputs the computed color difference similarity Sa(n, m) to the multiplication unit 23e.

$$Sa(n,m)=Sa1(n,m)+Sa2(n,m) \quad (11)$$

In Equation (11), Sa1($n,m$) and Sa2($n,m$) can be computed by using the color-difference signals XL-Ga for the predetermined number of pixels that are stored in the memory 21e. For example, when the color-difference signals XL-Ga for the number f pixels of five rows and five columns illustrated in FIG. 13 are used, Sa1($n,m$) is computed on the basis of the following Equation (12) by using a color-difference signal at the middle G-missing pixel position and color-difference signals at eight outside peripheral G-missing pixel positions. Sa2($n,m$) is computed on the basis of the following Equation (13) by using color-difference signals at four inside peripheral G-missing pixel positions.

$$Sa1(n, m) = \{|(XL-Ga)(n-2, m-2) - (XL-Ga)(n, m)| + \quad (12)$$
$$|(XL-Ga)(n, m-2) - (XL-Ga)(n, m)| +$$
$$|(XL-Ga)(n-2, m-2) - (XL-Ga)(n, m)| +$$
$$|(XL-Ga)(n-2, m) - (XL-Ga)(n, m)| +$$
$$|(XL-Ga)(n+2, m) - (XL-Ga)(n, m)| +$$
$$|(XL-Ga)(n-2, m+2) - (XL-Ga)(n, m)| +$$
$$|(XL-Ga)(n, m+2) - (XL-Ga)(n, m)| +$$
$$|(XL-Ga)(n+2, m+2) - (XL-Ga)(n, m)|\} \times Wa1$$

$$Sa2(n, m) = \{|(XL-Ga)(n-1, m-1) - (XL-Ga)(n+1, m+1)| + \quad (13)$$
$$|(XL-Ga)(n-1, m+1) - (XL-Ga)(n+1, m-1)|\} \times Wa2$$

Moreover, in Equations (12) and (13), Wa1 and Wa2 have a relation of 4×Wa1=Wa2.

The G-variation computing unit 26 computes a G-variation at the pixel position (X(n, m)) of the G-missing pixel on the basis of the color signal Gs that is a signal of a specified color of an image in the first embodiment and computes a G-variation weighting factor w(n, m) at the pixel position of the G-missing pixel on the basis of the computed G-variation.

Specifically, as illustrated in FIG. 10, the G-variation computing unit 26 computes the color signal Gs at each pixel position located at the vicinity of X(n, m) that is the G-missing pixel position, in other words, a G-variation GR(n, m) at the pixel position (X(n, m)) of the G-missing pixel on the basis of the following Equation (14) by using Gs(n−1, m+2), Gs(n+1, m+2), Gs(n−2, m+1), Gs(n, m+1), Gs(n+2, m+1), Gs(n−1, m), Gs(n−1), Gs(n−1), Gs(n, m−1), Gs(n+2, m−1), Gs(n−1, m−2), Gs(n+1, m−2). Moreover, the G-variation computing unit 26 reads the color signal Gs at each pixel position located at the vicinity of the G-missing pixel position from storage information of the memory 21b described above.

$$GR(n,m)=Dc(n,m)/P+\{Dr1(n,m)+Dr2(n,m)+Dr3(n,m)+Dr4(n,m)\}/Q \quad (14)$$

In Equation (14), $Dc(n,m)=|Gs(n-1,m)-Gs(n,m-1)+Gs(n+1,m)-Gs(n,m+1)|+|Gs(n-1,m)+Gs(n,m-1)-Gs(n+1,m)-Gs(n,m+1)|+|Gs(n-1,m)-Gs(n,m-1)-Gs(n+1,m)+Gs(n,m+1)|$, $Dr1(n,m)=|Gs(n-2,m-1)-Gs(n-1,m-2)+Gs(n,m-1)-Gs(n-1,m)|+|Gs(n-2,m-1)+Gs(n-1,m-2)-Gs(n,m-1)-Gs(n-1,m)|+|Gs(n-2,m-1)-Gs(n-1,m-2)-Gs(n,m-1)+Gs(n-1,m)|$, $Dr2(n,m)=|Gs(n,m-1)-Gs(n+1,m-2)+Gs(n+2,m-1)-Gs(n+1,m)|+|Gs(n,m-1)+Gs(n+1,m-2)-Gs(n+2,m-1)-Gs(n+1,m)|+|Gs(n,m-1)-Gs(n+1,m-2)-Gs(n+2,m-1)+Gs(n+1,m)|$, $Dr3(n,m)=|Gs(n,m+1)-Gs(n+1,m)+Gs(n+2,m+1)-Gs(n+1,m+2)|+|Gs(n,m+1)+Gs(n+1,m)-Gs(n+2,m+1)-Gs(n+1,m+2)|+|Gs(n,m+1)-Gs(n+1,m)-Gs(n+2,m+1)+Gs(n+1,m+2)|$, $Dr4(n,m)=|Gs(n-2,m+1)-Gs(n-1,m)+Gs(n,m+1)-Gs(n-1,m+2)|+|Gs(n-2,m+1)+Gs(n-1,m)-Gs(n,m+1)-Gs(n-1,m+2)|+|Gs(n-2,m+1)-Gs(n-1,m)-Gs(n,m+1)+Gs(n-1, m+2)|$.

Moreover, P and Q are a variation weighting factor (arbitrary positive constant) between the middle pixel position (X(n, m)) and its peripheral pixel positions.

Moreover, the G-variation computing unit 26 computes a G-variation GR(n, m) at the pixel position (X(n, m)) of the G-missing pixel on the basis of Equation (14), and then computes a G-variation weighting factor w(n, m) corresponding to the G-variation GR(n, m).

FIG. 14 is a pattern diagram illustrating a specific example of a relation between a G-variation and its weighting factor at the pixel position of the G-missing pixel. Specifically, the G-variation computing unit 26 computes the G-variation weighting factor w(n, m) corresponding to the computed G-variation GR(n, m) on the basis of a correlation between the G-variation and the weighting factor as illustrated in FIG. 14. After that, the P-variation computing unit 26 outputs the G-variation weighting factor w(n, m) to the memory 21f.

In this case, as illustrated in FIG. 14, the G-variation weighting factor w(n, m) computed by the G-variation computing unit 26 is "1" in a G-variation range of which the value is not less than a predetermined threshold value that is previously In a G-variation range of which the value is less than the threshold value, the G-variation weighting factor decreases along with the reduction of the G-variation GR(n, m).

Moreover, the G-variation computing unit 26 may compute the G-variation weighting factor w(n, m) on the basis of a predetermined computation expression corresponding to the correlation between the G-variation and the weighting factor illustrated in FIG. 14, or may previously have a lookup table that indicates the correlation between the G-variation and the weighting factor illustrated in FIG. 14 and convert the G-variation GR(n, m) into the G-variation weighting factor w(n, m) on the basis of the lookup table.

The memory 21f stores therein the G-variation weighting factor w(n, m) computed by the G-variation computing unit 26 in an updatable manner and outputs the stored G-variation weighting factor w(n, m) to the multiplication unit 23e. Every time the G-variation weighting factor w(n, m) computed by the G-variation computing unit 26 is acquired, the memory 21f updates the G-variation weighting factor w(n, m) to store the latest G-variation weighting factor w(n, m).

The multiplication unit 23e first acquires a color difference similarity Sa(n, m) corresponding to the four-pixel average interpolation process among the plurality of interpolation process types from the color difference similarity computing unit 25c, and reads variation weighting factor w(n, m) described above from memory 21f. Next, the multiplication unit 23e multiplies the color difference similarity Sa(n, m) by the G-variation weighting factor w(n, m) and outputs a color difference similarity Sa(n, m)×w(n, m) after the multiplication process to the determining unit 27.

In this case, because the multiplication unit 23e multiplies the G-variation weighting factor w(n, m) that is not more than one by the color difference similarity Sa(n, m) of the color-difference signal XL-Ga computed by using the interpolation value Ga, the color difference similarity Sa(n, m)×w(n, m) after the multiplication process has a small value as compared with the color difference similarity Sa(n, m) before the multiplication process when the G-variation GR(n, m) is less than a predetermined threshold value. For this reason, it is expected that the color difference similarity Sa(n, m)×w(n, m) has a small value (in other words, the minimum value) as compared with other color difference similarities Sv(n, m) and Sh(n, m) in the determining unit 27. As a result, the determining unit 27 to be described below cannot select a G-component vertical interpolation process or horizontal interpolation process but can positively select a G-component four-pixel average interpolation process, in such a manner that an influence by noises is cancelled in a flat pixel area having a small G-variation.

The determining unit 27 functions as a type determining unit that determines an interpolation process type of a signal of a specified color at a missing pixel position that does not have a signal of the specified color among the pixel positions of the plurality of color signals that forms an image. Specifically, the determining unit 27 selectively determines one of the vertical interpolation process, the horizontal interpolation process, and the four-pixel average interpolation process as the interpolation process type of the color signal Gs at the pixel position of the G-missing pixel (X pixel or XL pixel) at which the color signal Gs that is a signal of specified color in the first embodiment is missed.

More specifically, the determining unit 27 acquires the color difference similarity Sv(n, m) corresponding to the vertical interpolation process from the color difference similarity computing unit 25a and acquires the color difference similarity Sh(n, m) corresponding to the horizontal interpolation process from the color difference similarity computing unit 25b. Moreover, determining unit 27 acquires the color difference similarity Sa(n, m)×w(n, m) corresponding to the four-pixel average interpolation process from the multiplication unit 23e. Next, the determining unit 27 performs a comparison process on the color difference similarities Sv(n, m), Sh(n, m), and Sa(n, m)×w(n, m) different among interpolation process types and selects the minimum color difference similarity among the color difference similarities. Subsequently, the determining unit 27 selectively determines an interpolation process type (in the embodiment, one of vertical interpolation process, horizontal interpolation process, and four-pixel average interpolation process) corresponding to the selected minimum color difference similarity as the interpolation process type of the color signal Gs at the G-missing pixel position. After that, the determining unit 27 outputs type information, which indicates the interpolation process type of the color signal Gs at the G-missing pixel position determined in this way, to the memory 21g.

In this case, when the color difference similarity Sv(n, m) is selected in accordance with the comparison process, the determining unit 27 determines the vertical interpolation process corresponding to the color difference similarity Sv(n, m) as an interpolation process type of the G-missing pixel position. In this case, the determining unit 27 outputs type information Tv(n, m), which indicates that the interpolation process type of the G-missing pixel positron (n, m) is the vertical interpolation process, the memory 21g.

On the one hand, when the color difference similarity Sh(n, m) is selected in accordance with the comparison process, the determining unit 27 determines the horizontal interpolation process corresponding to the color difference similarity Sh(n, m) as an interpolation process type of the G-missing pixel position. In this case, the determining unit 27 outputs type information Th(n, m), which indicates that the interpolation process type of the G-missing pixel position (n, m) is the horizontal interpolation process, to the memory 21g.

On the other hand, when the color difference similarity Sa(n, m)×w(n, m) is selected in accordance with the comparison, process, the determining unit 27 determines the four-pixel average interpolation process corresponding to the color difference similarity Sa(n, m)×w(n, m) as an interpolation process type of the G-missing pixel position. In this case, the determining unit 27 outputs type information Ta(n, m), which indicates that the interpolation process type of the G-missing pixel position (n, m) is the four-pixel average interpolation process, to the memory 21g.

Moreover, when a plurality of minimum values exists by performing the comparison process on the color difference similarities Sv(n, m), Sh(n, m), and Sa(n, m)×w(n, m) of the interpolation process types described above, the determining unit 27 preferentially selects a color difference similarity in order of, for example, the color difference similarity Sa(n, m)×w(n, m), the color difference similarity Sh(n, m), and the color difference similarity Sv(n, m) in accordance with a predetermined precedence.

The memory 21g functions as a type information storage unit that stores, for each missing pixel position, type information indicating an interpolation process type after the determining unit 27 performs the determination. Specifically, the memory 21g acquires type information, which indicates the interpolation process type of the G-missing pixel position, from the determining unit 27, and sequentially stores the acquired type information for each the G-missing pixel position on the two-dimensional array.

More specifically, the memory 21g sequentially acquires type information determined by the determining unit 27 from the type information. Tv(n, m), Th(n, m), and Ta(n, m) for the interpolation process types, and sequentially stores acquired type information (in other words, any of the type information. Tv(n, m), Th(n, m), and Ta(n, m)) for each the G-missing pixel position on the Bayer array. In this way, the memory 21g stores type information for interpolation process types for a predetermined number of lines (for example, three lines or more). Moreover, the type information for the predetermined number of lines stored in the memory 21g is read by the type information modifying unit 28.

The type information modifying unit 28 functions as type modifying unit that modifies an interpolation process type after the determining unit 27 performs the determination on the basis of the interpolation process types of multiple peripheral missing pixel positions located at the vicinity of the missing pixel position of the signal of the specified color. Specifically, when the memory 21g stores type information of interpolation process types for the predetermined number of lines (for example, three lines or more), the type information modifying unit 28 reads the type information for the predetermined number of lines.

Moreover, in the first embodiment, the type information for the predetermined number of lines read from the memory 21g by the type information modifying unit 28 includes at least one of the type information Tv(n, m), Th(n, m), and Ta(n, m) described above.

Next, the type information modifying unit 28 selects the type information of the processing-target G-missing pixel position from the read type information for the predetermined number of lines, and determines the state of remaining type information other than the processing target, in other words, each type information of the plurality G-missing pixel positions (hereinafter, "peripheral G-missing pixel positions") located at the vicinity of the processing-target G-missing pixel position.

Subsequently, the type information modifying unit 28 determines whether the type information of the processing-target G-missing pixel position is erroneous determination information, on the basis of the determination result of identification information of the plurality of peripheral G-missing pixel positions. When it is erroneous determination information, the type information modifying unit 28 modifies an interpolation process type indicated by the type information. For example, when interpolation process types by identification information of the plurality of peripheral G-missing pixel positions are the same and type information of the processing-target G-missing pixel position and identification information of the peripheral G-missing pixel position indicate different interpolation process types, the type information modifying unit 28 modifies the type information of the processing-target G-missing pixel position into type information indicating the same interpolation process type as the peripheral G-missing pixel position.

After that, the type information modifying unit 28 outputs the type information after modification, which is obtained by modifying the interpolation process type as described above, to the memory 21g. In this case, the memory 21g acquires the type information after modification from the type information modifying unit 28 and overwrites the type information after modification at the same storage position to update the existing type information at the same storage positions into the type information after modification. Moreover, it will be below explained about the detailed information of the type information modifying unit 28.

The color difference selecting unit 29 functions as a color-difference signal selecting unit that selects a color-difference signal between a signal of a specified color and a signal of a color except the specified color in correspondence with the interpolation process type of the missing pixel position of a signal of the specified color described above, and selects a color-difference signal between a signal of the specified color and a signal of a color except the specified color in correspondence with the interpolation process type after modification when the interpolation process type is modified.

Specifically, the color difference selecting unit 29 first acquires the color-difference signals X-Gv, X-Gh, and XL-Ga, which are color-difference signal candidates different among interpolation process types, from the memories 21c to 21e. Moreover, the color difference selecting unit 29 acquires type information after the determination is performed by the determining unit 27 from the memory 21g. On the other hand, when the type information modifying unit 28 modifies the type information of the processing-target G-missing pixel position, the color difference selecting unit 29 acquires the type information modified by the type information modifying unit 28 (in other words, updated by the memory 21g) from the memory 21g.

Moreover, the color-difference signals X-Gv, X-Gh, and XL-Ga acquired from the memories 21c to 21e and the type information after determination or updating acquired from the memory 21g correspond to the same processing-target pixel position (G-missing pixel position).

Next, when the type information after the determination is performed by The determining unit 27 is acquired, the color difference selecting unit 29 selects an output-target color-difference signal from the plurality of color-difference signals X-Gv, X-Gh, and XL-Ga, in correspondence with the interpolation process type of the G-missing pixel position indicated by the acquired type information. On the other hand, when the type information after updating is acquired, the color difference selecting unit 29 selects an output-target color-difference signal from the plurality of color-difference signals X-Gv, X-Gh, and XL-Ga, in correspondence with the interpolation process type of the G-missing pixel position indicated by the acquired type information, in other words, the interpolation process type after the modification is performed by the type information modifying unit 28.

After that, the color difference selecting unit 29 outputs the color-difference signal X-Gi selected in correspondence with the interpolation process type of the processing-target G-missing pixel position as described above to the subtraction unit 23d and the simultaneous interpolation processing unit 30 (see FIG. 1). Specifically, the color difference selecting unit 29 outputs the output-target color-difference signal X-Gi to the simultaneous interpolation processing unit 30 in a raster scanning sequence (from upper-left to lower-right of the two-dimensional array illustrated in FIG. 3). Moreover, in the first embodiment, the output-target color-difference signal X-Gi is one of the color-difference signals X-Gv, X-Gh, and XL-Ga.

The subtraction unit 23d functions as an interpolation signal generating unit that generates an interpolation signal of a signal of a specified color at the missing pixel position of a signal of the specified color on the basis of the color-difference signal selected based on the type information of the interpolation process type as described above. Specifically, the subtraction unit 23d first acquires the color signal X (color signals Rs and Bs) at the processing-target G-missing pixel position from the memory 21a and acquires the color-difference signal X-Gi at the processing-target G-missing pixel position from the color difference selecting unit 29.

In this case, the color-difference signal X-Gi is a color-difference signal selected by the color difference selecting unit 29 on the basis of the type information after determination or updating at the processing-target G-missing pixel position as described above. In the present embodiment, the color-difference signal X-Gi is one of the color-difference signals X-Gv, X-Gh, and XL-Ga.

Next, the subtraction unit 23d subtracts the color-difference signal X-Gi output from the color difference selecting unit 29 from the color signal X output from the memory 21a, thereby computing the interpolation G signal Gi at the processing-target G-missing pixel position. For example, when the color-difference signal X-Gv is acquired, the subtraction unit 23d subtracts the color-difference signal X-Gv from the color signal X output from the memory 21a, thereby generating the interpolation G signal Gi having the interpolation value Gv. When the color-difference signal X-Gh is acquired, the subtraction unit 23d subtracts the color-difference signal X-Gh from the color signal X output from the memory 21a, thereby generating the interpolation G signal Gi having the interpolation value Gh. Moreover, when the color-difference signal XL-Ga is acquired, the subtraction unit 23d subtracts the color-difference signal XL-Ga from the color signal X output from the memory 21a, thereby generating the interpolation. G signal Gi having the computed interpolation value (X-(XL-Ga)) by the subtraction process.

After that, the subtraction unit 23d outputs the interpolation G signal Gi computed as described above to the simultaneous interpolation processing unit 30 (see FIG. 1). In this case, the interpolation G signal Gi output from the subtraction unit 23d and the color signal Gs, output from the memory 21b are synthesized like a two-dimensional array as illustrated in FIG. 4, and are output to the simultaneous interpolation processing unit 30 as two-dimensional color signals G that do not have a missing color component in a raster scanning sequence (from upper-left to lower-right of the two-dimensional array illustrated in FIG. 4).

Figure 15:
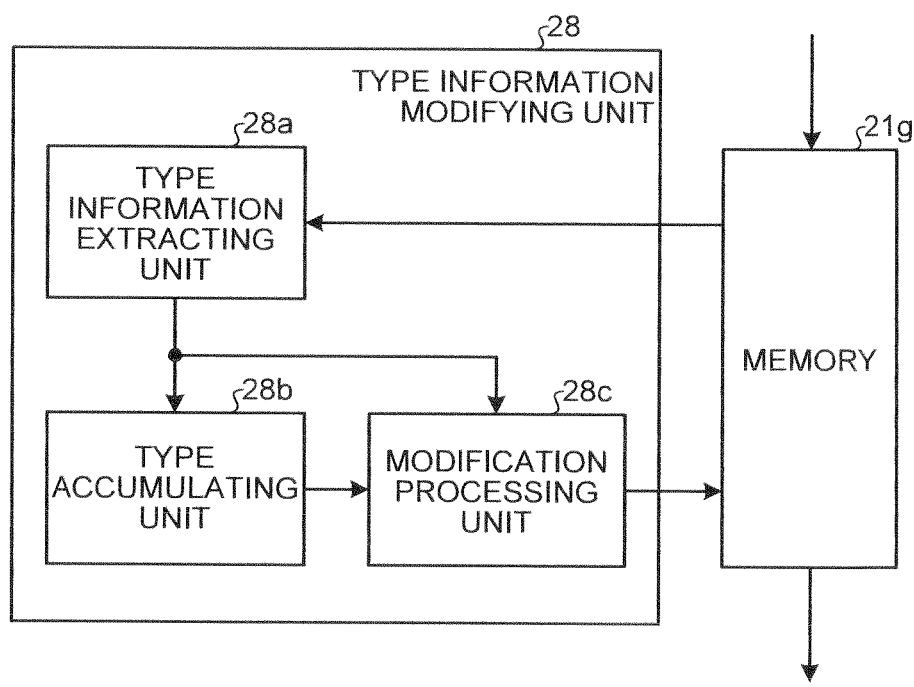
FIG. 15 is a block diagram typically illustrating an example configuration of a type information modifying unit according to the first embodiment of the present invention.
Figure 17:
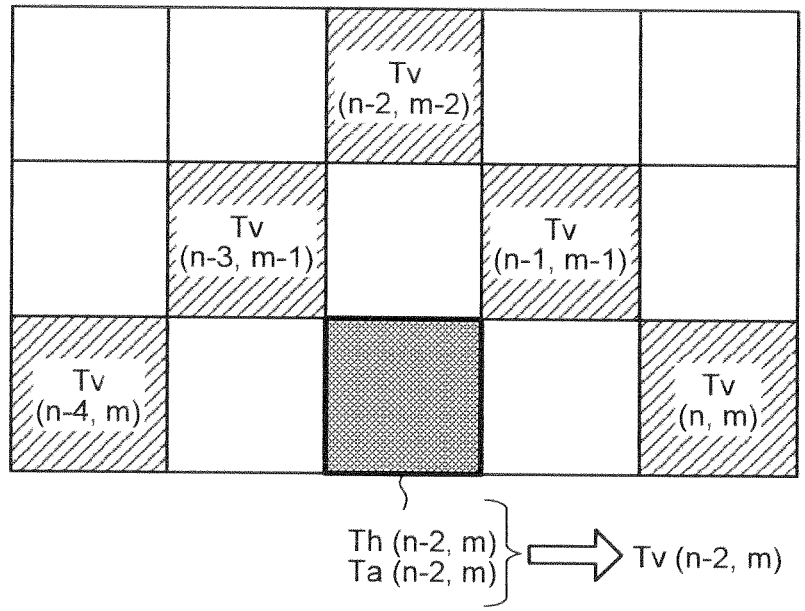
FIG. 17 is a pattern diagram illustrating a specific example of type information of a peripheral G-missing pixel position when the type information of a processing-target G-missing pixel position is modified to the type information of a vertical interpolation process.
Figure 18:
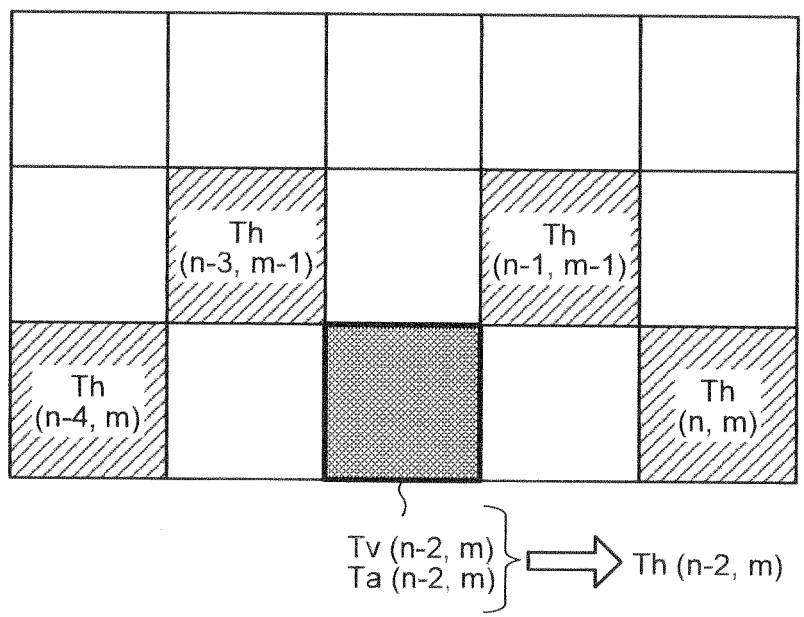
FIG. 18 is a pattern diagram illustrating a specific example of type information of a peripheral G-missing pixel position when the type information of a processing-target G-missing pixel position is modified to the type information of a horizontal interpolation process.

Next, it will be explained in detail about the type information modifying unit 28 described above. FIG. 15 is a block diagram typically illustrating an example configuration of the type information modifying unit according to the first embodiment of the present invention. FIG. 16 is a pattern diagram illustrating a specific example of a pixel area from which type information used for a modification process of an interpolation process type is extracted. FIG. 17 is a pattern diagram illustrating a specific example of type information of a peripheral G-missing pixel position when the type information of a processing-target G-missing pixel position is modified to the type information of the vertical interpolation process. FIG. 18 is a pattern diagram illustrating a specific example of type information of a peripheral G-missing pixel position when the type information of a processing-target G-missing pixel position is modified to the type information of the horizontal interpolation process.

As illustrated in FIG. 15, the type information modifying unit 28 according to the first embodiment includes a type information extracting unit 28a, a type accumulating unit 28b, and a modification processing unit 28c. The type information extracting unit 28a extracts the type information of an interpolation process type after determination of the color signal Gs at the processing-target G-missing pixel position, in other words, an interpolation process type after the determination is performed by the determining unit 27 and multiple pieces of type information that indicate interpolation process types of the plurality of peripheral G-missing pixel positions located at the vicinity of the processing-target G-missing pixel position, from the type information of interpolation process types for the G-missing pixel positions stored in the memory 21g.

Specifically, the type information extracting unit 28a extracts the type information of the processing-target G-missing pixel position and the type information of the plurality of peripheral G-missing pixel positions located at the vicinity of the G-missing pixel position, from the type information of the interpolation process types for the predetermined number of lines stored in the memory 21g. For example, the type information extracting unit 28a extracts type information T(n−2, m) of the processing-target G-missing pixel position and type information T(n−4, m), T(n, m), T(n−3, m−1), T(n−1, m−1), and T(n−2, m−2) of the peripheral G-missing pixel positions, from pixel areas (see FIG. 16) for three lines stored in the memory 21g.

In this case, the type information T(n, m) illustrated in FIG. 16 is one of type information Tv(n, m), Th(n, m), and Ta(n, m) different among the interpolation process types described above and is type information (in other words, the type information of the interpolation process type that has the highest color difference similarity in the predetermined number of pixel areas by the determination) corresponding to the minimum value among the plurality of color difference similarities on which a comparison process is performed by the determining unit 27. This is also similar in the case of the other G-missing pixel positions. Moreover, the type information T(n, m) among the type information of the G-missing pixel positions illustrated in FIG. 16 is the latest type information output from the determining unit 27.

In other words, the type information extracting unit extracts the type information T(n−2, m) of the G-missing pixel (see thick-frame part of FIG. 16) located at the left side of the latest type information T(n, m) by two pixels as processing-target type information, and simultaneously extracts type information T(n−4, m), T(n, m), T(n−3, m−1), T(n−1, m−1), and T(n−2, m−2) of the peripheral G-missing pixel positions (see hatched parts of FIG. 16) of the processing-target type information T(n−2, m).

After that, the type information extracting unit 28a outputs the processing-target type information T(n−2, m) among six type information extracted as described above to the modification processing unit 28c and outputs the peripheral type information T(n−4, m), T(n, m), T(n−3, m−1), T(n−1, m−1), and T(n−2, m−2) to the type accumulating unit 28b.

The type accumulating unit 28b functions as a count processing unit that counts the number of interpolation process types of the plurality of peripheral G-missing pixel positions indicated by multiple pieces of type information located at the vicinity of the processing-target type information. Specifically, the type accumulating unit 28b first acquires the type information of the plurality of G-missing pixel positions located at the vicinity of the processing-target type information from the type information extracting unit 28a. Next, the type accumulating unit 28b counts the acquired multiple pieces of type information as the same type.

For example, when five type information T(n−4, m), T(n, m), T(n−3, m−1), T(n−1, m−1), and T(n−2, m−2) are acquired from the type information extracting unit 28a, the type accumulating unit 28b counts the number of the same interpolation process type on the five type information T(n−4, m), T(n, m), T(n−1, m−1), and T(n−2, m−2).

Moreover, interpolation process types assumed in the first embodiment are three types of "vertical interpolation process", "horizontal interpolation process", and "four-pixel average interpolation process". The five type information T(n−4, m), T(n, m), T(n−3, m−1), T(n−1, m−1), and T(n−2, m−2) are counted by any of three types of interpolation process types.

In the counting process of type information, the type accumulating unit 28b first counts four type information (for example, type information T(n, m), T(n−4, m), T(n−3, m−1), and T(n−1, m−1)) among five type information. Subsequently, when the four type information are all counted as "vertical interpolation process", the type accumulating unit 28b determines whether one remaining type information (for example, type information T(n−2, m−2)) is type information indicating "vertical interpolation process".

In this case, when the one remaining type information is type information indicating "vertical interpolation process", in other words, when the total five type information T(n−4, m), T(n, m), T(n−3, m−1), T(n−1, m−1), and T(n−2, m−2) are all counted as "vertical interpolation process", the type accumulating unit 28b outputs type determination information indicating that the processing-target type information T(n−2, m) should be "vertical interpolation process" to the modification processing unit 28c.

On the one hand, when the four type information are all counted as "horizontal interpolation process", in other words, when the total four type information T(n−4, m), T(n, m), T(n−3, m−1), and T(n−1, m−1) are all counted as "horizontal interpolation process", the type accumulating unit 28b outputs type determination information indicating that the processing-target type information T(n−2, m) should be "horizontal interpolation process" to the modification processing unit 28c. On the other hand, when a result other than the counting process result described above is obtained, the type accumulating unit 28b outputs type determination information indicating "undefined" to the modification processing unit 28c.

The modification processing unit 28c determines whether an interpolation process type after determination of the color signal Gs at the processing-target G-missing pixel position, in other words, an interpolation process type after the determination is performed by the determining unit 27 is a falsely-determined type, on the basis of the counting process result by the type accumulating unit 28b described above. When it is a falsely-determined interpolation process type, the modification processing unit 28c modifies the interpolation process type and transmits type information after modification indicating the modified interpolation process type to the memory 21g.

Specifically, the modification processing unit 28c quires the processing-target type information T(n−2 m) from the type information extracting unit 28a, and acquires type determination information for the processing-target type information T(n−2, m) from the type accumulating unit 28b. Moreover, the type determination information is the counting process result performed by the type accumulating unit 28b and includes the determination result of an interpolation process type to be indicated by the processing-target type information T(n−2, m). Next, the modification processing unit 28c modifies the interpolation process type of the processing-target type information T(n−2, m) on the basis of the type determination information performed by the type accumulating unit 28b.

For example, when the type determination information performed by the type accumulating unit 28b is information indicating "vertical interpolation process", five type information located at the vicinity of the processing-target type information T(n−2, m) are type information Tv(n−4, m), Tv(n, m), Tv(n−3, m−1), Tv(n−1, m−1), and Tv(n−2, m−2) that indicate a vertical interpolation process type as illustrated in FIG. 17.

In this state, the modification processing unit 28c checks an interpolation process type indicated by the processing-target type information T (n−2, m). When the processing-target interpolation process type is a process other than the vertical interpolation process, in other words, when a processing target is type information Th(n−2, m) of "horizontal, interpolation process" or type information Ta(n−2, m) of "four-pixel average interpolation process", the modification processing unit 28c modifies the processing-target type information T(n−2, m) into type information Tv(n−2, m) of "vertical interpolation process". In this way, the modification processing unit 28c modifies the interpolation process type of the processing-target type information T(n−2, m) into "vertical interpolation process" that is an original process.

On the one hand, when the type determination information performed by the type accumulating unit 28b described above is information indicating "horizontal interpolation process", four type information located at the vicinity of the processing-target type information. T(n−2, m) are type information Th(n−4, m), Th(n, m), Th(n−3, m−1), and Th(n−1, m−1) indicating a horizontal interpolation process type as illustrated in FIG. 18.

In this state, the modification processing unit 28c checks an interpolation process type indicated by the processing-target type information T(n−2, m). when the processing-target interpolation process type is a process other than the horizontal interpolation process, in other words, when a processing target is the type information. Tv(n−2, m) of "vertical interpolation process" or the type information Ta(n−2, m) of "four-pixel average interpolation process", the modification processing unit 28c modifies the processing-target type information T(n−2, m) into the type information Th(n−2, m) of "horizontal interpolation process". In this way, the modification processing unit 28c modifies the interpolation process type of the processing-target type information T(n−2, m) into "horizontal interpolation process" that is an original process.

In this case, because, although the type information T(n−2, m−2) of the G-missing pixel at the coordinate position (n−2, m−2) is also information indicating a horizontal interpolation process type, the type information T(n−2, m−2) is away from the coordinate position (n−2, m) of the processing-target G-missing pixel in a longitudinal direction, the type information T(n−2, m−2) is not used for the modification process of the modification processing unit 28c. This reason is that it is desirable to use the type information of a pixel position close to the processing-target type information T(n−2, m) as much as possible in a lateral direction. Moreover, the type information T(n−2, m−2) may be used in the modification process of a horizontal interpolation process type.

On the other hand, when the type determination information performed by the type accumulating unit 28b described above is information indicating "undefined", the modification processing unit 28c maintains the state of the processing-target type information T(n−2, m) regardless of an interpolation process type indicated by the processing-target type information T(n−2, m). In other words, when the type determination information indicating "undefined is acquired", the modification processing unit 28c maintains the interpolation process type indicated by the processing-target type information T(n−2, m) without modification.

As described above, the modification processing unit 28c modifies or maintains the interpolation process type of the processing-target type information T(n−2, m) on the basis of the type determination information output from the type accumulating unit 28b, and then outputs the type information T(n−2, m) after the modification process to the memory 21g. In this case, the memory 21g acquires the type information T(n−2, m) after modification from the type information modifying unit 28, and overwrites the type information T(n−2, m) after modification at the same storage position to update the existing type information of the same storage position to the type information T(n−2, m) after modification. Moreover, the type information after updating stored in the memory 21g is used as one past type information in the future modification process performed by the type information modifying unit 28.

Moreover, in the type information modifying unit 28, when the four type information T(n, m), T(n−4, m), T(n−3, m−1), and T(n−1, m−1) are all counted as "four-pixel average interpolation process" in the counting process described above, the type accumulating unit 28b may determine whether one remaining type information T(n−2, m−2) is type information indicating "four-pixel average interpolation process".

Specifically, when the one remaining type information described above is type information indicating "four-pixel average interpolation process", in other words, when total five type information T(n−4, m), T(n, m), T(n−3, m−1), T(n−1, m−1), and T(n−2, m−2) are all counted as "four-pixel average interpolation process", the type accumulating unit 28b may output type determination information indicating that the processing-target type information T(n−2, m) should ho "four-pixel average interpolation process" to the modification processing unit 26c.

On the other hand, the modification processing unit 28c checks an interpolation process type indicated by the processing-target type information T(n−2, m). When the processing-target interpolation process type is a process other than the four-pixel average interpolation process, in other words, when a processing target is the type information Tv(n−2, m) of "vertical interpolation process" or the type information Th(n−2, m) of "horizontal interpolation process", the modification processing unit 28c may modify the processing-target type information T(n−2, m) into the type information Ta(n−2, m) of "four-pixel average interpolation process".

Figure 19:
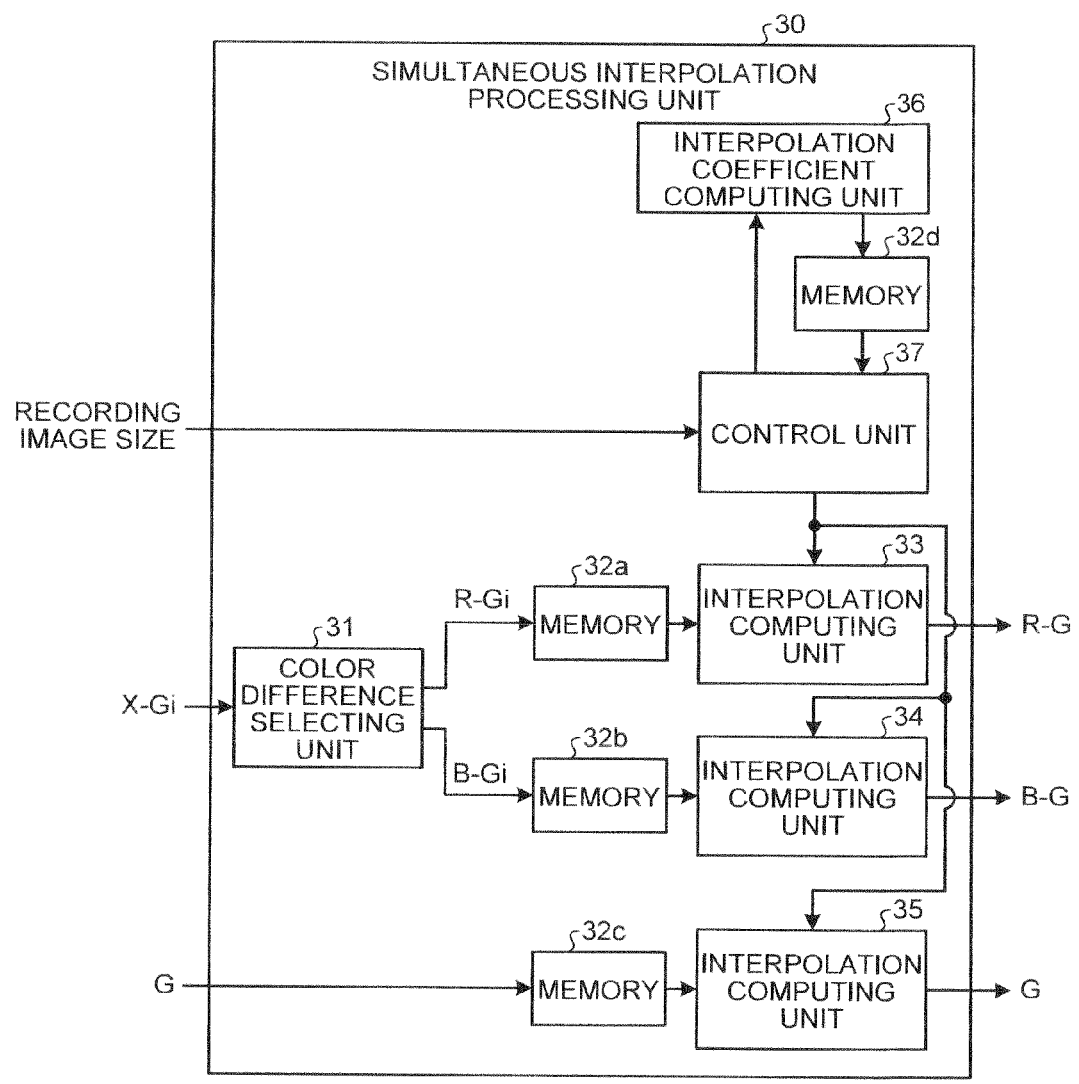
FIG. 19 is a block diagram typically illustrating an example configuration of a simultaneous interpolation processing unit of the image processing apparatus according to the first embodiment of the present invention.

Next, it will be explained in detail about the simultaneous interpolation processing unit 30 (see FIG. 1) of the image processing apparatus 2 according to the first embodiment of the present invention. FIG. 19 is a block diagram typically illustrating an example configuration of the simultaneous interpolation processing unit of the image processing apparatus according to the first embodiment of the present invention. As illustrated in FIG. 19, the simultaneous interpolation processing unit 30 according to the first embodiment includes a color difference selecting unit 31, memories 32a to 32d, interpolation computing units 33 to 35, an interpolation coefficient computing unit 36, and a control unit 37.

The color difference selecting unit 31 first acquires the color-difference signals X-Gi output from the G-interpolation color difference computing unit 20 described above. In this case, the color-difference signals X-Gi are signals having a two-dimensional array structure of the color-difference signals R-Gi and B-Gi illustrated in FIG. 3. Next, the color difference selecting unit 31 divides the color-difference signals X-Gi having a two-dimensional array structure into the color-difference signal R-Gi and the color-difference signal B-Gi. After that, the color difference selecting unit 31 respectively outputs the obtained color-difference signals R-Gi and B-Gi to the memories 32a and 32b.

The memory 32a first sequentially acquires the color-difference signals R-Gi output from the color difference selecting unit 31, and stores the color-difference signals R-Gi by the number of lines required for an interpolation process to a predetermined position. After that, when the color-difference signals R-Gi for the required number of lines are stored, in other words, when the start of an interpolation process to a predetermined position can be performed, the memory 32a outputs the stored color-difference signals R-Gi for the required number of lines to the interpolation computing unit 33.

The memory 32b first sequentially acquires the color-difference signals B-Gi output from the color difference selecting unit 31, and stores the color-difference signals R-Gi by the number of lines required for an interpolation process to a predetermined position. After that, when the color-difference signals B-Gi for the required number of lines are stored, in other words, when the start of the interpolation process to the predetermined position can be performed, the memory 32b outputs the stored color-difference signals B-Gi for the required number of lines to the interpolation computing unit 34.

The memory 32c first acquires the color signals G output from the G-interpolation color difference computing unit 20 described above. Specifically, the color signals G are signals having a two-dimensional array structure of the interpolation G signal Gi and the color signal Gs illustrated in FIG. 4. The memory 32c sequentially acquires the color signals G from the simultaneous interpolation processing unit 30 in a raster scanning sequence, and stores the color signals G by the number of lines required for an interpolation process to a predetermined position. After that, when the color signals G for the required number of lines are stored, in other words, when the start of the interpolation process to the predetermined position can be performed, the memory 32c outputs the stored color signals G for the required number of lines to the interpolation computing unit 35.

The interpolation computing unit 33 first acquires the color-difference signals R-Gi for the required number of lines from the memory 32a, and acquires an interpolation filter coefficient from the control unit 37. Next, the interpolation computing unit 33 computes a color-difference signal R-G that is an interpolation pixel on the basis of the color-difference signals R-Gi for the required number of lines and the interpolation filter coefficient. After that, the interpolation computing unit 33 outputs the computed color-difference signal R-G to the RGB computing unit 40 (see FIG. 1).

The interpolation computing unit 34 first acquires the color-difference signals B-Gi for the required number of lines from the memory 32b, and acquires an interpolation filter coefficient from the control unit 37. Next, the interpolation computing unit 34 computes a color-difference signal B-G that is an interpolation pixel on the basis of the color-difference signals B-Gi for the required number of lines and the interpolation filter coefficient. After that, the interpolation computing unit 34 outputs the computed color-difference signal B-G to the RGB computing unit 40 (see FIG. 1).

The interpolation computing unit 35 first acquires the color signals G for the required number of lines from the memory 32c, and acquires an interpolation filter coefficient from the control unit 37. Next, the interpolation computing unit 35 computes a color signal G that is an interpolation pixel on the basis of the color signals G for the required number of lines and the interpolation filter coefficient. After that, the interpolation computing unit 35 outputs the computed color signal G to the RGB computing unit 40 (see FIG. 1).

The control unit 37 first acquires a recording image size determined by the user from a system controller (not illustrated), and instructs the interpolation coefficient computing unit 36 to compute a pixel position and its interpolation filter coefficient for triggering an interpolation process corresponding to the recording image size. In this case, the interpolation coefficient computing unit 36 is controlled in accordance with the instruction of the control unit 37, and computes a pixel position (interpolation pixel position) for triggering an interpolation process corresponding to the recording image size and an interpolation filter coefficient corresponding to the interpolation pixel position. Subsequently, the interpolation coefficient computing unit 36 outputs the computation result of the interpolation pixel position and interpolation filter coefficient the memory 32d. The memory 32d stores therein the interpolation filter coefficient in accordance with the interpolation pixel position. After that, the control unit 37 reads out the interpolation filter coefficient stored in the memory 32d in accordance with the interpolation pixel position and outputs the read interpolation filter coefficient to the interpolation computing units 33 to 35.

Moreover, in the configuration of the simultaneous interpolation processing unit 30 described above, it has been explained about the case where the interpolation filter coefficient is computed at the time point at which the recording image size is input. However, the present invention is not limited to this. Interpolation filter coefficients corresponding to plural kinds of recording image sizes may be previously stored in the memory 32d. In this case, the interpolation coefficient computing unit 36 described above is not required, and thus the control unit 37 reads out an interpolation filter coefficient corresponding to the recording image size from a coefficient lookup table that consists of the plurality of interpolation filter coefficients previously stored in the memory 32d in response to the designation of a recording image size by the user, and supplies the read interpolation filter coefficient to the interpolation computing units 33 to 35.

On the other hand, the simultaneous interpolation process that is performed by the simultaneous interpolation processing unit 30 described above has been explained by using the change of the size of image as an example. When the size of image is not changed, the switching of the interpolation filter coefficient may not be particularly performed. Moreover, for example, different interpolation filter coefficients may be used for the color signal G and the color-difference signals R-G and B-G described above.

Moreover, when different interpolation filter coefficients are used for the color signal G and the color-difference signals R-G and B-G described above, a false color around an edge portion can be reduced by particularly employing frequency characteristics obtained by limiting the frequency band of the color-difference signals R-G and B-G.

In this case, the interpolation computation process performed by the interpolation computing units 33 to 35 described above is, for example, performed on 8×8 pixel areas illustrated in FIGS. 5 to 7, and is performed to create a pixel at the position that is obtained by the shift of ½ pixel position in horizontal and vertical directions as an example of designating the size of image of the same resolution as that of an imaging device of the imaging unit 1.

A convolution filter such as a Lanczos filter can be used an example of an interpolation filter that is used for the interpolation computation process. A vertical-direction one-dimensional filter process is performed on the result of a one-dimensional filter process processed in a horizontal direction, and thus an interpolation pixel can be computed. Moreover, the one-dimensional filters can be replaced with two-dimensional filters.

Figure 20:
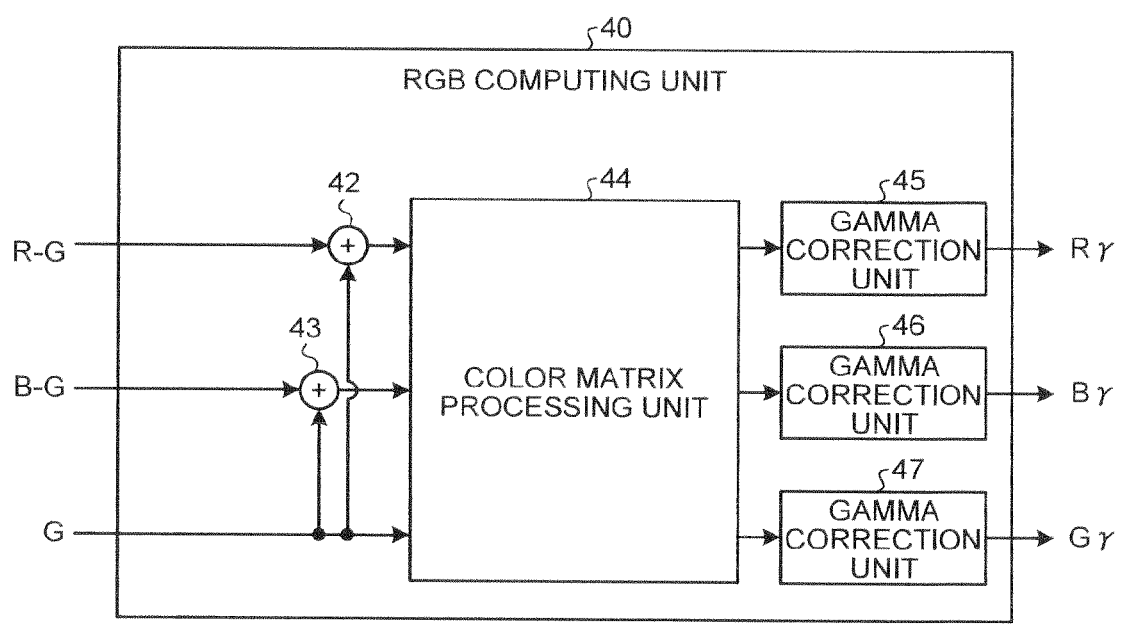
FIG. 20 is a block diagram typically illustrating an example configuration of an RGB computing unit of the image processing apparatus according to the first embodiment of the present invention.

Next, it will be explained in detail about the RGB computing unit 40 (see FIG. 1) of the image processing apparatus 2 according to the first embodiment of the present invention. FIG. 20 is a block diagram typically illustrating an example configuration of the RGB computing unit of the image processing apparatus according to the first embodiment of the present invention. As illustrated in FIG. 20, the RGB computing unit 40 according to the first embodiment includes addition units 42 and 43, a color matrix processing unit 44, and gamma correction units 45 to 47.

The addition unit 42 first acquires the color-difference signal R-G and the color signal G computed by the simultaneous interpolation processing unit 30 for each pixel position. Next, the addition unit 42 performs an addition process on the color-difference signal R-G and the color signal G of the same pixel position to compute an R-component color signal R for each pixel position.

The addition unit 43 first acquires the color-difference signal B-G and the color signal G computed by the simultaneous interpolation processing unit 30 for each pixel position. Next, the addition unit 43 performs an addition process on the color-difference signal B-G and the color signal G of the same pixel position to compute a B-component color signal B for each pixel position.

In this case, it is expected that the color signal of each color component of R, G, and B at the same pixel position can be restored in accordance with each process of the addition units 42 and 43. The restored color signal of each color component of R, G, and B is input into the color matrix processing unit 44. The color matrix processing unit 44 converts, for example, each restored color signal of R, G, and B into a predetermined color-space signal such as sRGB. Moreover, each color signal of R, G, and B converted by the color matrix processing unit 44 is, for example, a 12-bit linear signal.

The gamma correction units 45 to 47 performs a gamma correction process on each the color signal of R, G, and B converted by the color matrix processing unit 44. Specifically, the gamma correction unit 45 performs a gamma correction process on the R-component color signal converted by the color matrix processing unit 44 to generate an R-component color signal Rγ after a gamma correction. The gamma correction unit 46 performs the gamma correction process on the B-component color signal converted by the color matrix processing unit 44 to generate a B-component color signal Bγ after the gamma correction. The gamma correction unit 47 performs the gamma correction process on the G-component color signal converted by the color matrix processing unit 44 to generate a G-component color signal Gγ after the gamma correction.

In this case, the color signals Rγ, Gγ, and Bγ after the gamma correction process that is performed by the gamma correction units 45 to 47 are color signals that are obtained by converting the number of bits of each color signal of R, G, and B before the gamma correction into, for example, eight bits. The gamma correction units 45 to 47 respectively output the color signals Rγ, Gγ, and Bγ after the gamma correction process to the output processing unit 50 (see FIG. 1).

Figure 21:
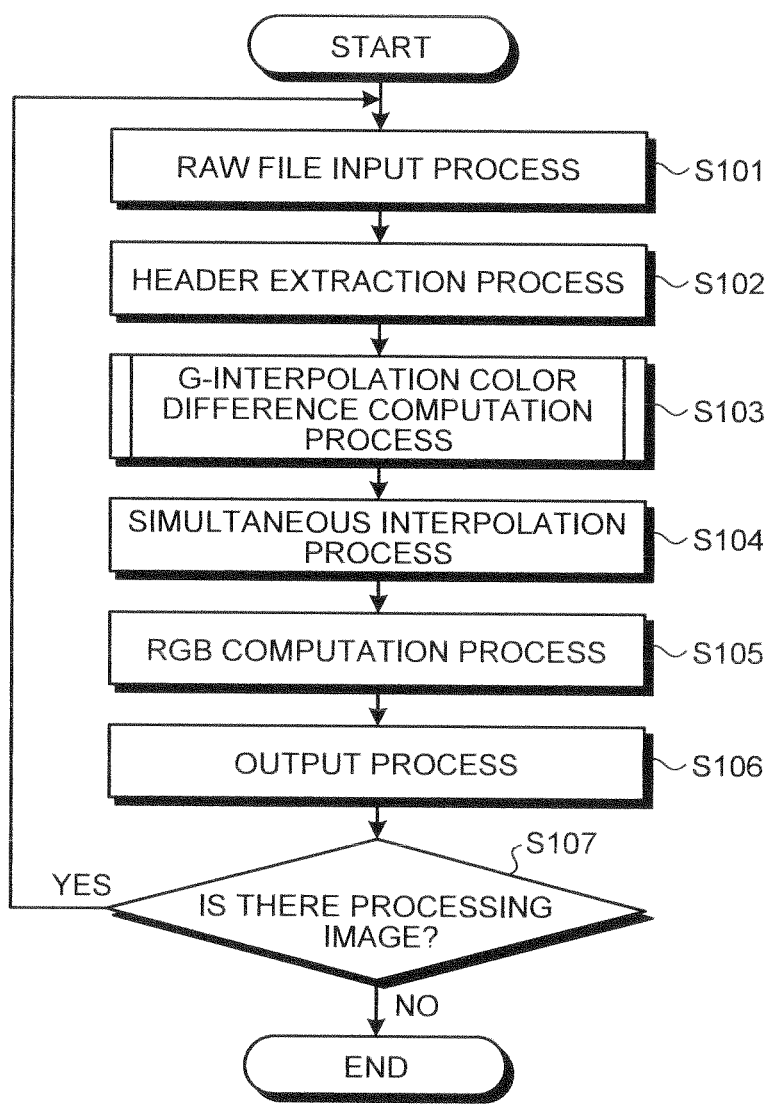
FIG. 21 is a flowchart illustrating the processing procedure of the image processing apparatus according to the first embodiment of the present invention.

Next, it will be explained about operations based on a software process of the image processing apparatus 2 according to the first embodiment of the present invention. FIG. 21 a flowchart illustrating the processing procedure of the image processing apparatus according to the first embodiment of the present invention. Moreover, the image processing apparatus 2 according to the first embodiment can perform various types of image processing on the basis of a hardware process as described above. The image processing apparatus 2 can further operate on the basis of a software process performed by a computer that reads an image processing program recorded in a computer-readable recording medium such as a semiconductor memory, CD-ROM, DVD, or a magnetic disk.

In other words, as illustrated in FIG. 21, the image processing apparatus 2 first performs a RAW file input process on an image captured by the imaging unit 1 (Step S101). At Step S101, when a desired file name among a plurality of RAW files saved in a computer is designated by a user, the image processing apparatus 2 acquires a RAW file corresponding to the specified file name. Moreover, according to the first embodiment, a plurality of RAW files consisting of pixels of color signals Rs, Gs, and Bs of color components forming the image captured by the imaging unit 1 is saved in the computer.

Next, the image processing apparatus 2 performs a header extraction process on the RAW file (Step S102). At Step S102, the image processing apparatus 2 extracts header information of the RAW file acquired in the processing procedure of Step S101, and acquires attribute information such as a size, the number of gradation levels, color filter array information, an image capturing condition, and a color matrix coefficient of the RAW file on the basis of the extracted header information.

Next, the image processing apparatus 2 performs a G-interpolation color difference computation process on the RAW file (Step S103). At Step S103, the image processing apparatus 2 performs an interpolation value computation process of a G-component color signal at a G-missing pixel position and a color-difference signal computation process of the G-missing pixel position based on the G-component color signal, on the basis of the attribute information of the RAW file acquired at the processing procedure of Step S102.

After that, the image processing apparatus 2 performs a simultaneous interpolation process on a predetermined same position (Step S104). At Step S104, the image processing apparatus 2 performs an interpolation process of using a plurality of peripheral pixels located at the vicinity of the predetermined same position on the basis of a color signal G and a color-difference signal X-Gi computed in the processing procedure of Step S103, and computes a color signal G and color-difference signals R-G and B-G of the same position.

Next, the image processing apparatus 2 performs an RGB computation process for computing a color signal of each color component of R, G, and B (Step S105). At Step S105, the image processing apparatus 2 performs an addition process on the color signal G and the color-difference signals R-G and B-G on which the interpolation process is performed at the same position in the processing procedure of Step S104 to restore an R-component color signal and a B-component color signal. Then, the image processing apparatus 2 converts the color signal of each color component of the obtained R, G, and B into, for example, a predetermined color space such as sRGB by using a color matrix process, and then performs a gamma correction process on each color signal after the conversion process to obtain color signals $R\gamma$, $G\gamma$, and $B\gamma$ of color components converted into, for example, eight bits.

Next, the image processing apparatus 2 performs an output process on image data (Step S106). At Step S106, the image processing apparatus 2 converts the color signals $R\gamma$, $G\gamma$, and $B\gamma$ of color components acquired in the processing procedure of Step S105 into YUV-format signals, and further converts the YUV-format signals into compressed data that is obtained by performing a high-efficiency compression encoding process such as JPEG or MPEG on the signals. The image processing apparatus 2 transmits the compressed data to the output unit 3 as an image file (in other words, output image data) after a development process.

After that, the image processing apparatus 2 determines the presence or absence of a processing image that is designated by the user (Step S107). At Step S107, the image processing apparatus 2 determines whether an unprocessed image file designated by the user remains. When it remains, in other words, when a processing image designated by the user exists (Step S107: Yes), the image processing apparatus 2 returns the process control to Step S101 described above to repeat the processing procedure of Step S101.

On the other hand, the image processing apparatus 2 determines whether an unprocessed image file designated by the user remains at Step S107. When it does not remain, in other words, when a processing image designated by the user does not exist (Step S107: No), the image processing apparatus 2 terminates the process.

Figure 22:
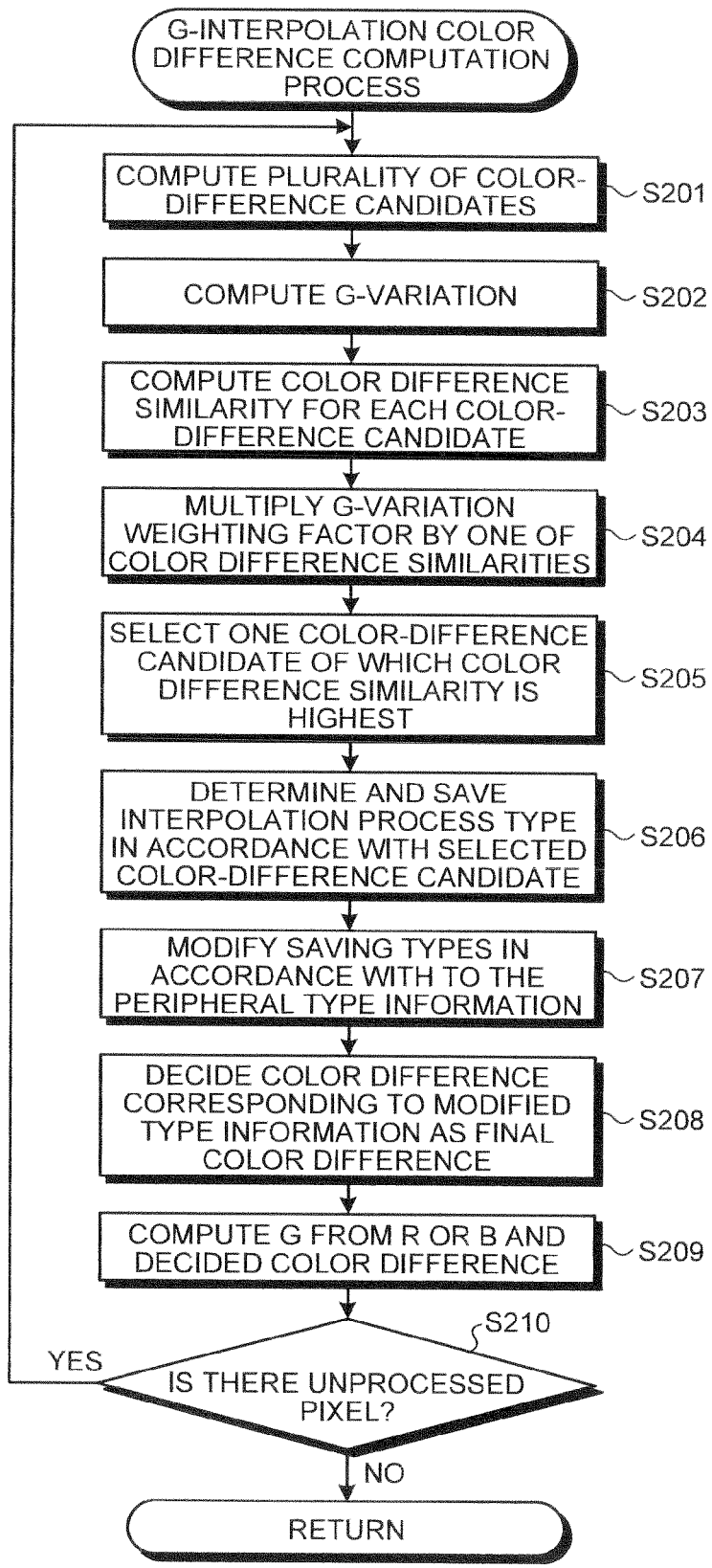
FIG. 22 is a flowchart illustrating the processing procedure of a G-interpolation color difference computation process that is performed by the image processing apparatus according to the first embodiment of the present invention.

Next, it will be explained in detail about the G-interpolation color difference computation process of Step S103 described above. FIG. 22 is a flowchart illustrating the processing procedure of the G-interpolation color difference computation process that is performed by the image processing apparatus according to the first embodiment of the present invention.

As illustrated in FIG. 22, when the processing procedure of Step S103 described above is executed, the image processing apparatus 2 according to the first embodiment first computes a plurality of color-difference candidates different among interpolation process types (Step S201).

At Step S201, the image processing apparatus 2 computes interpolation values for interpolation process types at the G-missing pixel position, in other words, an interpolation value Gv (see Equation (1)) according to a vertical interpolation process, an interpolation value Gh (see Equation (2)) according to a horizontal interpolation process, and an interpolation value Ga (see Equation (3)) according to a four-pixel average interpolation process, on the basis of the RAW file acquired in the processing procedure of Step S101 and the attribute information acquired at the processing procedure of Step S102 illustrated in FIG. 21.

Subsequently, the image processing apparatus 2 computes color-difference signals X-Ga, X-Gh, and XL-Ga that are the plurality of color-difference candidates among different interpolation process types, on the basis of a color signal X and the interpolation values Gv, Gh, and Ga for interpolation process types computed in this way. The image processing apparatus 2 saves the obtained plurality of color-difference signals X-Ga, X-Gh, and XL-Ga in a memory.

Next, the image processing apparatus 2 computes a G-variation at the G-missing pixel position (Step S202). At Step S202, the image processing apparatus 2 computes a G-variation at the G-missing pixel position by using G-component color signals at the peripheral pixels of the G-missing pixel position on the basis of Equation (14) described above. The image processing apparatus 2 saves the computed G-variation in the memory.

Next, the image processing apparatus 2 computes a color difference similarity for each color-difference candidate computed in the processing procedure of Step S201 (Step S203). At Step S203, the image processing apparatus 2 computes color difference similarities Sv(n, m), Sh(n, m), and Sa(n, m) between the same-type color-difference signals at the processing-target G-missing pixel position and the plurality of peripheral G-missing pixel positions located at the vicinity of the G-missing pixel position in accordance with Equations (5), (8), and (11), on the basis of the color-difference signal candidates, in other words, the color-difference signals X-Gv, X-Gh, and XL-Ga for interpolation process types saved in the memory in the processing procedure of Step S201.

Next, the image processing apparatus 2 multiplies a G-variation weighting factor by one of the difference similarities computed in the processing procedure of Step S203 (Step S204). At Step S204, the image processing apparatus 2 multiplies a G-variation weighting factor w(n, m) decided based on the G-variation of the same position by the color difference similarity Sa(n, m), which is computed in an interpolation process suitable for the flat color signal G, that is, the four-pixel average interpolation process that does not have directional dependence, among the color difference similarities Sv(n, m), Sh(n, m), and Sa(n, m) for interpolation process types computed based on Equations (5), (8), and (11) described above. In this way, the image processing apparatus 2 computes a new color difference similarity Sa(n, m)×w(n, m) corresponding to the four-pixel average interpolation process.

After that, the image processing apparatus 2 selects one color-difference candidate of which the color difference similarity for an interpolation process type is the highest (Step S205). At Step S205, the image processing apparatus 2 performs a comparison process on the three color difference similarities Sv(n, m), Sh(n, m), and Sa(n, m)×w(n, m) computed as described above, selects the minimum color difference similarity from the three color difference similarities, and selects one color-difference signal corresponding to the selected color difference similarity from the color-difference signals X-Gv, X-Gh, and XL-Ga for interpolation process types.

Next, the image processing apparatus 2 determines and saves an interpolation process type in accordance with the color-difference candidate selected in the processing procedure of Step S205 (Step S206). AT Step S206, the image processing apparatus 2 determines an interpolation process type corresponding to the color-difference signal (in other words, one of color-difference signals X-Gv, X-Gh, and XL-Ga) that is the color-difference candidate selected in the processing procedure of Step S205, and saves type information indicating the determined interpolation process type in the memory.

Specifically, the image processing apparatus 2 saves type information Tv(n, m) indicating the vertical interpolation process corresponding to the color-difference signal X-Gv in the memory when the color-difference signal X-Gv is selected as a color-difference candidate and saves type information Th(n, m) indicating the horizontal interpolation process corresponding to the color-difference signal X-Gh in the memory when the color-difference signal X-Gh is selected as a color-difference candidate. Moreover, when the color-difference signal XL-Ga is selected as a color-difference candidate, the image processing apparatus 2 saves type information Ta(n, m) indicating the four-pixel average interpolation process corresponding to the color-difference signal XL-Ga in the memory.

Next, the image processing apparatus 2 modifies saving types for the predetermined number of lines saved in the memory in the processing procedure of Step S206 in accordance with to the peripheral type information (Step S207). At Step S207, the image processing apparatus 2 first reads out the processing-target type information and multiple pieces of type information that are located at the vicinity of the type information from type information for the predetermined number of lines saved in the memory.

Subsequently, when the array state of the read type information is the specified array state as illustrated in FIGS. 17 and 18, the image processing apparatus 2 modifies the processing-target type information into type information of an interpolation process having the same type as the peripheral type information. The image processing apparatus 2 overwrites the type information after modification at the same storage position. On the other hand, when the array state of the read type information is not the specified array state, the image processing apparatus 2 maintains the state (interpolation process type) of the processing-target type information.

After that, the image processing apparatus 2 decides a color-difference candidate corresponding to the modified type information according to the processing procedure of Step S207 as a final color difference (Step S208). At Step S208, the image processing apparatus 2 again selects a color-difference signal corresponding to the interpolation process type indicated by the type information after the modification process in the processing procedure of Step S207 from the three color-difference signals X-Gv, X-Gh, and XL-Ga that are color-difference candidates for interpolation process types described above, and decides the again selected color-difference signal as the final color-difference signal.

Next, the image processing apparatus 2 computes a G-component color signal on the basis of the color signal at the G-missing pixel position, in other words, the R-component color signal R or the B-component color signal B and the color-difference signal decided in the processing procedure of Step S206 (Step S209). At Step S209, the image processing apparatus 2 subtracts the color-difference signal (one of color-difference signals X-Gv, X-Gh, and XL-Ga) finally decided in the processing procedure of Step S208 from the color signal X of the G-missing pixel position, thereby generating an interpolation G signal Gi that is the G-component interpolation signal at the G-missing pixel position. Subsequently, the image processing apparatus 2 outputs the color signals G having a two-dimensional array structure (see FIG. 4) that are obtained by synthesizing the generated interpolation G signal Gi and the color signal Gs.

After that, the image processing apparatus 2 determines the presence or absence of an unprocessed G-missing pixel position (Step S210). When an unprocessed pixel exists (Step S210: Yes), the image processing apparatus 2 returns the process control to Step S201 described above to repeat the processing procedure after Step S201. On the other hand, when an unprocessed pixel does not exist at Step S210 (Step S210: No), the image processing apparatus 2 terminates the G-interpolation color difference computation process and returns the process control to Step S103 illustrated in FIG. 21.

As explained above, according to the first embodiment of the present invention, the image processing apparatus determines an interpolation process type at a G-missing pixel position at which a G-component color signal, which is a signal of a specified color among pixel positions of a plurality of color signals that forms an image, is missed, modifies the interpolation process type after determination on the basis of interpolation process types of plurality of peripheral G-missing pixel positions arrayed in the vicinity of the G-missing pixel position, selects a color-difference signal at the G-missing pixel position in correspondence with the interpolation process type after modification, and generates a G-component interpolation signal at the G-missing pixel position on the basis of the selected the color-difference signal. For this reason, the image processing apparatus can accurately modify the interpolation process type at the G-missing pixel position once determined based on color difference similarities of the G-missing pixel position and the peripheral pixels in accordance with each interpolation process type of the plurality of peripheral G-missing pixel positions and can select an optimum color-difference signal at the G-missing pixel position in correspondence with the interpolation process type after modification. In this way, the image processing apparatus can generate an optimum G-component interpolation signal at the G-missing pixel position. As a result, the image processing apparatus can accurately modify false determination for an interpolation process type of a missing color component of a processing-target pixel position included in a captured image and can perform a demosaic process, in which the maintenance of resolution and chroma saturation and the reduction of local false color are compatible with each other, on the captured image.

Moreover, the present invention has a circular configuration that the image processing apparatus updates the type information of the interpolation process type after modification accurately modified in accordance with each interpolation process type of the plurality of peripheral G-missing pixel positions as type information of the same G-missing pixel position and uses an interpolation process type according to the type information after updating for a modification process of an interpolation process type of another G-missing pixel position. For this reason, the image processing apparatus can reduce a false color in a wider pixel area in addition to a false color occurring within a pixel area of the captured image like isolated points. Moreover, the present invention may have a noncircular configuration that the image processing apparatus performs the modification process for an interpolation process type described above without using a past modification process result.

First Alternative Example of First Embodiment

Next, it will be explained about the first alternative example of the first embodiment of the present invention. In the first embodiment described above, it has been explained about the case where the image processing apparatus modifies an interpolation process type of a processing-target G-missing pixel position on the basis of a counting process result of interpolation process types of a plurality of peripheral G-missing pixel positions located at the vicinity of the processing-target G-missing pixel position. In the first alternative example, the image processing apparatus modifies an interpolation process type of the processing-target G-missing pixel position on the basis of array patterns of interpolation process types of the plurality of peripheral G-missing pixel positions.

Figure 23:
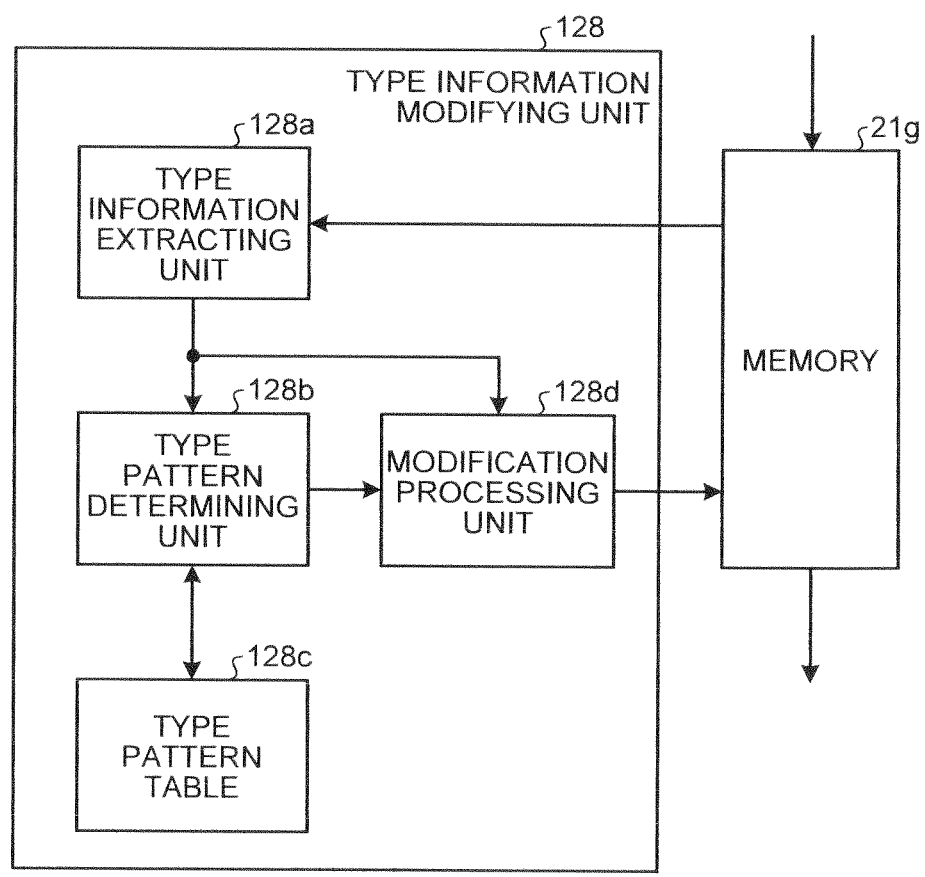
FIG. 23 is a block diagram typically illustrating an example configuration of the type information modifying unit of the image processing apparatus according to a first alternative example of the first embodiment of the present invention.

FIG. 23 is a block diagram typically illustrating an example configuration of a type information modifying unit 128 of an image processing apparatus according to the first alternative example of the first embodiment of the present invention. As illustrated in FIG. 23, the type information modifying unit 128 according to the first alternative example includes a type information extracting unit: 128a, a type pattern determining unit 128b, a type pattern table 128c, and a modification processing unit 128d, in place of the type information extracting unit 28a, the type accumulating unit 28b, and the modification processing unit 28c of the type information modifying unit 28 according to the first embodiment. Moreover, a G-interpolation color difference computing unit according to the first alternative example includes the type information modifying unit 128 in place of the type information modifying unit 28 of the G-interpolation color difference computing unit 20 according to the first embodiment. The other configuration is the same as that of the first embodiment and the same components have the same reference numbers.

The type information extracting unit 128a acquires an interpolation process type after determination of the color signal Gs at the processing-target G-missing pixel position, in other words, the type information of an interpolation process type after the determination is performed by the determining unit 27 and the multiple pieces of type information indicating interpolation process types of the plurality of peripheral G-missing pixel positions located at the vicinity of the processing-target G-missing pixel position, from type information for interpolation process types for the G-missing pixel positions stored in the memory 21g.

Specifically, the type information extracting unit 128a first extracts the type information of the processing-target G-missing pixel position and the type information of the plurality of peripheral G-missing pixel positions located at the vicinity of the processing-target G-missing pixel position, from type information for interpolation process types for the predetermined number of lines stored in the memory 21g.

Figure 24:
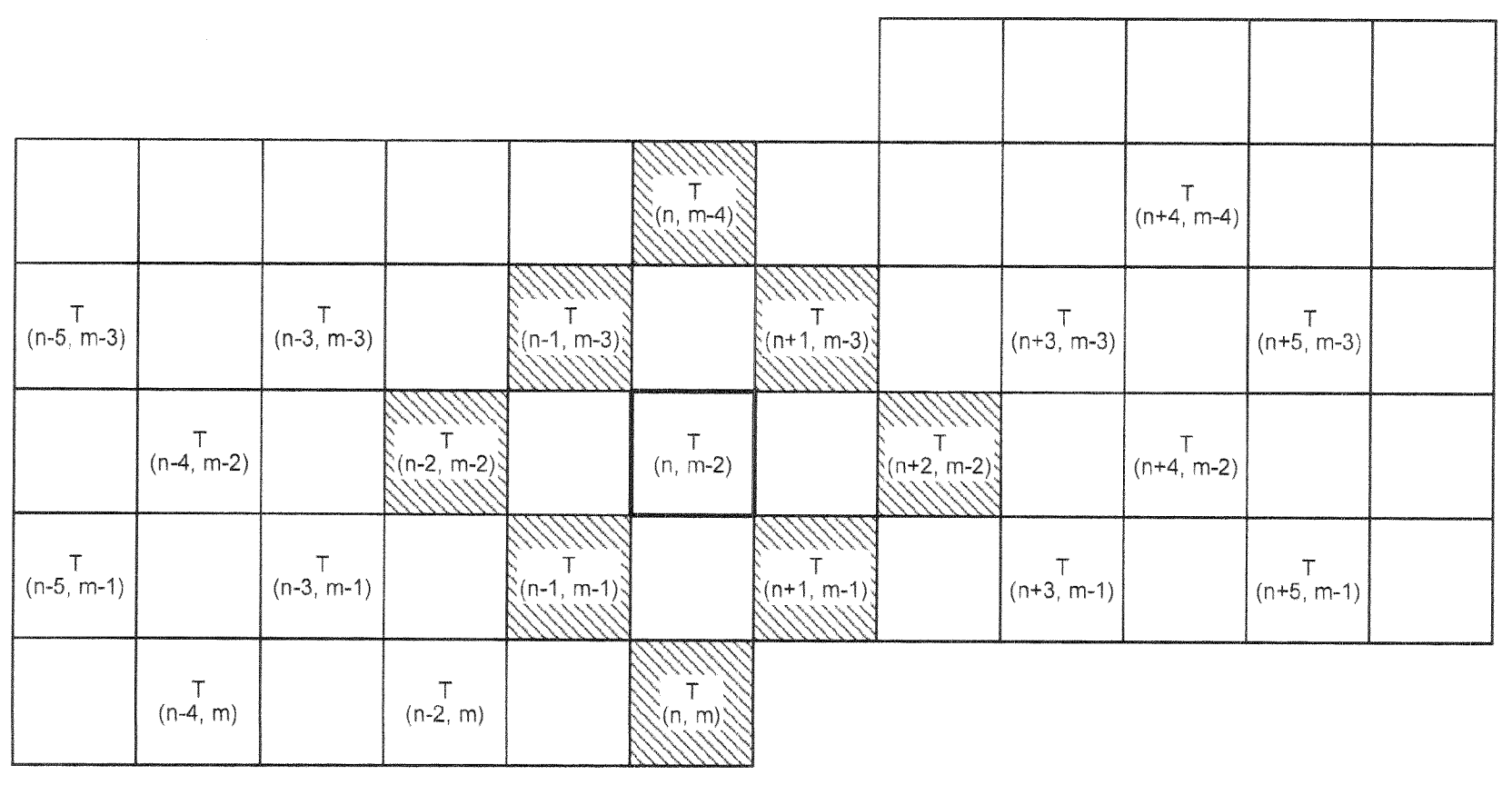

FIG. 24 is a pattern diagram illustrating a specific example of a pixel area for extracting type information that is used for a modification process of an interpolation process type according to the first alternative example of the first embodiment. For example, as illustrated in FIG. 24, the type information extracting unit 128a extracts type information T(n, m−2) of the processing-target G-missing pixel position and type information T(n, m), T(n−1, m−1), T(n+1, m−1), T(n−2, m−2), T(n+2, m−2), T(n−1, m−3), T(n+1, m−3), and T(n, m−4) of the peripheral G-missing pixel positions, from pixel areas for five lines stored in the memory 21g.

In this case, the type information T(n, m) illustrated in FIG. 24 is one of the type information Tv(n, m), Th(n, m), and Ta(n, m) different among interpolation process types described above and is type information (in other words, type information of an interpolation process type determined that the similarity of color difference in the predetermined number of pixel areas is the highest) corresponding to the minimum value among the plurality of color difference similarities on which the comparison process is performed by the determining unit 27. This is also similar at the other G-missing pixel positions. Moreover, the type information T(n, m) is the latest type information output from the determining unit 27 among the type information of the G-missing pixel positions illustrated in FIG. 24.

In other words, the type information extracting unit 128a extracts the type information T(n, m−2) of the G-missing pixel (see thick-frame part of FIG. 24) located on the latest type information T(n, m) by two pixels as the processing-target type information. At the same time as this, the type information extracting unit 128a extracts the type information T(n, m), T(n−1, m−1), T(n+1, m−1), T(n−2, m−2), T(n+2, m−2), T(n−1, m−3), T(n+1, m−3), and T(n, m−4) of the peripheral G-missing pixel positions (see hatched part of FIG. 24) of the processing-target type information T(n, m−2).

After that, among nine pieces of type information extracted as described above, the type information extracting unit 128a outputs the processing-target type information T(n, m−2) to the modification processing unit 128d and outputs the peripheral type information T(n, m), T(n−1, m−1), T(n+1, m−1), T(n−2, m−2), T(n+2, m−2), T(n−1, m−3), T(n+1, m−3), and T(n, m−4) to the type pattern determining unit 128b.

The type pattern determining unit 128b determines whether array patterns of the interpolation process type of the plurality of peripheral G-missing pixel positions indicated by the multiple pieces of type information located at the vicinity of the processing-target type information are identical with setting array patterns indicating array patterns that are previously set and a different among interpolation process types.

Specifically, the type pattern determining unit 128b first refers to setting array patterns of the plurality of interpolation process types that are previously stored in the type pattern table 128c. Next, the type pattern determining unit 128b performs a comparison process on the array patterns of the multiple pieces of type information at the vicinity of the G-missing pixel position acquired from the type information extracting unit 128a, in other words, the array patterns of interpolation process types indicated by the multiple pieces of type information and the plurality of setting array patterns. In this way, the type pattern determining unit 128b determines whether the array patterns are identical with the setting array patterns.

Figure 25:
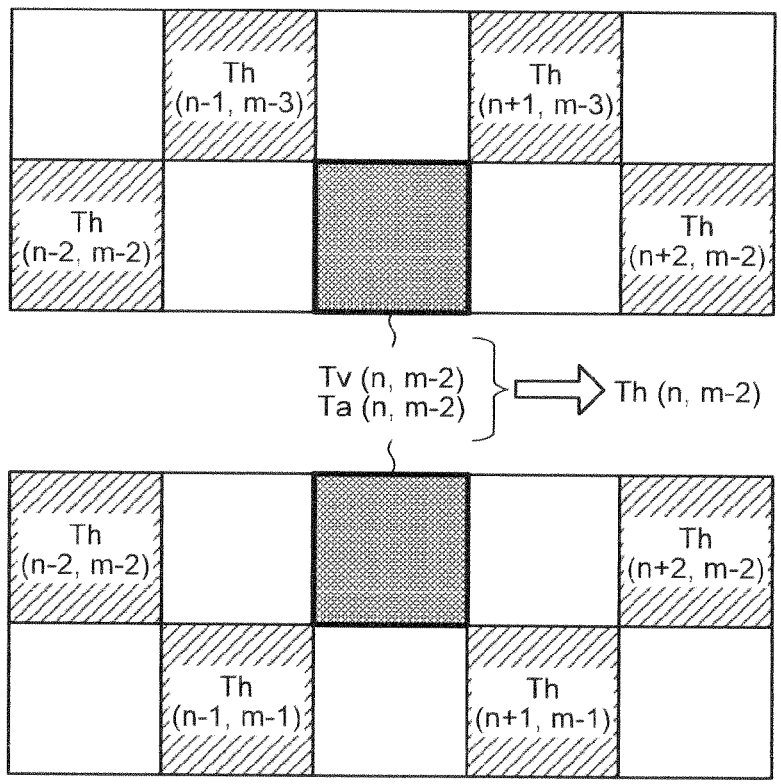
FIG. 25 is a pattern diagram illustrating a specific example of an array pattern of type information corresponding to a horizontal interpolation process type.
Figure 26:
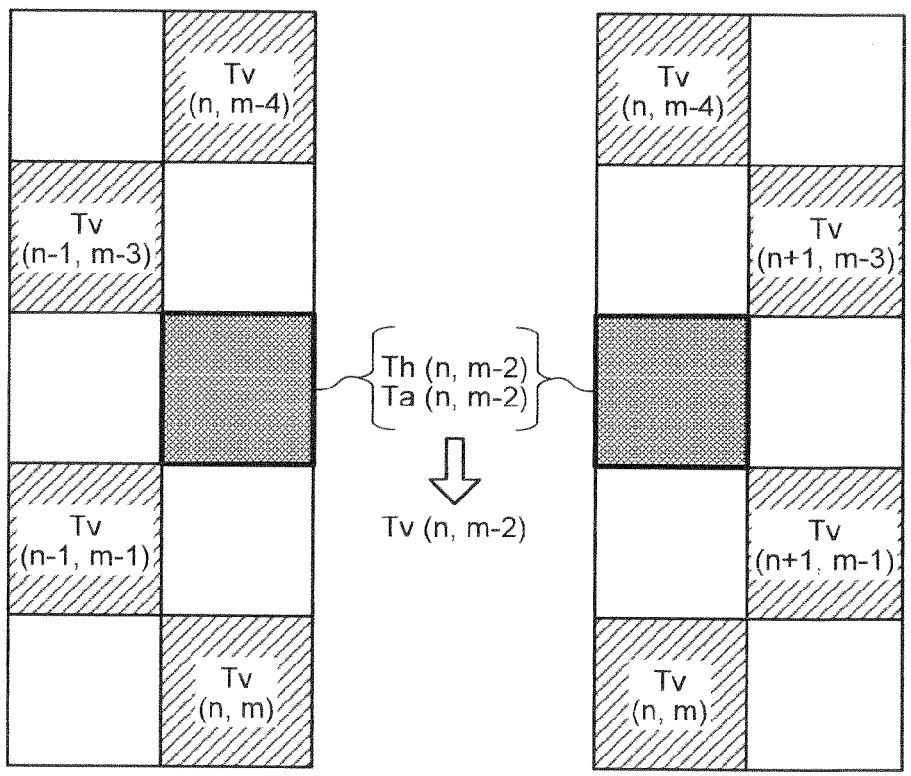
FIG. 26 is a pattern diagram illustrating a specific example of an array pattern of type information corresponding to a vertical interpolation process type.

FIG. 25 is a pattern diagram illustrating a specific example of an array pattern of type information corresponding to a horizontal interpolation process type. FIG. 26 is a pattern diagram illustrating a specific example of an array pattern of type information corresponding to a vertical interpolation process type. For example, as illustrated in FIG. 25, an array pattern of type information corresponding to a horizontal interpolation process type includes an array pattern in which four pieces of upper-side type information among eight pieces of peripheral type information are type information Th(n−2, m−2), Th(n+2, m−2), Th(n−1, m−3), and Th(n+1, m−3) indicating "horizontal interpolation process" or an array pattern in which pieces of lower-side type information are type information Th(n−1, m−1), Th(n+1, m−1), Th(n−2, m−2), and Th(n+2, m−2) indicating "horizontal interpolation process".

The type pattern table 128c previously stores a plurality of array patterns (for example, three) of type information corresponding to the horizontal interpolation process type as described above. The type pattern determining unit 128b determines whether the array patterns of peripheral type information T(n, m), T(n−1, m−1), T(n+1, m−1), T(n−2, m−2), T(n+2, m−2), T(n−1, m−3), T(n+1, m−3), and T(n, m−4) acquired from the type information extracting unit 128a are identical with any of the array patterns corresponding to the horizontal interpolation process type described above.

When they are identical to each other, the type pattern determining unit 128b outputs type determination information indicating that the processing-target type information T(n, m−2) should be "horizontal interpolation process" to the modification processing unit 128d.

On the other hand, for example, as illustrated in FIG. 26, an array pattern of type information corresponding to vertical interpolation process type includes an array pattern in which four pieces of left-side type information among eight pieces of peripheral type information are type information Tv(n, m), Tv(n−1, m−1), Tv(n−1, m−3), and Tv(n, m−4) indicating "vertical interpolation process" or an array pattern in which four pieces of right-side type information are type information Tv(n, m), Tv(n+1, m−1), Tv(n+1, m−3), and Tv(n, m−4) indicating "vertical interpolation process".

The type pattern table 128c previously stores a plurality of array patterns of type information corresponding to the vertical interpolation process type as described above. The type pattern determining unit 128b determines whether the array patterns of peripheral type information T(n, m), T(n−1, m−1), T(n+1, m−1), T(n−2, m−2), T(n+2, m−2), T(n−1, m−3), T(n+1, m−3), and T(n, m−4) acquired from the type information extracting unit 128a are identical with any of the array patterns corresponding to the vertical interpolation process type described above. When they are identical to each other, the type pattern determining unit 128b outputs type determination information indicating that the processing-target type information T(n, m−2) should be "vertical interpolation process" to the modification processing unit 128d.

In this case, when the array patterns of peripheral type information T(n, m), T(n−1, m−1), T(n+1, m−1), T(n−2, m−2), T(n+2, m−2), T(n−1, m−3), T(n+1, m−3), and T(n, m−4) acquired from the type information extracting unit 128a are not identical with any of the array patterns corresponding to the vertical interpolation process type or the horizontal interpolation process type described above, the type pattern determining unit 128b outputs type determination information indicating "undefined" to the modification processing unit 128d.

The modification processing unit 128d determines whether the interpolation process type after determination of the color signal Gs at the processing-target G-missing pixel position, in other words, the interpolation process type after the determination is performed by the determining unit 27 is a falsely-determined type, on the basis of the determination result performed by the type pattern determining unit 128b. When it is a falsely-determined interpolation process type, the modification processing unit 128d modifies the interpolation process type and transmits type information after modification indicating the modified interpolation process type to the memory 21g.

Specifically, the modification processing unit 128d first acquires the processing-target type information T(n, m−2) from the type information extracting unit 128a, and acquires the type determination information for the processing-target type information T(n, m−2) from the type pattern determining unit 128b. Moreover, the type determination information is the determination result performed by the type pattern determining unit 128b and include the determination result of an interpolation process type to be indicated by the processing-target type information T(n, m−2). Next, the modification processing unit 128d modifies the interpolation process type of the processing-target type information T(n, m−2) on the basis of the type determination information of the type pattern determining unit 128b.

For example, when the type determination information of the type pattern determining unit 128b is information indicating "horizontal interpolation process", the array patterns of eight pieces of type information located at the vicinity of the processing-target type information T(n, m−2) identical with any of the array patterns illustrated in FIG. 25.

In this state, the modification processing unit 128d checks the interpolation process type indicated by the processing-target type information T(n, m−2). When the processing-target interpolation process type is a process other than the horizontal interpolation process, in other words, when a processing target is the type information Tv(n, m−2) of "vertical interpolation process" or the type information Ta(n, m−2) of "four-pixel average interpolation process", the modification processing unit 128d modifies the processing-target type information T(n, m−2) into the type information Th(n, m−2) of "horizontal interpolation process". In this way, the modification processing unit 128d modifies the interpolation process type of the processing-target type information T(n, m−2) into "horizontal interpolation process" that is an original process.

On the one hand, when the type determination information of the type pattern determining unit 128b is information indicating "vertical interpolation process", the array patterns of eight pieces of type information located at the vicinity of the processing-target type information T(n, m−2) are identical with any of the array patterns illustrated in FIG. 26.

In this state, the modification processing unit 128d checks the interpolation process type indicated by the processing-target type information T(n, m−2). When the processing-target interpolation process type is a process other than the vertical interpolation process, in other words, when a processing target is the type information Th(n, m−2) of "horizontal interpolation process" or the type information Ta(n, m−2) of "four-pixel average interpolation process", the modification processing unit 128d modifies the processing-target type information T(n, m−2) into the type information Tv(n, m−2) of "vertical interpolation process". In this way, the modification processing unit 128d modifies the interpolation process type of the processing-target type information T(n, m−2) into "vertical interpolation process" that is an original process.

On the other hand, when the type determination information of the type pattern determining unit 128b is information indicating "undefined", the modification processing unit 128d maintains the state of the processing-target type information T(n, m−2) regardless of the interpolation process type indicated by the processing-target type information T(n, m−2). In other words, when the type determination information indicating "undefined" is acquired, the modification processing unit 128d maintains the interpolation process type indicated by the processing-target type information T(n, m−2) without modification.

As described above, the modification processing unit 128d modifies or maintains the interpolation process type of the processing-target type information T(n, m−2) on the basis of the type determination information output from the type pattern determining unit 128b, and then outputs the type information T(n, m−2) after the modification process to the memory 21g. In this case, similarly to the case of the first embodiment described above, the memory 21g acquires the type information T(n, m−2) after modification from the type information modifying unit 128, overwrites the type information T(n, m−2) after modification at the same storage position, and updates the existing type information of the same storage position to the type information T(n, m−2) after modification. Moreover, the type information after updating stored in the memory 21g is used as one past type information in the future modification process performed by the type information modifying unit 128.

Moreover, in the type information modifying unit 128, the type pattern table 128c previously stores one or more setting array patterns of type information corresponding to "four-pixel average interpolation process". The type pattern determining unit 128b may refer to the setting array patterns of type information corresponding to "four-pixel average interpolation process" and determine the array patterns of the multiple pieces of type information located at the vicinity of the processing-target type information.

Specifically, the type pattern determining unit 128b determines whether the array patterns of the multiple pieces of type information described above are identical with the setting array patterns type information corresponding to "four-pixel average interpolation process". When they are identical to each other, the type pattern determining unit 128b may output type determination information indicating that the processing-target type information T(n, m−2) should be "four-pixel average interpolation process" to the modification processing unit 128d.

On the other hand, the modification processing unit 128d checks the interpolation process type indicated by the processing-target type information T(n, m−2). When the processing-target interpolation process type is a process other than the four-pixel average interpolation process, in other words, when processing target is the type information Tv(n, m−2) of "vertical interpolation process" or the type information Th(n, m−2) of "horizontal interpolation process", the modification processing unit 128d may modify the processing-target type information T(n, m−2) into the type information Ta(n, m−2) of "four-pixel average interpolation process".

As explained above, according to the first alternative example of the first embodiment of the present invention, the image processing apparatus determines the array patterns of a plurality of peripheral interpolation process types indicated by the type information of a plurality of G-missing pixel positions located at the vicinity of a processing-target G-missing pixel position and modifies the interpolation process type of the processing-target type information into an interpolation process type corresponding to the determined array pattern. Moreover, the other configuration of the image processing apparatus is similarly to that of the first embodiment. For this reason, because the image processing apparatus of the first alternative example has the same action-effect as that of the first embodiment described above and can modify the interpolation process type of the processing-target type information on the basis of the determination process result whether a plurality of preset setting array patterns is identical with the array patterns of peripheral type information, the image processing apparatus can modify the false determination for an interpolation process type with higher accuracy by using plurality of optimum determination conditions.

Second Alternative Example of First Embodiment

Next, it will be explained about the second alternative example of the first embodiment of the present invention. According to the first embodiment described above, it has been explained about the case where the interpolation process types of the G-missing pixel position are three kinds of the vertical interpolation process, the horizontal interpolation process, and the four-pixel average interpolation process. According to the second alternative example, the interpolation process types are five kinds of interpolation processes by further adding a diagonal interpolation process that is an interpolation process in an upward-sloping (slash) direction and an inverted diagonal interpolation process that is an interpolation process in a downward-sloping (backslash) direction.

Figure 27:
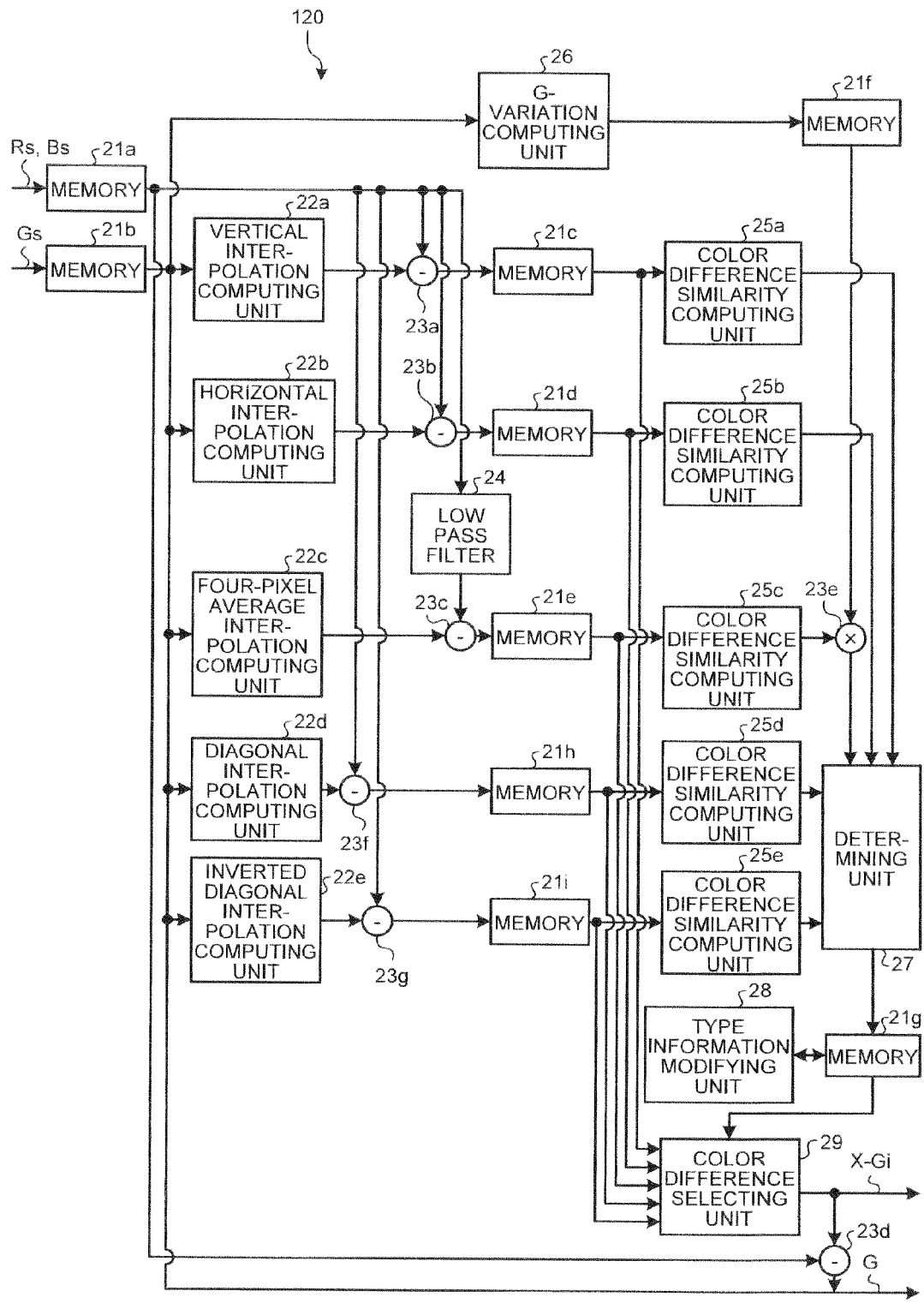
FIG. 27 is a block diagram typically illustrating an example configuration of the G-interpolation color difference computing unit of the image processing apparatus according to a second alternative example of the first embodiment of the present invention.

FIG. 27 is a block diagram typically illustrating an example configuration of a G-interpolation color difference computing unit 120 of an image processing apparatus according to the second alternative example of the first embodiment of the present invention. As illustrated in FIG. 27, the G-interpolation color difference computing unit 120 according to the second alternative example of the first embodiment has the same configuration as that of the G-interpolation color difference computing unit 20 according to the first embodiment and further includes a diagonal interpolation computing unit 22d, an inverted diagonal interpolation computing unit 22e, subtraction units 23f and 23g, memories 21h and 21i, and color difference similarity computing units 25d and 25e. Moreover, the image processing apparatus according to the second alternative example includes the G-interpolation color difference computing unit 120 in place of the G-interpolation color difference computing unit 20 of the image processing apparatus 2 according to the first embodiment. The other configuration is the same as that the first embodiment and the same components have the same reference numbers.

The diagonal interpolation computing unit 22d and the inverted diagonal interpolation computing unit 22e function as a plurality of interpolation signal candidate computing units that computes interpolation signals of a signal of a specified color (color signal Gs) different among interpolation process types, similarly to the vertical interpolation computing unit 22a, the horizontal Interpolation computing unit 22b, and the four-pixel average interpolation computing unit 22c described above.

Specifically, the diagonal interpolation computing unit 22d performs a slash-direction interpolation process (diagonal interpolation process) on the basis of a signal of the specified color of each pixel position close to the clash direction of the G-missing pixel position and computes an interpolation signal corresponding to a slash-direction interpolation process type.

The inverted diagonal interpolation computing unit 22e performs a backslash-direction interpolation process (inverted diagonal interpolation process) on the basis of a signal of the specified color of each pixel position close to the backslash direction of the G-missing pixel position and computes an interpolation signal corresponding to a backslash-direction interpolation process type.

Figure 28:
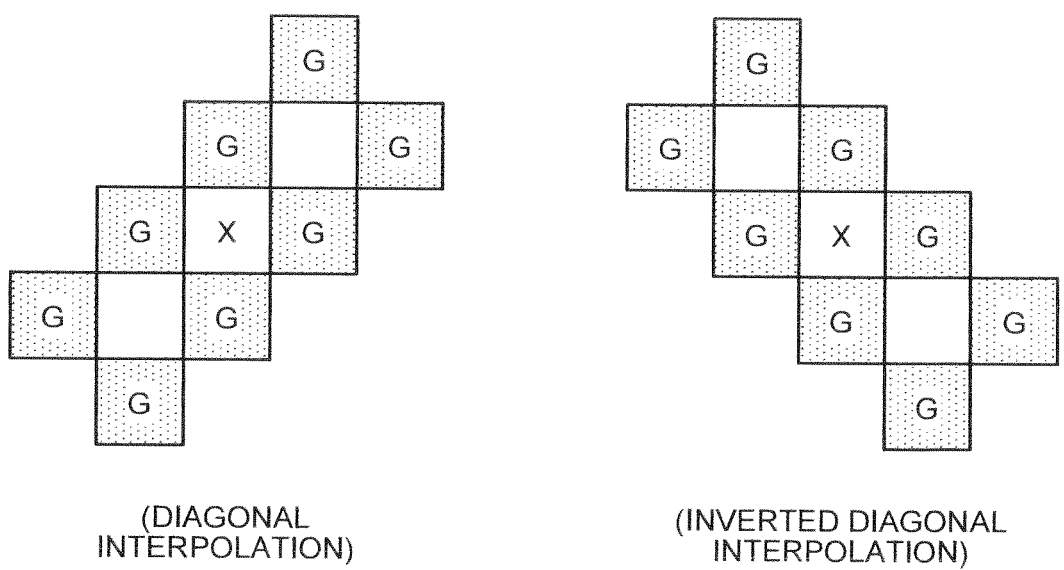
FIG. 28 is a pattern diagram illustrating a specific example of pixel positions on a Bayer array of interpolation process target pixels in a diagonal interpolation process and an inverted diagonal interpolation process.

Hereinafter, it will be specifically explained about a diagonal interpolation process and an inverted diagonal interpolation process. FIG. 28 is a pattern diagram illustrating a specific example of pixel positions on a Bayer array of interpolation process target pixels in a diagonal interpolation process and an inverted diagonal interpolation process.

The diagonal interpolation computing unit 22d acquires each color signal Gs of eight pixels close to the slash direction (upward-sloping direction) of an X pixel that is a G-missing pixel illustrated in FIG. 28 from the memory 21b and performs the diagonal interpolation process by using the signal value of the acquired each color signal Gs. In this way, the diagonal interpolation computing unit 22d computes a slash-direction G-component interpolation value for the X pixel. After that, the diagonal interpolation computing unit 22d outputs an interpolation signal of which the signal value is the computed interpolation value to the subtraction unit 23f.

On the other hand, the inverted diagonal interpolation computing unit 22e acquires each signal Gs of eight pixels close to the backslash direction (downward-sloping direction) of the X pixel that is the G-missing pixel illustrated in FIG. 28 from the memory 21b and performs the inverted diagonal interpolation process by using the signal value of the acquired each color signal Gs. In this way, the inverted diagonal interpolation computing unit 22e computes a backslash-direction G-component interpolation value for the X pixel. After that, the inverted diagonal interpolation computing unit 22e outputs an interpolation signal of which the signal value is the computed interpolation value to the subtraction unit 23g.

In this case, the interpolation value computed by the diagonal interpolation computing unit 22d or the inverted diagonal interpolation computing unit 22e are signal values of different interpolation signals different among interpolation process types. In detail, the interpolation value computed by the diagonal interpolation computing unit 22d is a signal value of the interpolation G signal Gi of the G-missing pixel computed in the diagonal interpolation process and the interpolation value computed by the inverted diagonal interpolation computing unit 22e is a signal value of the interpolation G signal Gi of the G-missing pixel computed in the inverted diagonal interpolation process.

Similarly to the subtraction units 23a to 23c described above, the subtraction units 23f and 23g function as a plurality of color-difference signal candidate computing units that computes a color-difference signal candidate between a signal of a color except the specified color signal and a signal of a specified color for each interpolation process type. Specifically, the subtraction unit 23f first acquires an interpolation signal having the interpolation value of the diagonal interpolation process from the diagonal interpolation computing unit 22d, and acquires a color signal X at the G-missing pixel (X pixel) from the memory 21a. Next, the subtraction unit 23f subtracts the interpolation signal according to the diagonal interpolation process from the color signal X, thereby computing a color-difference signal candidate corresponding to the diagonal interpolation process. After that, the subtraction unit 23f outputs the computed color-difference signal candidate to the memory 21h.

The subtraction unit 23g first acquires an interpolation signal having the interpolation value of the inverted diagonal interpolation process from the inverted diagonal interpolation computing unit 22e, and acquires the color signal X at the G-missing pixel (X pixel) from the memory 21a. Next, the subtraction unit 23g subtracts the interpolation signal according to the inverted diagonal interpolation process from the color signal X, thereby computing a color-difference signal candidate corresponding to the inverted diagonal interpolation process. After that, the subtraction unit 23g outputs the computed color-difference signal candidate to the memory 21i.

Similarly to the memories 21c to 21e described above, the memories 21h and 21i function as a plurality of storage units that stores the color-difference signal candidate for each interpolation process type. Specifically, the memory 21h first sequentially acquires the color-difference signal candidates of the diagonal interpolation process computed by the subtraction unit 23f, and stores the color-difference signal candidates for the predetermined number of pixels of the diagonal interpolation process. After that, when the color-difference signal candidates for the predetermined number of pixels are stored, the memory 21h appropriately outputs the stored color-difference signal candidates of the diagonal interpolation process to the color difference similarity computing unit 25d and the color difference selecting unit 29.

The memory 21i first sequentially acquires the color-difference signal candidates of the inverted diagonal interpolation process computed by the subtraction unit 23g, and stores the color-difference signal candidates for the predetermined number of pixels of the inverted diagonal interpolation process. After that, when the color-difference signal candidates for the predetermined number of pixels are stored, the memory 21i appropriately outputs the stored color-difference signal candidates of the inverted diagonal interpolation process to the color difference similarity computing unit 25e and the color difference selecting unit 29.

In this way, the memories 21h and 21i obtain a delay until a color difference similarity computation process in pixel areas including the color-difference signal candidates for the predetermined number of pixels (for example, the number of pixels of five rows and five columns) can be performed. Moreover, the color difference similarity computation process in this case is realized by the color difference similarity computing units 25d and 25e to be described below.

Similarly to the color difference similarity computing units 25a to 25c described above, the color difference similarity computing units 25d and 25e function as a plurality of color difference similarity computing units that computes a similarity degree between the color-difference signal candidates for interpolation process types on the basis of the color-difference signal candidates for interpolation process types that are stored in the memories 21h and 21i for interpolation process types.

Specifically, the color difference similarity computing unit 25d first acquires the color-difference signal candidates (the color-difference signals corresponding to the diagonal interpolation process) for the predetermined number of pixels that are stored in the memory 21h. Next, the color difference similarity computing unit 25d computes a color difference similarity Ss(n, m) that is a similarity degree between the color-difference signal candidates corresponding to the diagonal interpolation process among the plurality of interpolation process types, on the basis of the acquired color-difference signal candidates for the predetermined number of pixels. After that, the color difference similarity computing unit 25d outputs the computed color difference similarity Ss(n, m) to the determining unit 27.

On the other hand, the color difference similarity computing unit 25e first acquires the color-difference signal candidates (the color-difference signals corresponding to the inverted diagonal interpolation process) for the predetermined number of pixels that are stored in the memory 21i. Next, the color difference similarity computing unit 25e computes a color difference similarity Sb(n, m) that is a similarity degree between the color-difference signal candidates corresponding to the inverted diagonal interpolation process among the plurality of interpolation process types, on the basis of the acquired color-difference signal candidates for the predetermined number of pixels. After that, the color difference similarity computing unit 25e outputs the computed color difference similarity Sb(n, m) to the determining unit 27.

In the second alternative example of the first embodiment, the determining unit 27 selectively determines one of the vertical interpolation process, the horizontal interpolation process, the four-pixel average interpolation process, the diagonal interpolation process, and the inverted diagonal interpolation process, as an interpolation process type of the color signal Gs at the pixel position of the G-missing pixel (X pixel or XL pixel) that does not have the color signal Gs that is a signal of a specified color.

Specifically, the determining unit 27 acquires the color difference similarities Sv(n, m), Sh(n, m), and Sa(n, m)×w(n, m) as described above, and further acquires the color difference similarity Ss(n, m) corresponding to the diagonal interpolation process from the color difference similarity computing unit 25d and acquires the color difference similarity Sh(n, m) corresponding to the inverted diagonal interpolation process from the color difference similarity computing unit 25e.

Next, the determining unit 27 performs a comparison process on the color difference similarities Sv(n, m), Sb(n, m), Sa(n, m)×w(n, m), Ss(n, m), and Sb(n, m) different among interpolation process types and selects a minimum color difference similarity among the color difference similarities.

Subsequently, the determining unit 27 selectively determines an interpolation process type (in the second alternative example, one of the vertical interpolation process, the horizontal interpolation process, the four-pixel average interpolation process, the diagonal interpolation process, and the inverted diagonal interpolation process) corresponding to the selected minimum color difference similarity as an interpolation process type of the color signal Gs at the G-missing pixel position. After that, the determining unit 27 outputs to the memory 21g type information indicating the interpolation process type of the color signal Gs at the G-missing pixel position determined in this way.

For example, when the color difference similarity Ss(n, m) is selected in accordance with the comparison process, the determining unit 27 determines the diagonal interpolation process corresponding to the color difference similarity Ss(n, m) as an interpolation process type at the G-missing pixel position and outputs to the memory 21g type information Ts(n, m) indicating that the interpolation process type at the G-missing pixel position (n, m) is the diagonal interpolation process.

Moreover, when the color difference similarity Sb(n, m) is selected in accordance with the comparison process, the determining unit 27 determines the inverted diagonal interpolation process corresponding to the color difference similarity Sb(n, m) as an interpolation process type at the G-missing pixel position and outputs to the memory 21g type information Tb(n, m) indicating that the interpolation process type at the G-missing pixel position (n, m) is the inverted diagonal interpolation process. Moreover, the other color difference similarities are similar to the case of the first embodiment described above.

Figure 29:
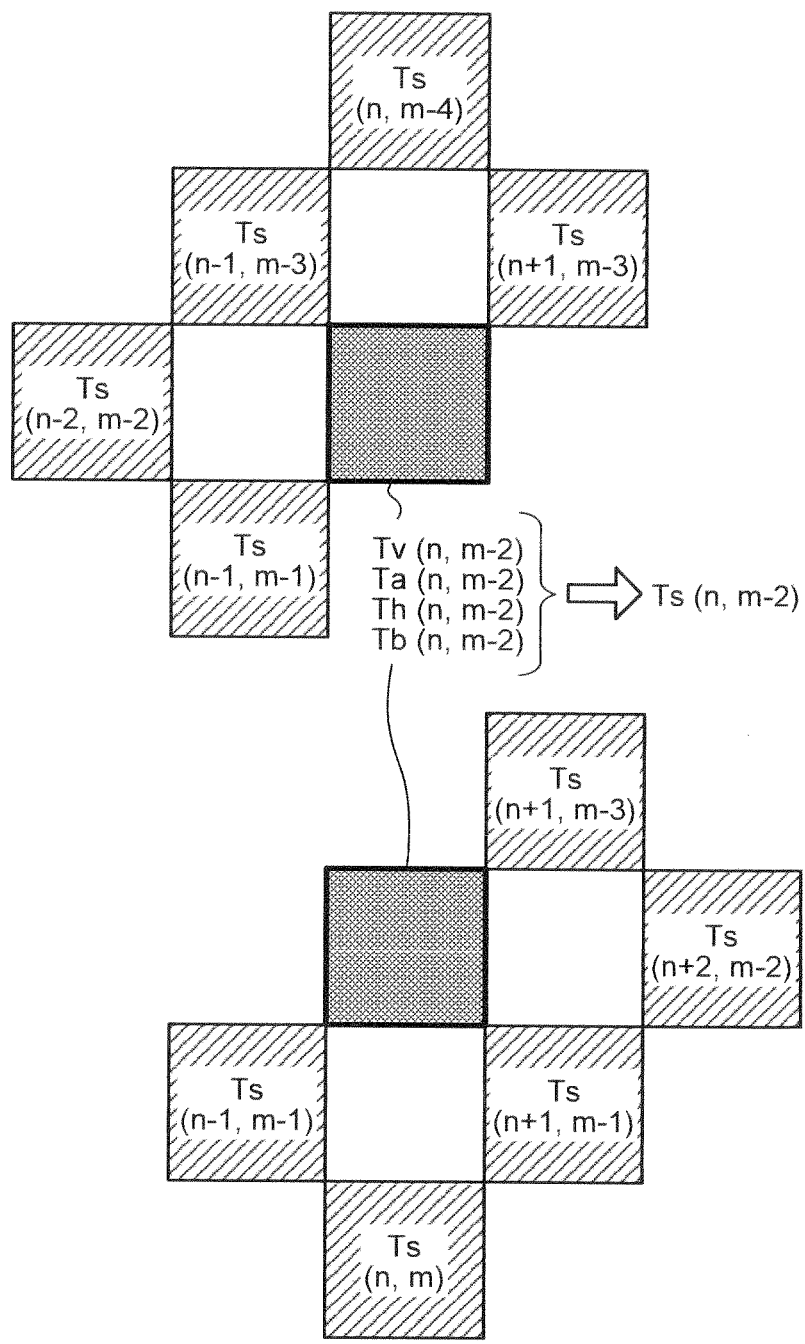
FIG. 29 is a pattern diagram illustrating a specific example of an array state of type information corresponding to a diagonal interpolation process type.
Figure 30:
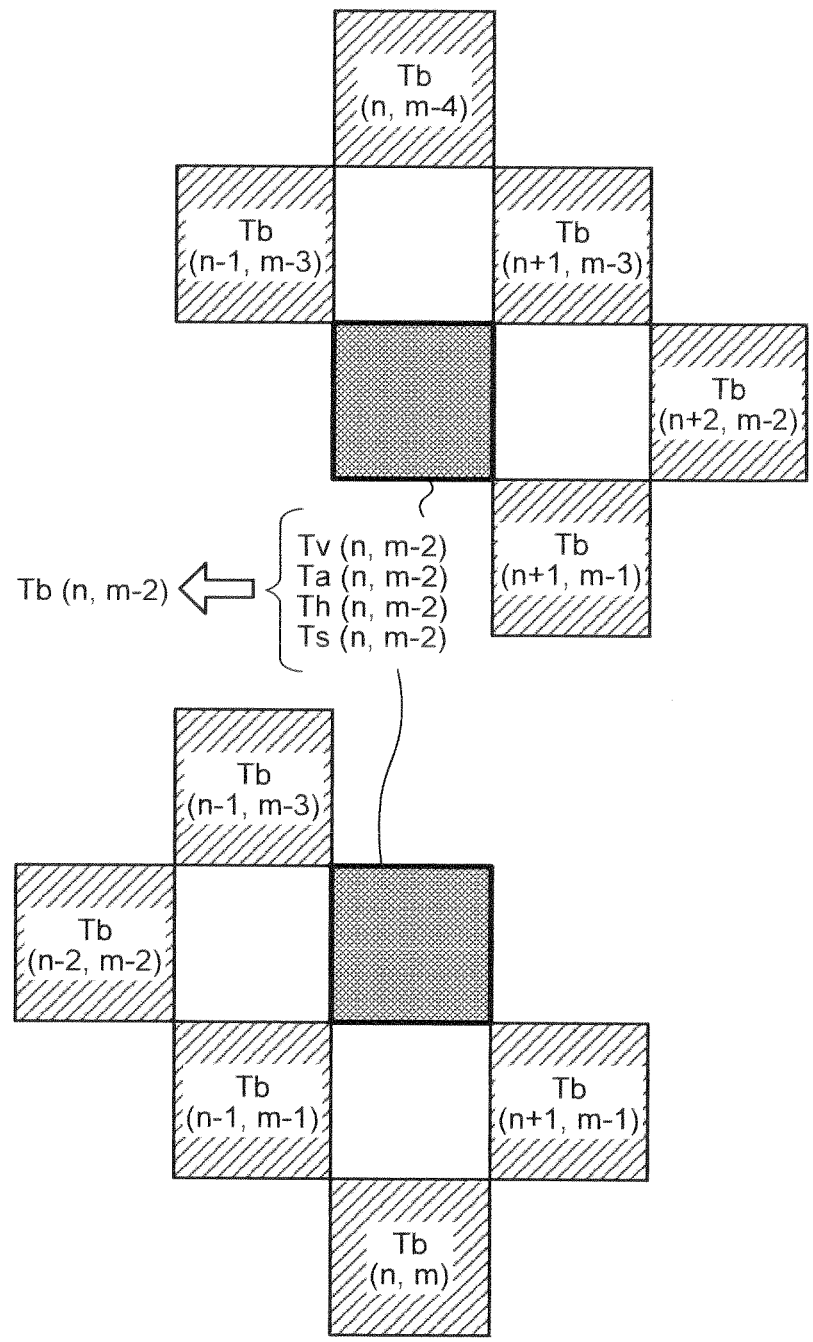
FIG. 30 is a pattern diagram illustrating a specific example of an array state of type information corresponding to an inverted diagonal interpolation process type.

On the other hand, the type information modifying unit 28 according to the second alternative example further has a function for modifying the interpolation process type of processing-target type information into a diagonal interpolation process or an inverted diagonal interpolation process, in addition to the same modification function as that of the first embodiment described above. FIG. 29 is a pattern diagram illustrating a specific example of an array state of type information corresponding to the diagonal interpolation process type. FIG. 30 is a pattern diagram illustrating a specific example of an array state of type information corresponding to the inverted diagonal interpolation process type.

For example, Similarly to the case of the first alternative example of the first embodiment described above, the type information modifying unit 28 first acquires the processing-target type information T(n, m−2) and the peripheral type information T(n, m), T(n−1, m−1), T(n+1, m−1), T(n−2, m−2), T(n+2, m−2), T(n−1, m−3), T(n+1, m−3), and T(n, m−4) from the memory 21g.

Next, for example, as illustrated in FIG. 29, when the peripheral type information T(n, m), T(n−1, m−1), T(n+1, m−1), T(n−2, m−2), and T(n+1, m−3) or the type information T(n−1, m−1), T(n−2, m−2), T(n−1, m−3), T(n+1, m−3), and T(n, m−4) are the type information Ts corresponding to the diagonal interpolation process and the processing-target type information T (n, m−2) indicates an interpolation process type other than the diagonal interpolation process, the type information modifying unit 28 modifies the processing target into the type information Ts(n, m−2) corresponding to the diagonal interpolation process. In other words, the type information modifying unit 28 modifies the processing-target type information Tv(n, m−2), Ta(n, m−2), Th(n, m−2), and Tb(n, m−2) into the type information Ts(n, m−2). After that, the type information modifying unit 28 outputs the type information Ts(n, m−2) after modification to the memory 21g.

On the other hand, for example, as illustrated in FIG. 30, when the peripheral type information T(n, m), T(n−1, m−1), T(n+1, m−1), T(n−2, m−2), and T(n−1, m−3) or the type information T(n+1, m−1), T(n+2, m−2), T(n+1, m−3), T(n−1, m−3), and T(n, m−4) are the type information Tb corresponding to the inverted diagonal interpolation process and the processing-target type information T(n, m−2) indicates an interpolation process type other than the inverted diagonal interpolation process, the type information modifying unit 28 modifies the processing target into the type information Tb(n, m−2) corresponding to the inverted diagonal interpolation process. In other words, the type information modifying unit 28 modifies the processing-target type information Tv(n, m−2), Ta(n, m−2), Th(n, m−2), and Ts(n, m−2) into the type information Tb(n, m−2). After that, the type information modifying unit 28 outputs the type information Tb(n, m−2) after modification to the memory 21g.

Moreover, the type information modifying unit 28 according to the second alternative example has the function as that of the first embodiment or the first alternative example described above in addition to the modification function of the diagonal interpolation process or the inverted diagonal interpolation process described above. The type information modifying unit 28 may modify type information on the basis of the counting process result of type information similarly to the first embodiment, or may modify type information on the basis of the determination result of the array pattern of type information similarly to the first alternative example.

On the other hand, the color difference selecting unit 29 according to the second alternative example further acquires the color-difference signal candidate of the diagonal interpolation process and the color-difference signal candidate of the inverted diagonal interpolation process from the memories 21h and 21i, in addition to the color-difference signals X-Gv, X-Gh, and Ga described above. Specifically, the color difference selecting unit 29 acquires type information after determination or updating from the memory 21g. The color difference selecting unit 29 selects the color-difference signal candidate of the diagonal interpolation process when the acquired type information indicates the diagonal interpolation process and selects the color-difference signal candidate of the inverted diagonal interpolation process when the acquired type information indicates the inverted diagonal Interpolation process. Moreover, the color difference selecting unit 29 according to the second alternative example has the same function as that of the first embodiment described above in addition to the function for selecting the color-difference signal candidate of the diagonal interpolation process or the inverted diagonal interpolation process.

As explained above, according to the second alternative example of the first embodiment of the present invention, a diagonal interpolation process and an inverted diagonal interpolation process are added as an interpolation process type at a processing-target G-missing pixel position to be able to select a color-difference signal corresponding to the diagonal interpolation process or a color-difference signal corresponding to the inverted diagonal interpolation process. The other configuration is the same as that of the first embodiment or the first alternative example. For this reason, because the image processing apparatus of the second alternative example has the same action-effect as that of the first embodiment or the first alternative example described above and can select a color-difference signal in accordance with various interpolation process types, the image processing apparatus can variously modify the false determination of an interpolation process type of a pixel area and thus can reduce various false colors of a pixel area.

Second Embodiment

Next, it will be explained about the second embodiment of the present invention. In the first embodiment described above, it has been explained about the case where the image processing apparatus computes a plurality of color-difference signal candidates different among interpolation process types and selects an output-target color-difference signal from the plurality of color-difference signal candidates in accordance with an interpolation process type based on type information after determination or after modification. In the second embodiment, the image processing apparatus first determines an interpolation process type of a G-missing pixel position, selects one interpolation signal computing means corresponding to the interpolation process type after determination or the interpolation process type after modification, and computes an interpolation G signal Gi by using the selected interpolation signal computing means.

Figure 31:
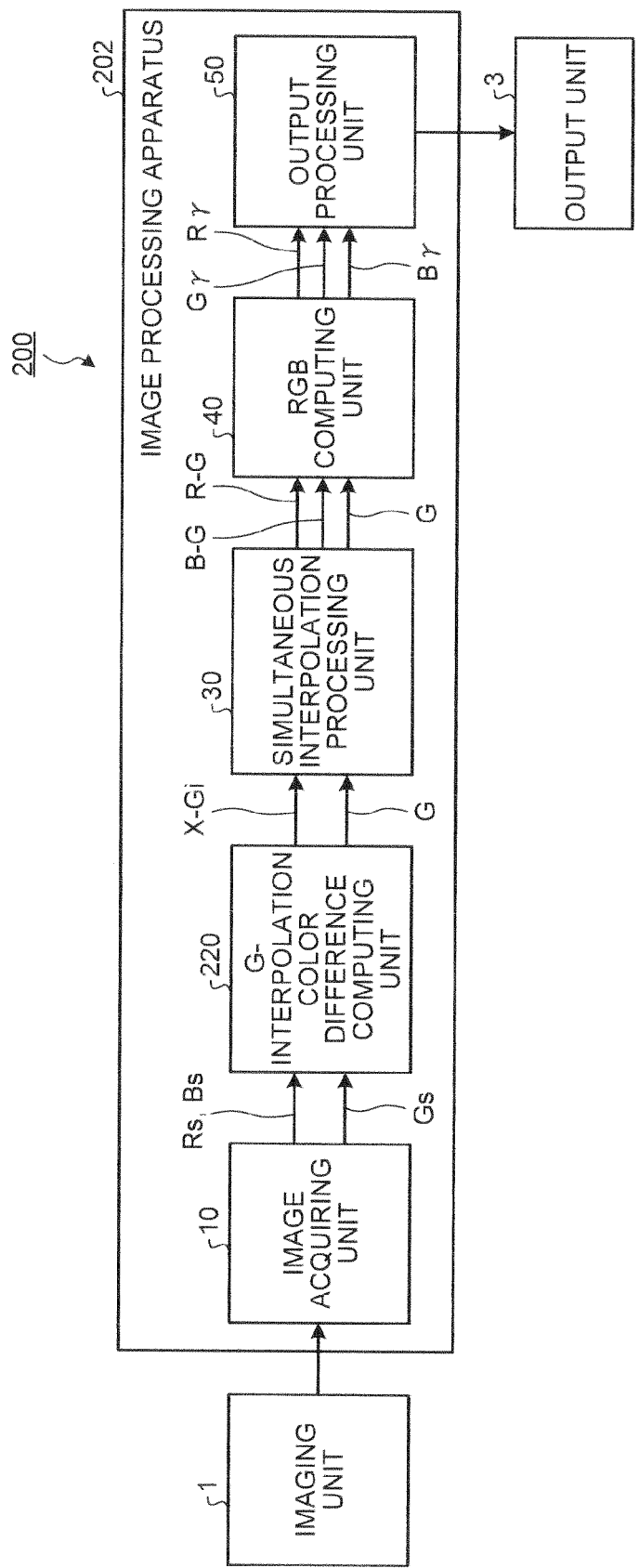
FIG. 31 is a block diagram typically illustrating an example configuration of an image output apparatus that includes an image processing apparatus according to a second embodiment of the present invention.

FIG. 31 is a block diagram typically illustrating an example configuration of an image output apparatus 200 that includes an image processing apparatus 202 according to the second embodiment of the present invention. As illustrated in FIG. 31, the image output apparatus 200 according to the second embodiment includes the image processing apparatus 202 in place of the image processing apparatus 2 of the image output apparatus 100 according to the first embodiment described above. Moreover, the image processing apparatus 202 includes a G-interpolation color difference computing unit 220 in place of the G-interpolation color difference computing unit 20 according to the first embodiment. The other configuration is the same as that of the first embodiment and the same components have the same reference numbers.

Figure 32:
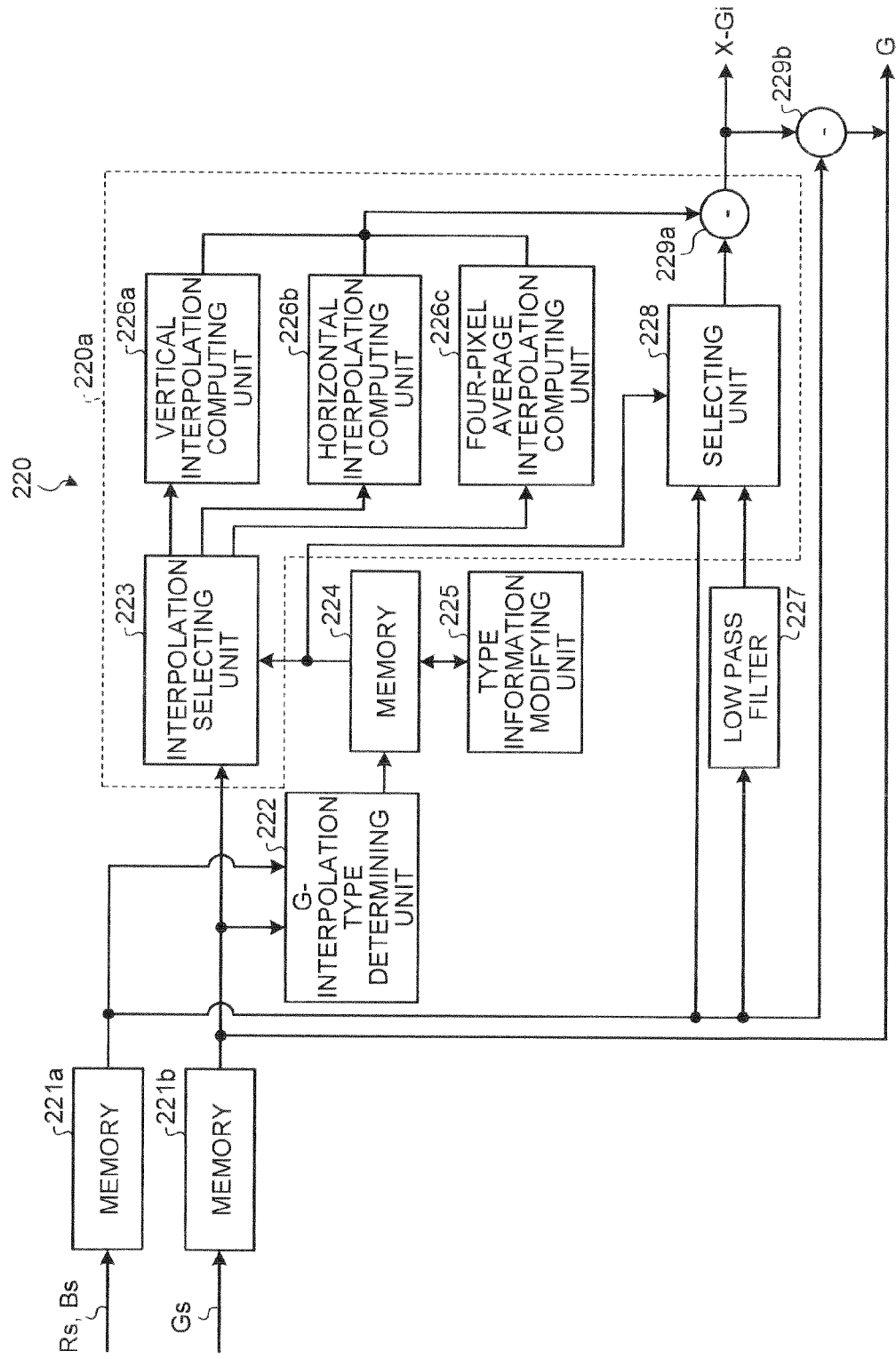
FIG. 32 is a block diagram typically illustrating an example configuration of a G-interpolation color difference computing unit of the image processing apparatus according to the second embodiment of the present invention.

FIG. 32 is a block diagram typically illustrating an example configuration of the G-interpolation color difference computing unit 220 of the image processing apparatus according to the second embodiment of the present invention. As illustrated in FIG. 32, the G-interpolation color difference computing unit 220 according to the second embodiment includes memories 221a, 221b, and 224, a G-interpolation type determining unit 222, an interpolation selecting unit 223, a type information modifying unit 225, a vertical interpolation computing unit 226a, a horizontal interpolation computing unit 226b, a four-pixel average interpolation computing unit 226c, a low pass filter 227, a selecting unit 228, and subtraction units 229a and 229b.

The memory 221a has the same function as that of the memory 21a according to the first embodiment. Specifically, the memory 221a first stores color signals Rs and Bs for a predetermined number of lines (for example, three lines or more), and then sequentially outputs the color signals Rs and Bs for the predetermined number of lines to the G-interpolation type determining unit 222, the low pass filter 227, and the selecting unit 228 when the color signals Rs and Bs for the predetermined number of lines are stored.

The memory 221b has the same function as that of the memory 21b according to the first embodiment. Specifically, the memory 221b first stores color signals Gs for a predetermined number of lines, and then sequentially outputs the color signals Gs for the predetermined number of lines to the G-interpolation type determining unit 222, the interpolation selecting unit 223, and the simultaneous interpolation processing unit 30 (see FIG. 31) when the color signals Gs for the predetermined number of lines are stored.

In this way, the memories 221a and 221b obtain a delay until data of the number of pixels on which a two-dimensional interpolation process at a G-missing pixel position can be performed, in other words, the color signals Rs, Gs, and Bs for the predetermined number of lines are prepared.

The G-interpolation type determining unit 222 functions as a type determining unit that determines an interpolation process type of a signal of a specified color at a missing pixel position that does not have a signal of the specified color among pixel positions of a plurality of color signals that forms an image. Specifically, the G-interpolation type determining unit 222 first acquires the color signals X (color signals Rs and Bs) for the predetermined number of lines from the memory 221a, and acquires the color signals Gs for the predetermined number of lines from the memory 221b.

Next, the G-interpolation type determining unit 222 computes a longitudinal color correlation value Cv that is a longitudinal-direction color correlation value and a lateral color correlation value Ch that is a lateral-direction color correlation value on the basis of the following Equations (15) and (16) by using the color signals X and the color signals Gs for the predetermined number of lines.

$$Cv(i, j) = |G(i, j-1) - G(i, j+1)| \times \alpha(i, j) + \{|G(i, j-1) - X(i, j)| + |G(i, j+1) - X(i, j)|\} \times (1 - \alpha(i, j)) \quad (15)$$

$$Ch(i, j) = |G(i-1, j) - G(i+1, j)| \times \alpha(i, j) + \{|G(i-1, j) - X(i, j)| + |G(i+1, j) - X(i, j)|\} \times (1 - \alpha(i, j)) \quad (16)$$

Moreover, in Equations (15) and (16), $\alpha(i, j)$ is a variable of which the value is not more than one and is decided with the sum of the color signals G and the sum of the color signals X in the pixel area illustrated in FIG. 10 as expressed by the following Equation.

$$\alpha(i, j) = \sum_{n,m} G(i+n, j+m) \Big/ \left( \sum_{n,m} G(i+n, j+m) + \sum_{k,l} X(i+k, j+l) \times \beta \right)$$

Moreover, $\Sigma_{n,m}$ and $\Sigma_{k,l}$ indicate the sum in the range of a domain of definition for defining peripheral pixel areas for a coordinate value (i, j) indicating a pixel position and it is $\beta = \Sigma_{n,m} 1/\Sigma_{k,l} 1$. In other words, when a correlation between the color signal G and the color signal X is high, $\alpha$ has a value close to 0.5 and the first term and the second have the same ratio. On the other hand, the first term has a large weight when the color signal G is larger than the color signal X and the second term has a large weight when the color signal X is conversely larger than the color signal G.

Next, the G-interpolation type determining unit 222 computes a absolute value |Cv-Ch| of a difference between the longitudinal color correlation value Cv and the lateral color correlation value Ch computed based on Equations (15) and (16), and performs a comparison determination process on the computed absolute value |Cv-Ch| and a predetermined threshold value.

As a result of the comparison determination process, when the absolute value |Cv-Ch| is less than the predetermined threshold value, the G-interpolation type determining unit 222 selectively decides the type information Ta of the four-pixel average interpolation process as the type information of the G-missing pixel position. On the other hand, when the absolute value |Cv-Ch| is not less than the predetermined threshold value and the longitudinal color correlation value Cv is larger than the lateral color correlation value Ch, the G-interpolation type determining unit 222 selectively decides the type information Th of the horizontal interpolation process as the type information of the G-missing pixel position. Moreover, when the absolute value |Cv-Ch| not less than the predetermined threshold value and the longitudinal color correlation value Cv is smaller than the lateral color correlation value Ch, the G-interpolation type determining unit 222 selectively decides the type information Tv of the vertical interpolation process as the type information of the G-missing pixel position. After that, the G-interpolation type determining unit 222 outputs the type information (one of type information Ta, Th, and Tv) of the G-missing pixel position decided in this way to the memory 224.

The memory 224 functions as a type information storage unit that stores type information, which indicates an interpolation process type after the determination is performed by the G-interpolation type determining unit 222, for each missing pixel position. Specifically, the memory 224 first acquires type information indicating the interpolation process type at the G-missing pixel position described above from G-interpolation type determining unit 222, and sequentially stores the acquired type information for each G-missing pixel position of a two-dimensional array.

More specifically, the memory 224 sequentially acquires the type information determined by the G-interpolation type determining unit 222 from the type information Tv(i, j), Th(i, j), and Ta(i, j) of interpolation process types and sequentially stores the acquired type information (in other words, one of type information Tv(i, j), Th(i, j), and Ta(i, j)) for each G-missing pixel position of a Bayer array.

In this way, the memory 224 stores type information of interpolation process types for the predetermined number of lines (for example, three lines or mere). Moreover, the type information for the predetermined number of lines stored in the memory 224 is read by the type information modifying unit 225.

In this case, the type information modifying unit 225 has the same function as that of the type information modifying unit 28 according to the first embodiment or the type information modifying unit 128 according to the first alternative example described above. In other words, the memory 224 acquires the type information modified by the type information modifying unit 225 from the type information modifying unit 225, overwrites the type information after modification at the same storage position, and updates the existing type information of the same storage position to the type information after modification. For example, type information T(i–2, j) modified by the type information modifying unit 225 is overwritten at a storage position before modification in the memory 224. Moreover, the type information T(i–2, j) is information that is obtained by delaying the latest type information T(i, j) by two pixels to the left.

The interpolation selecting unit 223 functions as an interpolation computing unit selecting unit that selects an interpolation signal computing unit that computes an interpolation signal from interpolation computing units for a plurality of interpolation process types in accordance with the interpolation process type of the processing-target G-missing pixel position.

Specifically, the interpolation selecting unit 223 first acquires the color signal Gs from the memory 221b, and acquires type information indicating the interpolation process type at the processing-target G-missing pixel position from the memory 224. Moreover, the type information acquired from the memory 224 is type information for which the determination result performed by the G-interpolation type determining unit 222 is maintained or type information modified by the type information modifying unit 225.

Next, the interpolation selecting unit 223 checks an interpolation process type indicated by the type information read from the memory 224. When the type information is the type information Tv of the vertical interpolation process, the interpolation selecting unit 223 outputs the color signal Gs output from the memory 221b to the vertical interpolation computing unit 226a and makes the vertical interpolation computing unit 226a compute the interpolation G signal Gi of the G-missing pixel position.

On the other hand, when the type information read from the memory 224 is the type information Th of the horizontal interpolation process, the interpolation selecting unit 223 outputs the color signal Gs output from the memory 221b to the horizontal interpolation computing unit 226b and makes the horizontal interpolation computing unit 226b compute the interpolation G signal Gi of the G-missing pixel position. Moreover, when the type information read from the memory 224 is the type information Ta of the four-pixel average interpolation process, the interpolation selecting unit 223 outputs the color signal Gs output from the memory 221b to the four-pixel average interpolation computing unit 226c and makes the four-pixel average interpolation computing unit 226c compute the interpolation G signal Gi of the G-missing pixel position.

The vertical interpolation computing unit 226a, the horizontal interpolation computing unit 226b, and the four-pixel average interpolation computing unit 226c function as a plurality of interpolation signal computing units that computes interpolation signals of the specified color (color signal Gs) different among interpolation process types.

Specifically, when the color signals Gs of the peripheral pixels of the G-missing pixel position are acquired from the interpolation selecting unit 223, the vertical interpolation computing unit 226a computes the interpolation G signal Gi having the interpolation value Gv of the vertical interpolation process on the basis of Equation (1), similarly to the vertical interpolation computing unit 22a according to the first embodiment.

When the color signals Gs of the peripheral pixels of the G-missing pixel position are acquired from the interpolation selecting unit 223, the horizontal interpolation computing unit 226b computes the interpolation G signal Gi having the interpolation value Gh of the horizontal interpolation process on the basis of Equation (2), similarly to the horizontal interpolation computing unit 22b according to the first embodiment.

When the color signals Gs of the peripheral pixels of the G-missing pixel position are acquired from the interpolation selecting unit 223, the four-pixel average interpolation computing unit 226c computes the interpolation G signal Gi having the interpolation value Ga of the pixel average interpolation process on the basis of Equation (3), similarly to the four-pixel average interpolation computing unit 22c according to the first embodiment.

In other words, one selected by the interpolation selecting unit 223 among the vertical interpolation computing unit 226a, the horizontal interpolation computing unit 226b, and the four-pixel average interpolation computing unit 226c computes the interpolation G signal Gi and outputs the computed interpolation G signal Gi to the subtraction unit 229a.

The low pass filter 227 first acquires the color signal X stored in the memory 221a. Next, similarly to the low pass filter 24 according to the first embodiment, the low pass filter 227 performs a band limiting process on the acquired color signal X and generates a color signal XL that is obtained by band-limiting the color signal X in a predetermined frequency bandwidth. After that, the low pass filter 227 outputs the color signal XL after the band limiting process to the selecting unit 228.

The selecting unit 228 functions as a signal selecting unit that selects the color signals X and XL that are signals of colors except specified color in correspondence with the interpolation process type after modification of the G-missing pixel position indicated by the type information after updating read from the memory 224.

Specifically, the selecting unit 228 first acquires the color signal X from the memory 221a, and acquires color signal XL after the band limiting process from the low pass filter 227. Moreover, the selecting unit 228 acquires the type information after updating or determination stored in the memory 224.

Next, the selecting unit 228 selects one of the color signals X and XL as an output-target signal for the subtraction unit 229a in accordance with the interpolation process type indicated by the type information output from the memory 224. In other words, when an interpolation process type indicated by type information is the vertical interpolation process or the horizontal interpolation process, the selecting unit 228 selects the color signal X output from the memory 221a and then outputs the selected color signal X to the subtraction unit 229a.

On the other hand, when the interpolation process type indicated by type information is the four-pixel average interpolation process, the selecting unit 228 selects the color signal XL output from the low pass filter 227 and then outputs the selected color signal XL to the subtraction unit 229a.

The subtraction unit 229a functions as a color-difference signal computing unit subtracts the interpolation signal computed by the interpolation signal computing means (one of the vertical interpolation computing unit 226a, the horizontal interpolation computing unit 226b, and the four-pixel average interpolation computing unit 226c) selected by the interpolation selecting unit 223 from the signal of a color except the specified color (one of color signals X and XL) selected by the selecting unit 228 to compute the color-difference signal of the G-missing pixel position.

Specifically, when the interpolation G signal Gi having the interpolation value Gv of the vertical interpolation process is acquired from the vertical interpolation computing unit 226a, the subtraction unit 229a subtracts the interpolation G signal Gi from the color signal X acquired from the selecting unit 228, thereby computing color-difference signal X-Gv corresponding to the vertical interpolation process. Moreover, then the interpolation G signal Gi having the interpolation value Gh of the horizontal interpolation process is acquired from the horizontal interpolation computing unit 226b, the subtraction unit 229a subtracts the interpolation G signal Gi from the color signal X acquired from the selecting unit 228, thereby computing a color-difference signal X-Gh corresponding to the horizontal interpolation process.

On the other hand, when the interpolation G signal Gi having the interpolation value Ga of the four-pixel average interpolation process is acquired from the four-pixel average interpolation computing unit 226c, the subtraction unit 229a subtracts the interpolation G signal Gi from the color signal XL acquired from the selecting unit 228, thereby computing a color-difference signal XL-Ga corresponding to the four-pixel average interpolation process.

After that, the subtraction unit 229a outputs the color-difference signal X-Gi (in other words, one of the color-difference signals X-Gv, X-Gh, and XL-Ga) computed as described above to the subtraction unit 229b and the simultaneous interpolation processing unit 30.

In this case, the interpolation selecting unit 223, the vertical interpolation computing unit 226a, the horizontal interpolation computing unit 226b, the four-pixel average interpolation computing unit 226c, the selecting unit 228, and the subtraction unit 229a constitute a color-difference signal selecting unit 220a that selects a color-difference signal in correspondence with the interpolation process type after modification of the G-missing pixel position indicated by the type information after updating stored in the memory 224.

The color-difference signal selecting unit 220a selectively outputs the color-difference signal X-Gi (in other words, one of the color-difference signals X-Gv, X-Gh, and XL-Ga) corresponding to the interpolation process type indicated by the type information after determination or after modification in accordance with the action of each unit described above.

The subtraction unit 229b functions as an interpolation signal generating unit that generates an interpolation signal of a signal of a specified color at the missing pixel position of a signal of the specified color on the basis of the color-difference signal selected based on the type information of an interpolation process type. Specifically, the subtraction unit 229b first acquires the color signals X (the color signals Rs and Bs) at the processing-target G-missing pixel position from the memory 221a, and acquires the color-difference signal X-Gi at the processing-target G-missing pixel position from the subtraction unit 229a of the color difference selecting unit 220a.

In this case, the color-difference signal X-Gi is a color-difference signal selected by the color difference selecting unit 220a on the basis of the interpolation process type after determination or updating at the processing-target G-missing pixel position as described above, and is one of the color-difference signals X-Gv, X-Gh, and XL-Ga in the second embodiment.

Next, the subtraction unit 229b subtracts the color-difference signal X-Gi output from the color difference selecting unit 220a from the color signal X output from the memory 221a, thereby computing the interpolation G signal Gi at the processing-target G-missing pixel position, similarly to the subtraction unit 23d according to the first embodiment. After that, the subtraction unit 229b outputs the interpolation G signal Gi computed in this way to the simultaneous interpolation processing unit 30 (see FIG. 31).

The interpolation G signal Gi output from the subtraction unit 229b and the color signal Gs output from the memory 221b are synthesized like a two-dimensional array as illustrated in FIG. 4, and then is output to the simultaneous interpolation processing unit 30 in a raster scanning sequence as the color signal G of a two-dimensional array that does not have a missing color component.

Next, it will be explained about operations based on a software process of the image processing apparatus 202 according to the second embodiment of the present invention. The image processing apparatus 202 according to the second embodiment can perform various types of image processing on the basis of the hardware process as described above. Furthermore, the image processing apparatus 202 can also operate on the basis of a software process performed by a computer that reads an image processing program recorded in a computer-readable recording medium such as a semiconductor memory, CD-ROM, DVD, or a magnetic disk, similarly to the processing procedures of Steps S101 to S107 illustrated in FIG. 21. In this case, the image processing apparatus 202 according to the second embodiment is different from that of the first embodiment only in the case of the G-interpolation color difference computation process of Step S103 described above. Hereinafter, it will be in detail explained about the processing procedure of a G-interpolation color difference computation process of Step S103 according to the second embodiment.

Figure 33:
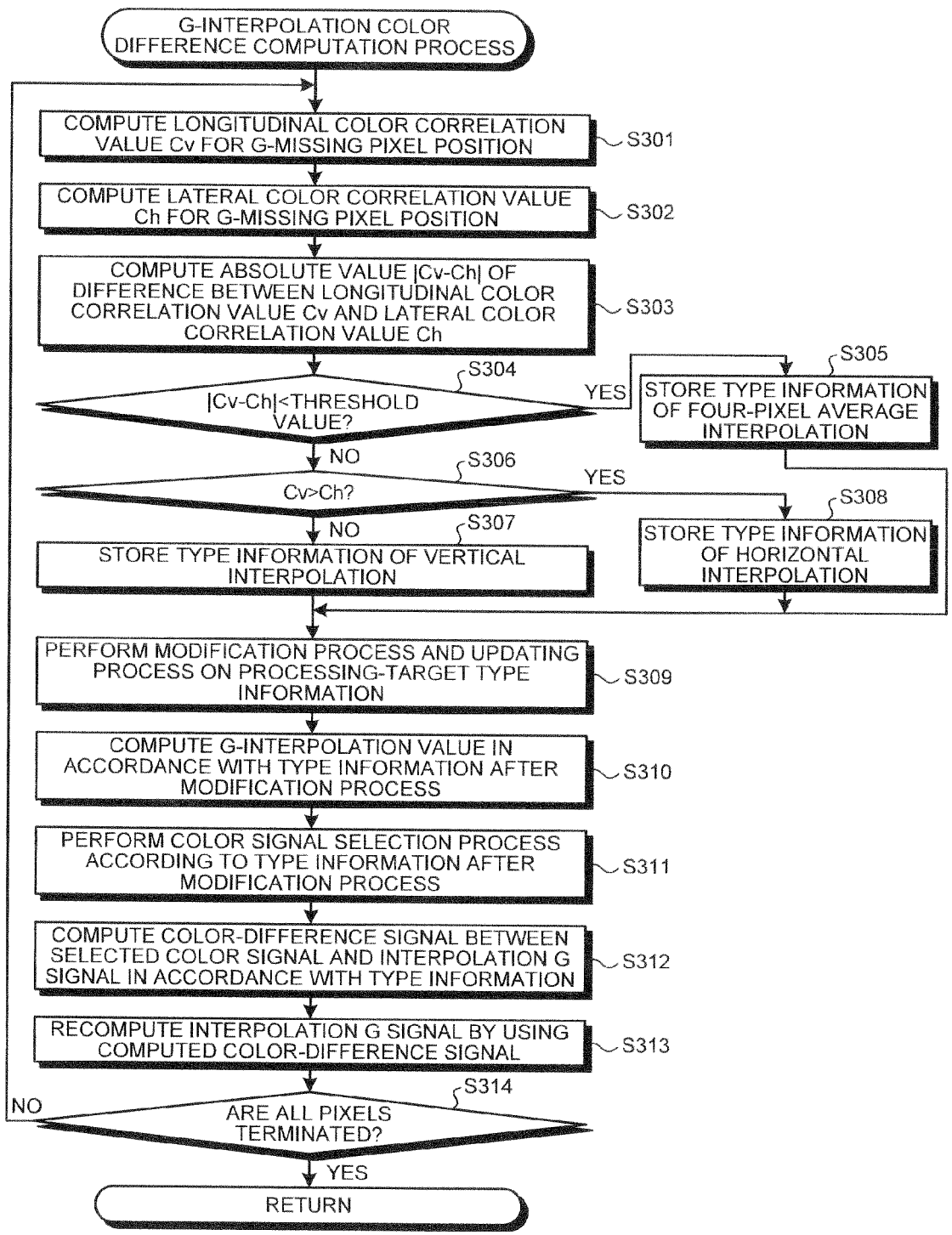
FIG. 33 is a flowchart illustrating the processing procedure of a G-interpolation color difference computation process that is performed by the image processing apparatus according to the second embodiment of the present invention.

FIG. 33 is a flowchart illustrating the processing procedure of a G-interpolation color difference computation process that is performed by the image processing apparatus according to the second embodiment of the present invention. When the processing procedure of Step S103 illustrated in FIG. 21 is executed, the image processing apparatus 202 according to the second embodiment first computes a longitudinal color correlation value Cv for a G-missing pixel position as illustrated in FIG. 33 (Step S301).

At Step S301, the image processing apparatus 202 computes the longitudinal color correlation value Cv at the G-missing pixel position in accordance with Equation (15) on the basis of the RAW file acquired in the processing procedure of Step S101 and the attribute information acquired in the processing procedure of Step S102 illustrated in FIG. 21.

Next, the image processing apparatus 202 computes a lateral color correlation value Ch at the G-missing pixel position (Step S302). At Step S302, the image processing apparatus 202 computes the lateral color correlation value Ch at the G-missing pixel position in accordance with Equation (16) on the basis of the RAW file acquired in the processing procedure of Step S101 and the attribute information acquired in the processing procedure of Step S102 illustrated in FIG. 21.

Next, the image processing apparatus 202 computes an absolute value |Cv-Ch| of a difference between the longitudinal color correlation value Cv and the lateral color correlation value Ch at the G-missing pixel position (Step S303). At Step S303, the image processing apparatus 202 computes the absolute value |Cv-Ch| of a difference between a longitudinal color correlation value Cv(i, j) computed in the processing procedure of Step S301 and a lateral color correlation value Ch(i, j) computed in the processing procedure of Step S302.

Next, the image processing apparatus 202 compares the absolute value |Cv-Ch| computed in the processing procedure of Step S303 and a predetermined threshold value that is previously set (Step S304). When the absolute value |Cv-Ch| is not less than the threshold value (Step S304: No), the image processing apparatus 202 performs a size determination process on the longitudinal color correlation value Cv(i, j) and the lateral color correlation value Ch(i, j) that are computed in the processing procedure of Steps S301 and S302 (Step S306).

On the one hand, at Step S304, when the absolute value |Cv-Ch| is less than the threshold value (Step S304: Yes), the image processing apparatus 202 stores type information Ta for the four-pixel average interpolation in a memory (Step S305).

On the other hand, at Step S306, the image processing apparatus 202 stores type information Tv for the vertical interpolation process in the memory (Step S307) when the longitudinal color correlation value Cv(i, j) is smaller than the lateral color correlation value Ch(i, j) (Step S306: No) and stores type information Th for the horizontal interpolation process in the memory (Step S308) when the longitudinal color correlation value Cv(i, j) is larger than the lateral color correlation value Ch(i, j) (Step S306: Yes).

After that, the image processing apparatus 202 performs a modification process and an updating process on processing-target type information (in other words, one of type information Tv, Ta, and Th) (Step S309). At Step S309, the image processing apparatus 202 modifies an interpolation process type of the processing-target type information on the basis of the processing-target type information and the peripheral type information (for example, see FIG. 16 or 24) stored in the memory, and overwrites the type information after modification at the same position of the memory.

Next, the image processing apparatus 202 computes a G-interpolation value in accordance with the type information after the modification process in the processing procedure of Step S309 (Step S310). At Step S310, the image processing apparatus 202 selects the interpolation process indicated by the type information after the modification process stored in the memory from the vertical interpolation process, the horizontal interpolation process, and the four-pixel average interpolation process, and computes an interpolation G signal Gi in accordance with the selected interpolation process.

Specifically, the image processing apparatus 202 computes the interpolation G signal Gi of an interpolation value Gv when the vertical interpolation process is selected. When the horizontal interpolation process is selected, the image processing apparatus 202 computes the interpolation G signal Si of an interpolation value Gh. When the four-pixel average interpolation process is selected, the image processing apparatus 202 computes the interpolation G signal Gi of an interpolation value Ga.

Next, the image processing apparatus 202 performs a color signal selection process according to the type information after the modification process in the processing procedure of Step S309 (Step S311). At Step S311, when the type information after the modification process described above is the type information Ta indicating the four-pixel average interpolation process, the image processing apparatus 202 computes a color signal XL that is obtained by band-limiting its high-pass component, on the basis of the color signal X of the processing-target G-missing pixel position and each color signal X of a plurality of G-missing pixel positions located at the vicinity of the G-missing pixel position.

In this case, the computed color signal XL is a signal at the processing-target G-missing pixel position. For this reason, when the type information after the modification process described above is the type information Ta indicating the four-pixel average interpolation process, the image processing apparatus 202 selects the color signal XL of the processing-target G-missing pixel position. On the other hand, when the type information after the modification process described above is the type information Tv or Th that indicates the vertical interpolation process or the horizontal interpolation process, the image processing apparatus 202 selects the color signal X of the G-missing pixel position stored in the memory.

After that, the image processing apparatus 202 computes a color-difference signal between the selected color signal and the interpolation G signal in accordance with the type information after the modification process in the processing procedure of Step S309 (Step S312). At Step S312, when the type information after the modification process is the type information Ta indicating the four-pixel average interpolation process, the image processing apparatus 202 computes a color-difference signal XL-Ga between the color signal XL after the band limiting process at the processing-target G-missing pixel position obtained in the processing procedure of Step S311 and the interpolation G signal Gi.

On the other hand, the image processing apparatus 202 computes a color-difference signal X-Gv between the color signal X of the G-missing pixel position and the interpolation C signal Gi stored in the memory when the type information after the modification process described above is the type information Tv indicating the vertical interpolation process and computes a color-difference signal X-Gh between the color signal X of the G-missing pixel position and the interpolation G signal Gi stored in the memory when the type information after the modification process described above is the type information Th indicating the horizontal interpolation process.

Next, the image processing apparatus 202 recomputes an interpolation G signal by using the computed color-difference signal in the processing procedure of Step S312 (Step S313). At Step S313, when the type information after the modification process described above is the type information Ta indicating the four-pixel average interpolation process, the image processing apparatus 202 subtracts the color-difference signal XL-Ga at Step S312 from the color signal XL at the processing-target G-missing pixel position, thereby recomputing an interpolation G signal Gi at the processing-target G-missing pixel position.

On the other hand, when the type information after the modification process described above is the type information Tv indicating the vertical interpolation process, the image processing apparatus 202 subtracts the color-difference signal X-Gv at Step S312 from the color signal X at the processing-target G-missing pixel position, thereby recomputing an interpolation G signal Gi at the processing-target G-missing pixel position. Moreover, when the type information after the modification process described above is the type information Th indicating the horizontal interpolation process, the image processing apparatus 202 subtracts the color-difference signal X-Gh at Step S312 from the color signal X at the processing-target G-missing pixel position, thereby recomputing an interpolation G signal Gi at the processing-target G-missing pixel position.

After that, the image processing apparatus 202 determines whether various types of image processing described above is performed on all pixels (Step S314). When an unprocessed pixel remains (Step S314: No), the image processing apparatus 202 returns the process control to Step S301 described above to repeat the processing procedure after Step S301.

On the other hand, when an unprocessed pixel does not remain at Step S314, in other words, when the process for all pixels is terminated (Step Yes), the image processing apparatus 202 terminates the G-interpolation color difference computation process and returns the process control to Step S103 illustrated in FIG. 21.

As explained above, in the second embodiment of the present invention, the image processing apparatus first determines an interpolation process type on the basis of a longitudinal-direction color correlation value and a lateral-direction color correlation value at a processing-target G-missing pixel position, modifies the interpolation process type after determination on the basis of interpolation process types of a plurality of G-missing pixel positions located at the vicinity of the processing-target G-missing pixel position, and selects a color-difference signal of the processing-target G-missing pixel position in correspondence with the interpolation process types after modification. The other configuration is similarly to that of the first embodiment. For this reason, because the image processing apparatus has the same action-effect as that of the first embodiment described above and can compute a G-component interpolation signal of the G-missing pixel position by using one interpolation process that is identical with the interpolation process type after modification among the plurality of interpolation processes, the image processing apparatus can realize the promotion of shortening of a processing time and the simplification of a device configuration.

Moreover, in the first and second embodiments and the second alternative example described above, it has been explained about the case where the image processing apparatus performs a counting process on the interpolation process types of the plurality of peripheral G-missing pixel positions located at the vicinity of the processing-target G-missing pixel position and modifies the interpolation process type of the processing-target G-missing pixel position into the same type as the interpolation process type of the peripheral G-missing pixel positions when all the interpolation process types of the plurality of peripheral G-missing pixel positions are the same type and are different from the interpolation process type of the processing-target G-missing pixel position. However, the present invention is not limited to this.

Specifically, as a trade-off with the frequency of mis-modification, when a predetermined number or more interpolation process types among the interpolation process types of the plurality of peripheral G-missing pixel positions are the same type and are different from the interpolation process type of the processing-target G-missing pixel position, the image processing apparatus may modify the interpolation process type of the processing-target G-missing pixel position into the same type as the predetermined number or more interpolation process types. Alternatively, when a majority or more interpolation process types among the interpolation process types of the plurality of peripheral G-missing pixel positions are the same type and are different from the interpolation process type of the processing-target G-missing pixel position, the image processing apparatus may modify the interpolation process type of the processing-target G-missing pixel position into the same type as the majority or more interpolation process types.

Alternatively, when the most frequent same interpolation process types among the interpolation process types of the plurality of peripheral G-missing pixel positions are different from the interpolation process type of the processing-target G-missing pixel position, the image processing apparatus may perform a majority decision process for modifying the interpolation process type of the processing-target G-missing pixel position into the same type as the most frequent interpolation process types.

Moreover, in the first and second embodiments and the first and second alternative examples described above, it has been explained about the case where a G-component color signal among multiple-color color signals forming an image is treated as a signal of a specified color. However, the present invention is not limited to this. A signal of a specified color of the present invention may be color signal other than a G component, or a color signal of a desired color component among multiple-color color signals forming an image may be treated as a signal of a specified color.

Furthermore, in the second embodiment described above, similarly to the first embodiment, it has been explained about the case where the image processing apparatus performs a counting process on the interpolation process types of the plurality of peripheral G-missing pixel positions located at the vicinity of the processing-target G-missing pixel position and modifies the interpolation process type of the processing-target G-missing pixel position on the basis of the counting process result. However, the present invention is not limited to this. Similarly to the first alternative example of the first embodiment, the image processing apparatus may determine an array pattern of the interpolation process types of the plurality of peripheral G-missing pixel positions and may modify the interpolation process type of the processing-target G-missing pixel position on the basis of the determination result of the array pattern. In other words, the apparatus, the program, and the method of the present invention may be an image processing apparatus, an image processing program, and an image processing method that are appropriately combining the first alternative example of the first embodiment and the second embodiment described above.

Moreover, in the second embodiment described above, it has been explained about the case where the image processing apparatus updates the type information of the interpolation process type after modification that is accurately modified in accordance with each interpolation process type of the plurality of peripheral G-missing pixel positions as the type information of the same G-missing pixel position and uses the interpolation process type according to the type information after updating in a modification process of an interpolation process type of the other G-missing pixel position to have a circular configuration. However, the present invention is not limited to this. The present invention may have a non-circular configuration for performing a modification process of an interpolation process type without the use of a past modification process result.

Furthermore, in the first and second embodiments and the first and second alternative examples described above, it has been explained about the case where the color signals of RGB are illustrated as a Bayer array. However, the present invention is not limited to this. The signals of the plurality of color components such as R, G, and B may be arranged like a mosaic in a two-dimensional shape other than a Bayer array and the interpolation processes for the missing pixel position of a signal of a specified color such as a G-component color signal may be switched in correspondence with the interpolation process types of the plurality of peripheral missing pixels.

Moreover, in the first and second embodiments and the first and second alternative examples described above, it has been explained about the processing procedures according to software of the image processing apparatus that are performed based on operations of a computer that executes a processing program. However, the present invention is not limited to this. The image processing apparatus according to the present invention may execute the processing procedures according to hardware. In this case, the image processing apparatus according to the present invention may execute each process step illustrated in FIG. 22 or 33 in accordance with the operations of hardware.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing apparatus comprising:
a type determining unit that determines, with respect to a missing pixel position that is a pixel position that does not have a signal of a specified color among a plurality of colors of an image, an interpolation process type indicating a type of an interpolation process for interpolating a signal of the specified color;
a type modifying unit that modifies the determined interpolation process type on the basis of interpolation process types of a plurality of peripheral missing pixel positions that are pixel positions each of which does not have a signal of the specified color among the plurality of colors of the image and located in a vicinity of the missing pixel position;
a color-difference signal selecting unit that selects a color-difference signal that is a difference between a signal of a color other than the specified color among the plurality of colors and the signal of the specified color in correspondence with the modified interpolation process type; and
an interpolation signal generating unit that generates an interpolation signal of the specified color at the missing pixel position on the basis of the color-difference signal.

2. The image processing apparatus according to claim 1, further comprising:
a plurality of interpolation signal computing units that compute interpolation signals of the specified color, the interpolation signals being different among the interpolation process types;
a plurality of color-difference signal candidate computing units that compute a plurality of color-difference signal candidates that are candidates of the color-difference signal on the basis of signals of the color other than the specified color and the different interpolation signals, the plurality of color-difference signal candidates being different among the interpolation process types;
a plurality of color-difference signal candidate storage units each of which stores therein the color-difference signal candidates for a predetermined number of pixels in accordance with a corresponding interpolation process type among the interpolation process types;
a plurality of color difference similarity computing units each of that computes a similarity degree among the color-difference signal candidates for the corresponding interpolation process type on the basis of the color-difference signal candidates for the predetermined number of pixels; and
a type information storage unit that stores therein type information indicating the determined interpolation process type for the missing pixel position,
wherein:
the type determining unit determines the interpolation process type on the basis of the similarity degree among the color-difference signal candidates,
the type information storage unit updates the type information into type information after modification indicating the modified interpolation process type, and
the color-difference signal selecting unit selects the color-difference signal from the plurality of color-difference signal candidates in correspondence with the interpolation process type indicated by the type information after modification.

3. The image processing apparatus according to claim 1, further comprising a type information storage unit that stores therein type information indicating the determined interpolation process type for the missing pixel position,
wherein:
the type determining unit computes a color correlation value between a pixel position adjacent to the missing pixel position and the missing pixel position and determines an interpolation process type of the specified color at the missing pixel position on the basis of the color correlation value,
the type information storage unit updates the type information to type information after modification indicating the modified interpolation process type, and the color-difference signal selecting unit selects the color-difference signal in correspondence with the interpolation process type indicated by the type information after modification.

4. The image processing apparatus according to claim 3, wherein the color-difference signal selecting unit includes:
   a plurality of interpolation signal computing units that compute interpolation signals of the specified color, the interpolation signals being different among the interpolation process types;
   an interpolation computing unit selecting unit that selects an interpolation signal computing unit from the plurality of interpolation signal computing units in correspondence with the interpolation process type indicated by the type information after modification;
   a signal selecting unit that selects the signal of the color other than the specified color in correspondence with the interpolation process type indicated by the type information after modification; and
   a color-difference signal computing unit for computing the color-difference signal by subtracting the interpolation signal computed by the selected interpolation signal computing unit from the selected signal of the color other than the specified color.

5. The image processing apparatus according to claim 2, wherein the type modifying unit includes:
   a type information extracting unit that extracts multiple pieces of type information indicating the interpolation process types of the plurality of peripheral missing pixel positions and the type information of the missing pixel position from the type information storage unit;
   a count processing unit that counts the interpolation process types of the plurality of peripheral missing pixel positions on the basis of the multiple pieces of type information; and
   a modification processing unit that modifies the interpolation process type indicated by the type information of the missing pixel position on the basis of the counted result performed by the count processing unit.

6. The image processing apparatus according to claim 5, wherein:
   the count processing unit counts a number of pieces of type information of a same interpolation process type among the pieces of type information of the interpolation process types of the plurality of peripheral missing pixel positions, and
   the modification processing unit modifies the determined interpolation process type into the same interpolation process type when the number of the pieces of type information of the same interpolation process type is not less than a predetermined number and the determined interpolation process type is different from the same interpolation process type.

7. The image processing apparatus according to claim 6, wherein the number of the pieces of type information of the same interpolation process type is not less than a majority among the interpolation process types of the plurality of peripheral missing pixel positions.

8. The image processing apparatus according to claim 2, wherein the type modifying unit includes:
   a type information extracting unit that extracts multiple pieces of type information indicating the interpolation process types of the plurality of peripheral missing pixel positions and the type information of the missing pixel position from the type information storage unit;
   a type pattern determining unit that compares an array pattern of the interpolation process types of the plurality of peripheral missing pixel positions indicated by the multiple pieces of type information and a setting array pattern indicating array patterns different among the interpolation process types and determines whether the array pattern and the setting array pattern are identical to each other; and
   a modification processing unit that modifies the interpolation process type indicated by the type information of the missing pixel position into an interpolation process type corresponding to the setting array pattern when the array pattern and the setting array pattern are identical to each other.

9. The image processing apparatus according to claim 2, wherein the plurality of interpolation signal computing units include:
   a vertical interpolation signal computing unit that computes an interpolation signal according to a longitudinal-direction interpolation process on the basis of a signal of the specified color of each pixel position adjacent to the missing pixel position in a longitudinal direction;
   a horizontal interpolation signal computing unit that computes an interpolation signal according to a lateral-direction interpolation process on the basis of a signal of the specified color of each pixel position adjacent to the missing pixel position in a lateral direction; and
   a four-pixel average interpolation signal computing unit that computes an interpolation signal according to a four-pixel average interpolation process on the basis of a signal of the specified color of four pixel positions adjacent to the missing pixel position in longitudinal and lateral directions.

10. The image processing apparatus according to claim 9, wherein the plurality of interpolation signal computing units further include:
    a diagonal interpolation signal computing unit that computes an interpolation signal according to an upward-sloping-direction interpolation process on the basis of a signal of the specified color of each pixel position adjacent to the missing pixel position in an upward-sloping direction; and
    an inverted diagonal interpolation signal computing unit that computes an interpolation signal according to a downward-sloping-direction interpolation process on the basis of a signal of the specified color of each pixel position adjacent to the missing pixel position in a downward-sloping direction.

11. The image processing apparatus according to claim 3, wherein the type modifying unit includes:
    a type information extracting unit that extracts multiple pieces of type information indicating the interpolation process types of the plurality of peripheral missing pixel positions and the type information of the missing pixel position from the type information storage unit;
    a count processing unit that counts the interpolation process types of the plurality of peripheral missing pixel positions on the basis of the multiple pieces of type information; and
    a modification processing unit that modifies the interpolation process type indicated by the type information of the missing pixel position on the basis of the counted result performed by the count processing unit.

12. The image processing apparatus according to claim 11, wherein:
    the count processing unit counts a number of pieces of type information of a same interpolation process type among the pieces of type information of the interpolation process types of the plurality of peripheral missing pixel positions, and the modification processing unit modifies the determined interpolation process type into the same interpolation process type when the number of the pieces of type information of the same interpolation process type is not less than a predetermined number and the determined interpolation process type is different from the same interpolation process type.

13. The image processing apparatus according to claim 12, wherein the number of the pieces of type information of the same interpolation process type is not less than a majority among the interpolation process types of the plurality of peripheral missing pixel positions.

14. The image processing apparatus according to claim 3, wherein the type modifying unit includes:

a type information extracting unit that extracts multiple pieces of type information indicating the interpolation process types of the plurality of peripheral missing pixel positions and the type information of the missing pixel position from the type information storage unit;

a type pattern determining unit that compares an array pattern of the interpolation process types of the plurality of peripheral missing pixel positions indicated by the multiple pieces of type information and a setting array pattern indicating array patterns different among the interpolation process types and determines whether the array pattern and the setting array pattern are identical to each other; and a modification processing unit that modifies the interpolation process type indicated by the type information of the missing pixel position into an interpolation process type corresponding to the setting array pattern when the array pattern and the setting array pattern are identical to each other.

15. The image processing apparatus according to claim 3, wherein the plurality of interpolation signal computing units include:

a vertical interpolation signal computing unit that computes an interpolation signal according to a longitudinal-direction interpolation process on the basis of a signal of the specified color of each pixel position adjacent to the missing pixel position in a longitudinal direction;

a horizontal interpolation signal computing unit that computes an interpolation signal according to a lateral-direction interpolation process on the basis of a signal of the specified color of each pixel position adjacent to the missing pixel position in a lateral direction; and a four-pixel average interpolation signal computing unit that computes an interpolation signal according to a four-pixel average interpolation process on the basis of a signal of the specified color of four pixel positions adjacent to the missing pixel position in longitudinal and lateral directions.

16. The image processing apparatus according to claim 15, wherein the plurality of interpolation signal computing units further include:

a diagonal interpolation signal computing unit that computes an interpolation signal according to an upward-sloping-direction interpolation process on the basis of a signal of the specified color of each pixel position adjacent to the missing pixel position in an upward-sloping direction; and an inverted diagonal interpolation signal computing unit that computes an interpolation signal according to a downward-sloping-direction interpolation process on the basis of a signal of the specified color of each pixel position adjacent to the missing pixel position in a downward-sloping direction.

17. The image processing apparatus according to claim 1, further comprising a simultaneous interpolation processing unit that generates a plurality of color signals at a same sampling position in the image on the basis of the color-difference signal, the interpolation signal, and the signal of the specified color.

18. A computer-readable recording device that records an image processing program that causes a computer to execute functions comprising:

determining, with respect to a missing pixel position that is a pixel position that does not have a signal of a specified color among a plurality of colors of an image, an interpolation process type indicating a type of an interpolation process for interpolating a signal of the specified color;

modifying the determined interpolation process type on the basis of interpolation process types of a plurality of peripheral missing pixel positions that are pixel positions each of which does not have a signal of the specified color among the plurality of colors of the image and located in a vicinity of the missing pixel position;

selecting a color-difference signal that is a difference between a signal of a color other than the specified color among the plurality of colors and the signal of the specified color in correspondence with the modified interpolation process type; and generating an interpolation signal of the specified at the missing pixel position on the basis of the color-difference signal.

19. An image processing method comprising:

determining, with respect to a missing pixel position that is a pixel position that does not have a signal of a specified color among a plurality of colors of an image, an interpolation process type indicating a type of an interpolation process for interpolating a signal of the specified color;

modifying the determined interpolation process type on the basis of interpolation process types of a plurality of peripheral missing pixel positions that are pixel positions each of which does not have a signal of the specified color among the plurality of colors of the image and located in a vicinity of the missing pixel position;

selecting a color-difference signal that is a signal difference between a signal of a color other than the specified color among the plurality of color signals and the signal of the specified color in correspondence with the modified interpolation process type; and generating an interpolation signal of the specified color at the missing pixel position on the basis of the color-difference signal.

* * * * *